(12) United States Patent
Adler

(10) Patent No.: US 11,907,836 B2
(45) Date of Patent: *Feb. 20, 2024

(54) IMAGE PROCESSING OF AERIAL IMAGERY FOR ENERGY INFRASTRUCTURE SITE STATUS ANALYSIS

(71) Applicant: SOURCEWATER, INC., Houston, TX (US)

(72) Inventor: Joshua Adler, Houston, TX (US)

(73) Assignee: SOURCEWATER, INC., Houston, TX (US)

( * ) Notice: Subject to any disclaimer, the term of this patent is extended or adjusted under 35 U.S.C. 154(b) by 510 days.

This patent is subject to a terminal disclaimer.

(21) Appl. No.: 16/932,078

(22) Filed: Jul. 17, 2020

(65) Prior Publication Data
US 2021/0004590 A1    Jan. 7, 2021

Related U.S. Application Data

(63) Continuation of application No. 16/663,769, filed on Oct. 25, 2019, now Pat. No. 10,719,708, which is a continuation of application No. 16/425,235, filed on May 29, 2019, now Pat. No. 10,460,170.

(60) Provisional application No. 62/811,882, filed on Feb. 28, 2019, provisional application No. 62/792,372, filed on Jan. 14, 2019.

(51) Int. Cl.
| | |
|---|---|
| G06V 20/10 | (2022.01) |
| G06V 10/764 | (2022.01) |
| G06N 3/08 | (2023.01) |
| G06F 17/18 | (2006.01) |
| G06T 17/05 | (2011.01) |
| G06N 3/047 | (2023.01) |
| G06V 10/82 | (2022.01) |

(52) U.S. Cl.
CPC ............... *G06N 3/08* (2013.01); *G06F 17/18* (2013.01); *G06N 3/047* (2023.01); *G06T 17/05* (2013.01); *G06V 10/764* (2022.01); *G06V 10/82* (2022.01); *G06V 20/176* (2022.01)

(58) Field of Classification Search
None
See application file for complete search history.

(56) References Cited

U.S. PATENT DOCUMENTS

| | | |
|---|---|---|
| 7,336,078 B1 | 2/2008 | Merewether et al. |
| 9,389,084 B1 | 7/2016 | Chen et al. |
| 10,339,646 B1 * | 7/2019 | Adler .................. G06T 7/73 |
| 10,346,725 B2 | 7/2019 | Weller et al. |

(Continued)

OTHER PUBLICATIONS

Xiao, et al., "A New Method for Discovery of Vegetation Changes based on the Satellite Ground Photographs", 2015 8th Internation Processing (CISP 2015), pp. 851-856.

*Primary Examiner* — Tsung Yin Tsai
(74) *Attorney, Agent, or Firm* — MEDLER FERRO WOODHOUSE & MILLS PLLC

(57) ABSTRACT

A computer-implemented method for processing images to determine EI site status is provided. The method includes image processing of an aerial image by two EI feature recognition models. A first EI feature recognition model recognizes a first EI feature and a second EI feature recognition model recognizes a second EI feature. The results of each model are further used to determine a composite indication of EI site status.

20 Claims, 22 Drawing Sheets

(56) References Cited

U.S. PATENT DOCUMENTS

| | | | |
|---|---|---|---|
| 10,400,551 B2 | 9/2019 | Murr et al. | |
| 10,460,169 B1 * | 10/2019 | Adler | G06F 16/2379 |
| 10,460,170 B1 * | 10/2019 | Adler | G06T 17/05 |
| 10,467,473 B1 * | 11/2019 | Adler | G06N 3/045 |
| 10,534,961 B2 | 1/2020 | Rostand et al. | |
| 10,719,708 B1 * | 7/2020 | Adler | G06T 17/05 |
| 10,726,263 B1 * | 7/2020 | Adler | G06F 16/29 |
| 10,915,751 B2 * | 2/2021 | Adler | G06V 20/176 |
| 11,004,192 B2 * | 5/2021 | Adler | G06T 7/0004 |
| 11,048,937 B2 * | 6/2021 | Adler | G06F 18/25 |
| 11,379,971 B2 * | 7/2022 | Adler | G06T 7/0004 |
| 11,392,625 B2 | 7/2022 | Strong et al. | |
| 2006/0122776 A1 | 6/2006 | Knowles et al. | |
| 2007/0025595 A1 | 2/2007 | Koizumi et al. | |
| 2009/0177458 A1 | 7/2009 | Hochart et al. | |
| 2013/0170694 A1 | 7/2013 | Thornberry et al. | |
| 2013/0226667 A1 | 8/2013 | Terrazas et al. | |
| 2015/0221079 A1 | 8/2015 | Schultz et al. | |
| 2015/0269720 A1 | 9/2015 | Mondello | |
| 2015/0302253 A1 | 10/2015 | Stewart | |
| 2016/0180197 A1 | 6/2016 | Kim et al. | |
| 2016/0275801 A1 | 9/2016 | Kopardekar | |
| 2016/0343124 A1 | 11/2016 | Sundheimer et al. | |
| 2017/0200090 A1 | 7/2017 | Hershey et al. | |
| 2017/0337524 A1 | 11/2017 | Durand et al. | |
| 2017/0358068 A1 | 12/2017 | Strebel et al. | |
| 2018/0218214 A1 | 8/2018 | Pestun et al. | |
| 2018/0239991 A1 | 8/2018 | Weller et al. | |
| 2018/0260626 A1 | 9/2018 | Pestun et al. | |
| 2018/0336693 A1 | 11/2018 | De Franchis et al. | |
| 2019/0050625 A1 | 2/2019 | Reinstein et al. | |
| 2019/0130641 A1 | 5/2019 | Hernandez et al. | |
| 2019/0384975 A1 | 12/2019 | Rostand et al. | |
| 2021/0303848 A1 * | 9/2021 | Adler | G06F 16/587 |

* cited by examiner

IMAGE PROCESSING OF AERIAL IMAGERY FOR ENERGY INFRASTRUCTURE SITE STATUS ANALYSIS

RELATED APPLICATIONS

This application is a continuation of U.S. patent application Ser. No. 16/663,769, filed on Oct. 25, 2019, now U.S. Pat. No. 10,719,708, which is a continuation of U.S. patent application Ser. No. 16/425,235, filed on May 29, 2019, now U.S. Pat. No. 10,460,170, which claims the benefit of prior U.S. Provisional Patent Application Ser. No. 62/792,372, filed Jan. 14, 2019, and U.S. Provisional Patent Application Ser. No. 62/811,882, filed Feb. 28, 2019, both of which are hereby incorporated by reference in its entirety for all purposes.

TECHNICAL FIELD

The present invention generally relates to image processing systems and methods for processing aerial imagery. The present invention further relates to identifying, based on image processing, the presence and status of terrestrial energy infrastructure related features and for providing the information thereby obtained to users of an online platform.

BACKGROUND

Infrastructure of various differing types is required to harvest energy from natural resources, such as hydrocarbons (for example oil and gas), solar radiation, wind and hydroelectric sources. For a given energy resource type, constituent components of the infrastructure (hereon termed "Energy Infrastructure features" and abbreviated to "EI features") are often proximally-located to one another within the same locale or geographical region, for example at an oilfield site, a solar power station, a wind farm or a hydroelectric station.

As one example, hydraulic fracturing, or fracking, is a process specific to the hydrocarbon energy industry wherein a hydraulic liquid such as water or gel is injected into shale rock under pressure in order to create or expand cracks to facilitate the extraction of subterranean natural gas and oil. Use of this technique has grown rapidly in recent years.

Water is not only needed to initiate the fracturing process (the injectate), but may also often be recovered, produced or released as part of the operation. This water may be a return of the injected water or may be underground water that is released as a result of the fracturing. The quantity of the returned water can often be large, for example, exceeding by far the quantity of oil obtained from the well.

The nature of the fracturing process therefore brings about a requirement not only to source large amounts of water at the outset of a project, but also to dispose-of or treat and recycle water during the project or upon its completion. Transportation of water from source to site, or between sites, can incur significant costs and thereby reduce the available margin for profit during production. Such costs may be mitigated by identifying and selecting water source, disposal or treatment options that are geographically local to the fracturing site, or which exploit efficient water transport infrastructure such as pipeline networks.

In support of this need for efficient water management in the energy industry, tools to facilitate a dynamic online platform for water sourcing, recycling and disposal may be employed in which buyers and sellers of water source or disposal capacity may exchange information related to either an availability-of or a requirement-for water, including a number of relevant attributes such as its quantity, location, type, and quality.

Such a platform may be further extended to address not only the water resource needs associated with oilfield exploration and development, but also the need and supply of other associated resources, services, or infrastructure.

In further extensions, such a platform may be applied to energy industries other than oil and gas, for example to renewable energy sources such as solar, wind and hydroelectric. By means of example, the platform may be used to provide information regarding the status of a developing solar power station, wind farm or hydroelectric site, in order that users of the platform, such as suppliers of associated services, equipment or infrastructure, are timely-informed of upcoming opportunities and may take the information into account in their commercial planning.

Accordingly, there is therefore a need for a more timely, efficient, reliable, automated and cost-reduced identification of energy infrastructure features and determination of energy infrastructure site status.

SUMMARY

In an example, a method is described for processing images to determine Energy Infrastructure (EI) site status. A working image including at least one aerial image of a portion of global terrain is received and a first EI feature recognition model is applied to the working image to generate information on an EI feature at a geographical location in the portion of global terrain at a confidence level according to the image content of the working image. A second EI feature recognition model is applied to the working image to generate information on another EI feature at another geographical location in the portion of global terrain at another confidence level according to the image content of the working image. A composite indication of an EI site status is determined based on at least the information on the original EI feature, the information on the other EI feature, the original confidence level and the other confidence level.

Other aspects and advantages of the invention will become apparent from the following detailed description, taken in conjunction with the accompanying drawings, which illustrate by way of example the principles of the invention.

DETAILED DESCRIPTION

Figure 1A:
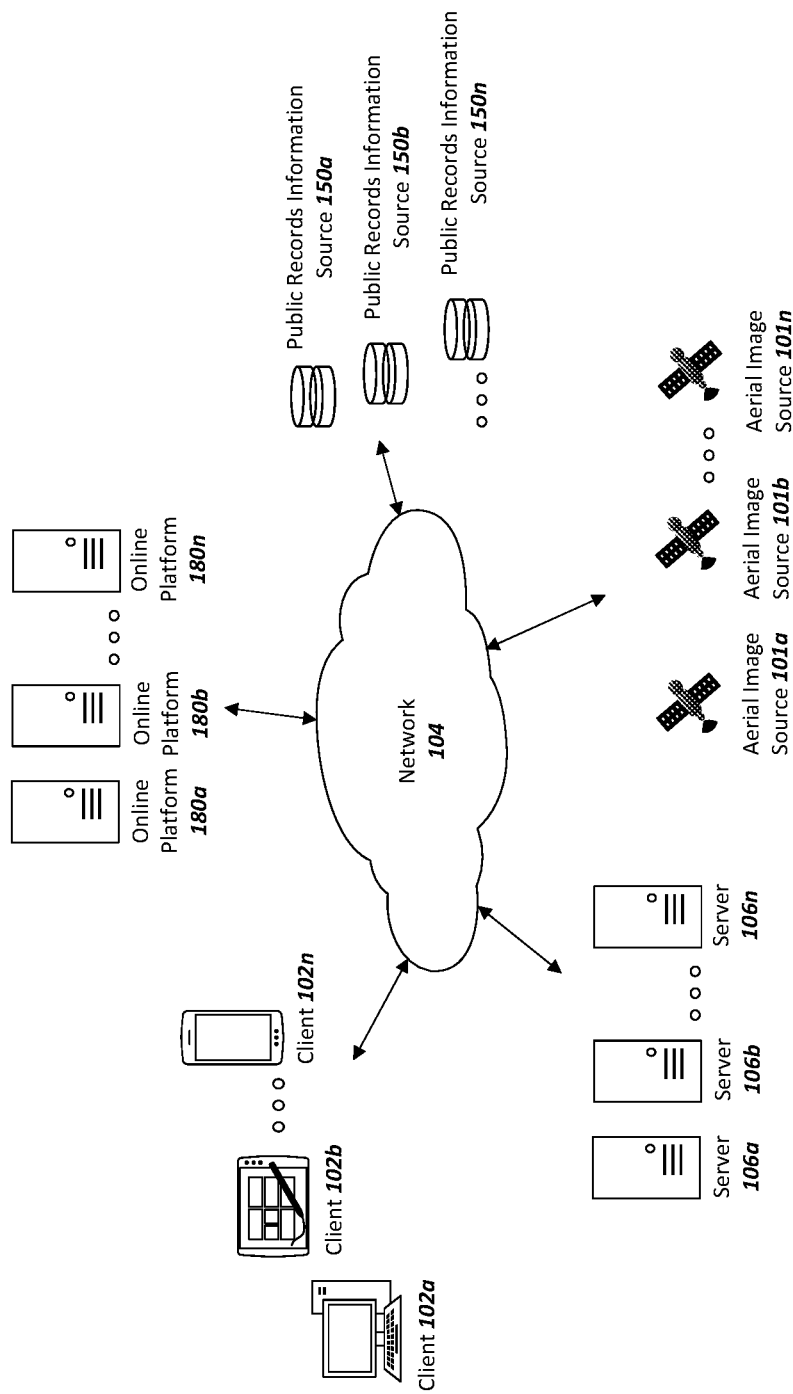
FIG. 1A is a block diagram depicting an embodiment of a network environment comprising client devices in communication with online platform devices, public records information source devices, aerial image source devices, and server devices, according to some embodiments.

The utility of an online platform relating to energy infrastructure (EI) and associated resources or services is naturally reliant upon the timely availability of accurate and up-to-date information regarding the status of the EI development or activity in a given geographical area. Not only is such information required as an input to drive the platform, it is also more generally of significant interest to a variety of industry players. For example, in the context of the oil and gas industry, information on where drilling is occurring or is about to occur, and which parties are involved, may be used by suppliers of resources, equipment and services to identify upcoming customer opportunities, by financial analysts and institutions to predict market dynamics, or by oilfield operators for competitive intelligence purposes.

The timely and accurate identification of EI features and their current status is fundamental in enabling the above. However, regions in which such EI features may exist (for example areas of oilfield exploration), often span large geographical areas, leading to correspondingly large costs and effort to maintain associated data that is both timely and accurate. For example, in the oil and gas industry, identifying frac-water pits (a storage pit for water), their water levels and surface owners via manual investigation such as driving to sites and performing visual inspections is time intensive and the data becomes quickly outdated. An alternative option is to perform human analysis of suitable aerial imagery of the relevant area, for example using satellite image data. However, these processes are again manually-intensive, time consuming, and costly, leading to outdated and potentially-erroneous data. Furthermore, satellite images of sufficient resolution and quality for a human to unequivocally detect a feature in a single review are prohibitively costly. Yet further alternative methods may attempt to track upcoming EI activity (such as the commencement of oilfield drilling) solely via permit data from government agencies. However, some regions may not have permit requirements for certain types of energy resource exploration or EI development, and even where permit data is available, this is often already outdated by the time it becomes of public record. The disclosure herein provides a technical solution to these problems and describes a system and methods for timely, efficient, reliable, automated and cost-reduced identification of EI features and status. The technical solutions described herein further provide novel image processing methods and techniques tailored to the identification of EI features and status.

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods that provide the technical solution of r timely, efficient, reliable, automated and cost-reduced identification of EI features and status.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In a brief overview, the network environment may include one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106), one or more online platforms 180a-180n (also generally referred to as online platforms(s) 180, platform node(s) 180, platform machine(s) 180, or remote online platform machine(s) 180), one or more public records information source 150a-150n (also generally referred to as public records information source(s) 150, record node(s) 150, record machine(s) 150, or remote record machine(s) 150), and one or more aerial image sources 101a-101n (also generally referred to as aerial information source(s) 101, image source(s) 101, image source machine(s) 101, or remote image source machine(s) 101) via one or more networks 104. In some embodiments, one or more of client 102, online platform 180, or public records information source 150 has the capacity to function as both a node seeking access to resources provided by a server and as a server providing access to hosted resources for other clients 102a-102n, online platforms 180a-180n, and public records information sources 150a-150n. Examples of client(s) 102 includes user(s) 190 and subscriber(s) 195.

Although FIG. 1A shows a network 104 between clients 102, online platforms 180, public records information source 150, aerial image source 101 and the servers 106, in examples clients 102, online platforms 180, public records information source 150, aerial image source 101 and servers 106 may be on the same network 104. In some embodiments, there are multiple networks 104 between clients 102, online platforms 180, public records information source 150, aerial image source 101 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks. Servers 106 may be used to generically refer to all of online platforms 180, public records information source 150, aerial image source 101, and servers 106. Clients 102, online platforms 180, and public records information source 150 may process input from server 106 and/or may provide access as needed to various applications, modules, and other software components of server 106 to other various applications, modules, and other software components of server 106.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g., Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv4), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Washington), while one or more of the other servers 104 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 104 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106, online platform 180, public records information source 150, and aerial image source 101 may be a file server, application server, web server, proxy server, appliance, network appliance, gateway, gateway server, virtualization server, deployment server, SSL VPN server, or firewall. In one embodiment, a plurality of servers 106, online platforms 180, public records information sources 150, and aerial image sources 101 may be in the path between any two communicating servers 106, online platforms 180, public records information sources 150, or aerial image sources 101.

Figure 1B:
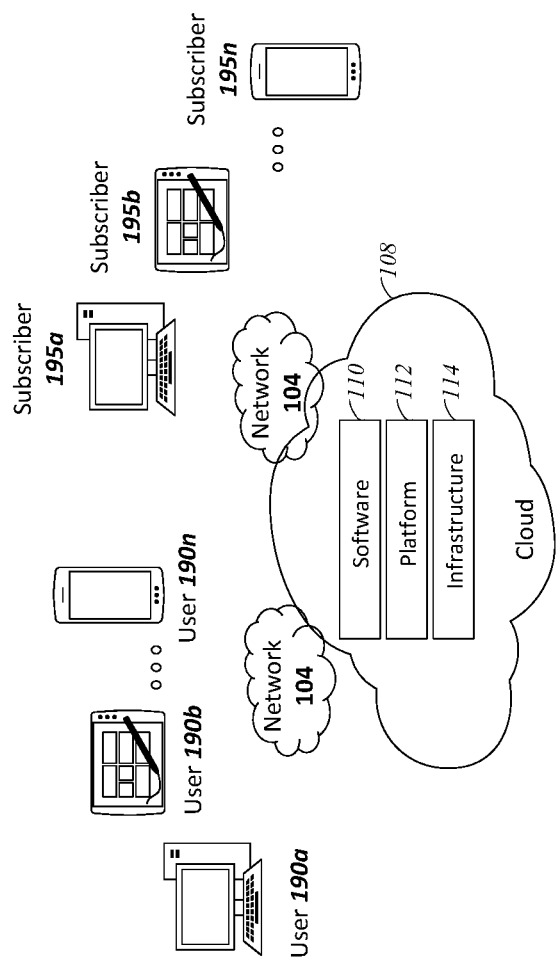
FIG. 1B is a block diagram depicting a cloud computing environment comprising client devices, for example user device and subscriber device, in communication with cloud service providers, according to some embodiments.

Referring to FIG. 1B, a cloud computing environment is depicted. A cloud computing environment may provide user 190 and subscriber 195 with one or more resources provided by a network environment. The cloud computing environment may include one or more users 190a-190n and one or more subscribers 195a-195n in communication with the cloud 108 over one or more networks 104. Users 190 and subscribers 195 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for user 190 or subscriber 195. The cloud 108 may include back end platforms, e.g., servers 106, storage, server farms or data centers.

The cloud 108 may be public, private, or hybrid. Public clouds may include public servers 106 that are maintained by third parties to client(s) 102, for example user(s) 190 and subscriber(s) 195 or owners of client(s) 102, user(s) 190, and/or subscriber(s) 195. The servers 106 may be located off-site in remote geographical locations as disclosed above or otherwise. Public clouds may be connected to the servers 106 over a public network. Private clouds may include private servers 106 that are physically maintained by client(s) 102, for example user(s) 190 and/or subscriber(s) 195 or owners of client(s) 102, user(s) 190, and/or subscriber(s) 195. Private clouds may be connected to the servers 106 over a private network 104. Hybrid clouds may include both private and public networks 104 and servers 106.

Cloud 108 may also include a cloud-based delivery, e.g., Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California. PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g., Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Client(s) 102, for example user(s) 190 and/or subscriber(s) 195 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Client(s) 102, for example user(s) 190 and/or subscriber(s) 195 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Client(s) 102, for example user(s) 190 and/or subscriber(s) 195 may access SaaS resources through the use of web-based user interfaces, provided by a web browser (e.g., Google Chrome, Microsoft Internet Explorer, or Mozilla Firefox provided by Mozilla Foundation of Mountain View, California). Client(s) 102, for example user(s) 190 and/or subscriber(s) 195 may also access SaaS resources through smartphone or tablet applications, including e.g., Salesforce Sales Cloud, or Google Drive App. Client(s) 102, for example user(s) 190 and/or subscriber(s) 195 may also access SaaS resources through the client operating system, including e.g., Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client(s) 102, for example user(s) 190 and/or subscriber(s) 195 and server 106 may be deployed as and/or executed on any type and form of computing device, e.g., a computer, network device or appliance capable of communicating on any type and form of network and performing the operations described herein.

Figure 1C:
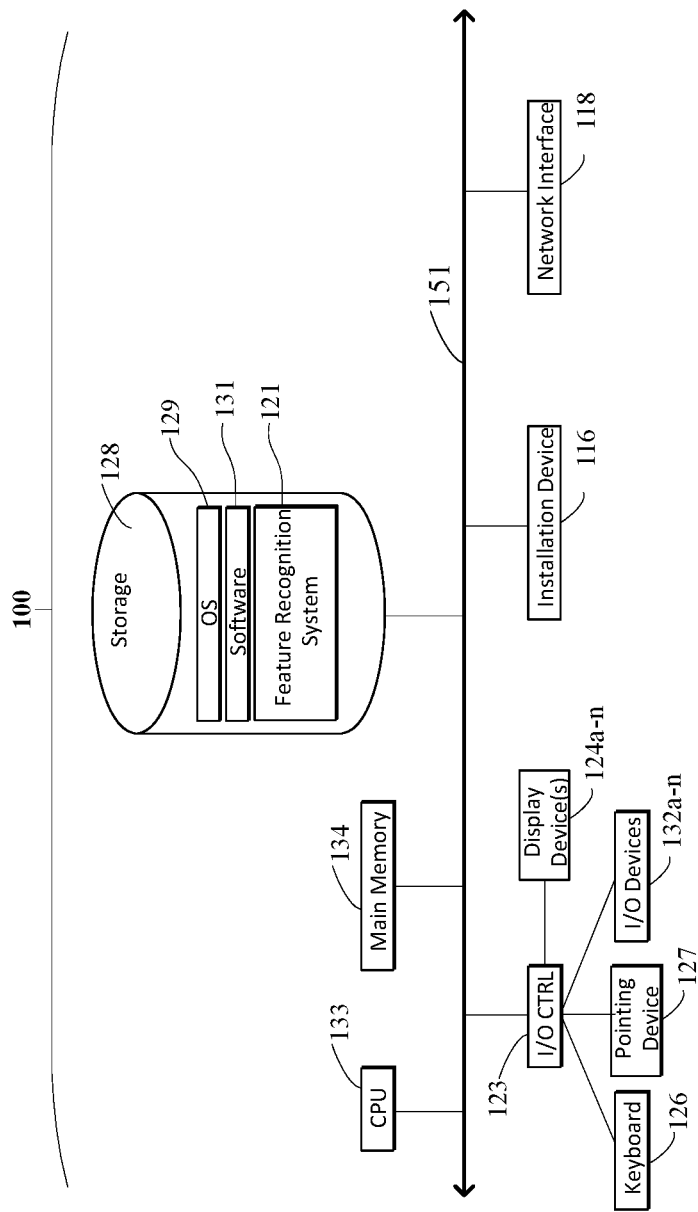
FIGS. 1C and 1D are block diagrams depicting embodiments of computing devices useful in connection with the methods and systems described herein.
Figure 1D:
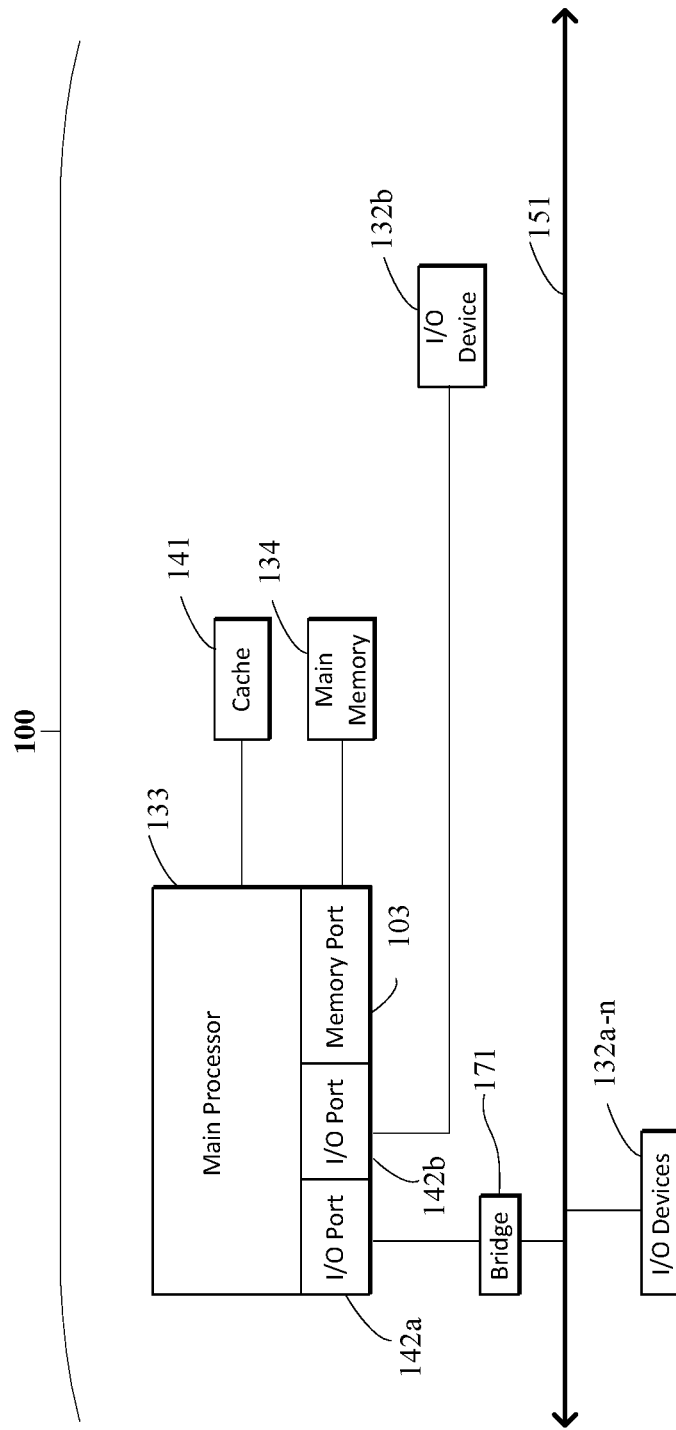

FIGS. 1C and 1D depict block diagrams of a computing device 100 useful for practicing an embodiment of the client 102, online platform 180, public records information source 150, aerial image source 101 and the server 106. As shown in FIGS. 1C and 1D, each computing device 100 includes a central processing unit 133, and a main memory unit 134. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system 129, software 131, and a software of a feature recognition system 121. As shown in FIG. 1D, each computing device 100 may also include additional optional elements, e.g., a memory port 103, a bridge 171, one or more input/output devices 132a-132n (generally referred to using reference numeral 132), and a cache memory 141 in communication with the central processing unit 133.

The central processing unit 133 is any logic circuitry that responds to and processes instructions fetched from the main memory unit 134. In many embodiments, the central processing unit 133 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER4 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 133 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i4.

Main memory unit 134 may include on or more memory chips capable of storing data and allowing any storage location to be directly accessed by the microprocessor 133. Main memory unit 134 may be volatile and faster than storage 128 memory. Main memory units 134 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 134 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 134 may be based on any of the above described memory chips, or any other available memory chips capable of operating as described herein. In the embodiment shown in FIG. 1C, the processor 133 communicates with main memory 134 via a system bus 151 (described in more detail below). FIG. 1D depicts an embodiment of a computing device 100 in which the processor communicates directly with main memory 134 via a memory port 103. For example, in FIG. 1D the main memory 134 may be DRDRAM.

FIG. 1D depicts an embodiment in which the main processor 133 communicates directly with cache memory 141 via a secondary bus, sometimes referred to as a backside bus. In other embodiments, the main processor 133 communicates with cache memory 141 using the system bus 151. Cache memory 141 typically has a faster response time than main memory 134 and is typically provided by SRAM, BSRAM, or EDRAM. In the embodiment shown in FIG. 1D, the processor 133 communicates with various I/O devices 132 via a local system bus 151. Various buses may be used to connect the central processing unit 133 to any of the I/O devices 132, including a PCI bus, a PCI-X bus, or a PCI-Express bus, or a NuBus. For embodiments in which the I/O device is a video display 124, the processor 133 may use an Advanced Graphic Port (AGP) to communicate with the display 124 or the I/O controller 123 for the display 124. FIG. 1D depicts an embodiment of a computer 100 in which the main processor 133 communicates directly with I/O device 312b or other processors 133' via HYPERTRANSPORT, RAPIDIO, or INFINIBAND communications technology. FIG. 1D also depicts an embodiment in which local busses and direct communication are mixed: the processor 133 communicates with I/O device 132a using a local interconnect bus while communicating with I/O device 132b directly.

A wide variety of I/O devices 132a-132n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 132a-132n may include a combination of multiple input or output (I/O) devices, including, e.g., Microsoft KINECT, Nintendo Wiimote for the WII, Nintendo WII U GAMEPAD, or Apple iPhone. Some I/O devices 132a-132n allow gesture recognition inputs through combining some of the inputs and outputs. Some I/O devices 132a-132n provide for facial recognition which may be utilized as an input for different purposes including authentication and other commands. Some I/O devices 132a-132n provide for voice recognition and inputs, including, e.g., Microsoft KINECT, SIRI for iPhone by Apple, Google Now or Google Voice Search, and Alexa by Amazon.

Additional I/O devices 132a-132n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXEL SENSE or Multi-Touch Collaboration Wall, may have larger surfaces, such as on a table-top or on a wall, and may also interact with other electronic devices. Some I/O devices 132a-132n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation device 116 for the computing device 100. In still other embodiments, the computing device 100 may provide USB connections (not shown) to receive handheld USB storage devices. In further embodiments, a I/O device 132 may be a bridge between the system bus 151 and an external communication bus, e.g., a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 132a-132n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the feature recognition system software 121. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 151. Some storage device 128 may be external and connect to the computing device 100 via an I/O device 132 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 100 communicates with other computing devices 100' via any type and/or form of gateway or tunneling protocol e.g., Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1C and 1D may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 4, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 340 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M9A/AAC, WMA Protected AAC, AIFF, Audible audiobook, Apple Lossless audio file formats and .mov, .m4v, and .mp4 MPEG-4 (H.244/MPEG-4 AVC) video file formats.

In some embodiments, the computing device 100 is a tablet e.g., the IPAD line of devices by Apple; GALAXY TAB family of devices by Samsung; or KINDLE FIRE, by Amazon.com, Inc. of Seattle, Washington. In other embodiments, the computing device 100 is an eBook reader, e.g., the KINDLE family of devices by Amazon.com, or NOOK family of devices by Barnes & Noble, Inc. of New York City, New York.

In some embodiments, client 102 includes a combination of devices, e.g., a smartphone combined with a digital audio player or portable media player. For example, one of these embodiments is a smartphone, e.g., the iPhone family of smartphones manufactured by Apple, Inc.; a Samsung GALAXY family of smartphones manufactured by Samsung, Inc; or a Motorola DROID family of smartphones. In yet another embodiment, client 102 is a laptop or desktop computer equipped with a web browser and a microphone and speaker system, e.g., a telephony headset. In these embodiments, the client(s) 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Timely, Efficient, Reliable, Automated and Cost-Reduced Identification of Energy Infrastructure (EI) Features and Status Systems and Methods The following describes systems and methods that are useful for timely, efficient, reliable, automated and cost-reduced identification of EI features and status. Timely and accurate identification of EI features and their status is fundamental in enabling a platform for the exchange of resources and services necessary for EI development and energy harvesting or production.

The term EI "feature" is used extensively in this disclosure to refer to a constituent component of energy infrastructure. For example, in the context of the oil and gas industry, an EI feature may be a component of infrastructure at an existing or potential drilling or hydraulic fracturing oilfield site, whereas in the context of the solar industry, an EI feature may be a solar panel, or a solar panel array at a solar power station. An EI "site", such as an existing or potential drilling or hydraulic fracturing oilfield site, or a solar or wind-power station, may comprise a concentration or a plurality of EI features within a given locale, for example, each serving a purpose or function to enable operations at that site. An EI feature is associated with a geographical location at which it is located and may further be associated with an EI feature type and/or an EI feature status attribute. EI features of numerous types are discussed within this disclosure. In the context of the oil and gas industry, EI feature types may include for example, a well pad, a frac-water pit, a rig, a tank battery and so forth. In the context of the solar energy industry, EI feature types may include for example, a solar panel array, a power conditioning substation, or a security fence. Further examples of EI feature types may be found in Table 2. EI feature status attributes may be indicative of a status of a particular aspect of an EI feature at the associated geographical location. Numerous EI feature status attributes are also discussed within this disclosure, and may include for example, an area or size, a fluid level or volume, a number of sub-parts, an ownership and so forth. Further examples of EI feature status attributes may be found in Table 3. In the context of this disclosure, an "EI feature" may be identified as the result (i.e., using the output-of) of an image processing operation. The image processing operation may further classify an identified EI feature as being of a particular EI feature type.

Aspects of this disclosure also relate to image processing using Artificial Intelligence (AI). The term "feature" as used in the AI image processing discipline may sometimes be used in reference to particular image content within an input image to be processed. Whilst such an "input image content feature" may, in the context of this disclosure, be related to an "EI feature" (for example, an input image may contain image content depicting an oilfield well pad), the two terms are not synonymous as the former may relate to a feature within images input to an AI image processing function, whilst the latter may refer to a component of energy infrastructure at an EI site that may be identified as a result of an AI image processing function.

System Overview

Figure 2A:
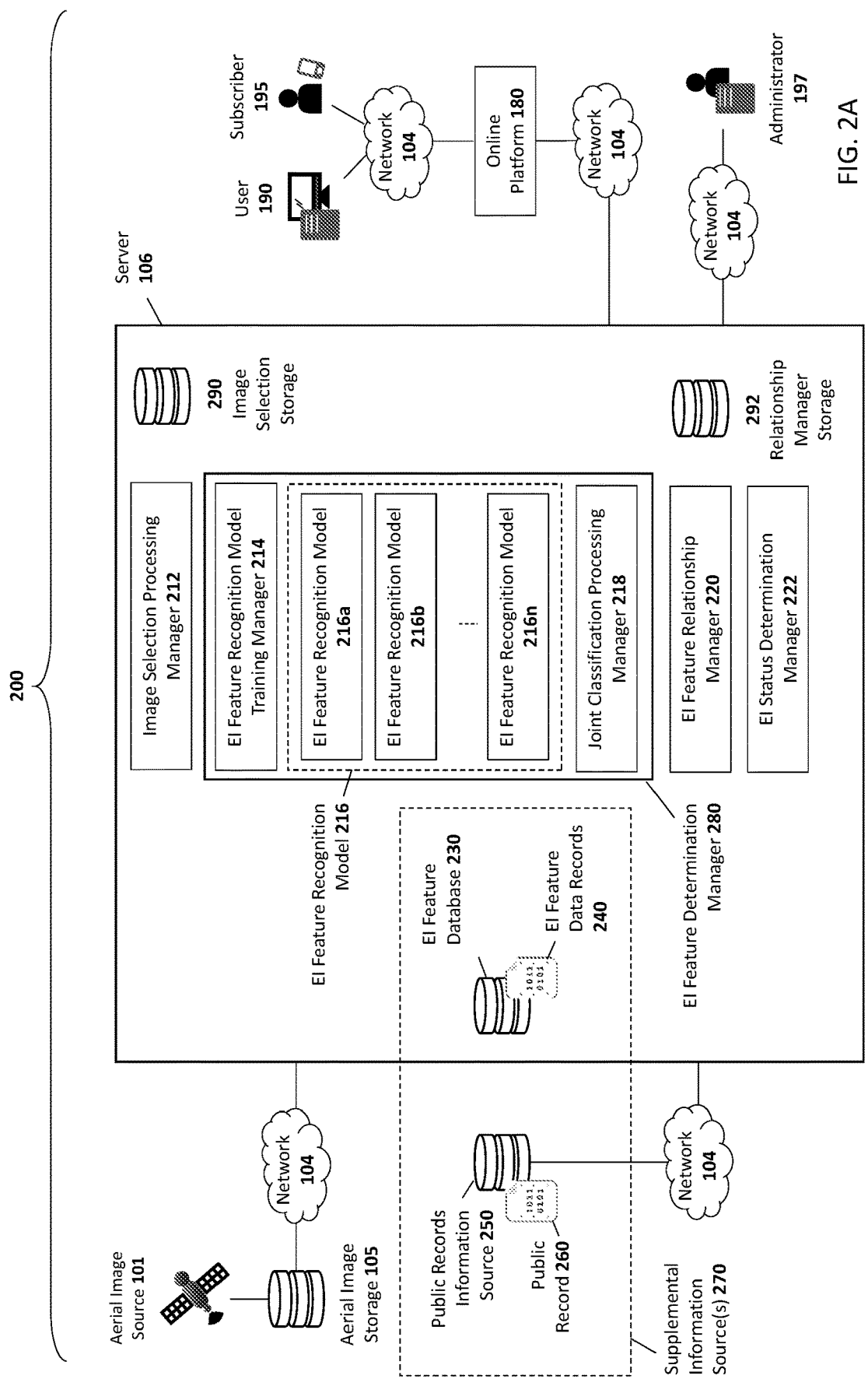
FIG. 2A shows a system suitable for processing aerial images and for providing EI feature and EI site status information to an online platform, according to some embodiments.

In a general overview, FIG. 2A shows a system 200 which is configured to use image processing to automatically scan aerial images captured by aerial image source 101 to identify EI features and EI site activity or status, and which is configured for presenting the information thereby obtained to users 190 and subscribers 195 of online platform 180. Aerial image source 101 may be a satellite or any other suitable overhead imaging device.

Referring to FIG. 2A in more detail, in some embodiments, system 200 may include image selection processing manager 212. Image selection processing manager 212 may be configured to select one or more aerial images of a portion of global terrain from a set of available aerial images, and to provide the selected images (such as those shown as selected image(s) 215 in FIG. 2B) to, for example, EI feature determination manager 280, for onward processing. Image selection processing manager 212 may further be configured to store selected images in image selection storage 290.

The set of available aerial images from which image selection processing manager 212 may select may comprise any suitable aerial images, such as may be obtained from aerial image source 101, aerial image storage 105, or image selection storage 290. Image selection processing manager 212 may be configured to communicate either directly, or over a network 104, with aerial image storage 105, aerial image source 101 or image selection storage 290. Image selection processing manager 212 may also be configured to communicate with EI feature determination manager 280.

Images stored by image selection processing manager 212, for example in image selection storage 290, may also be subdivided into training images and working images. Other subdivisions, groupings, labelling or categorizations of the images selected or stored by image selection processing manager 212 are also possible, such as may be based on for example, location, image resolution, image format, image capture device and so on. However, for ease of explanation, image selection processing manager 212 may in general be configured to provide one or more training image 310 and/or one or more working image 312 to other components of server 106, such images sourced from any suitable aerial image source such as aerial image source 101, aerial image storage 105, or image selection storage 290. Image selection processing manager 212 may be an application, service, daemon, routine, or other executable logic for selecting, analyzing, and processing aerial images.

EI feature determination manager 280 may be configured to process aerial images, such as those selected by image selection processing manager 212 or those stored in image selection storage 290, in order to determine information on EI features. In doing so, EI feature determination manager 280 may be configured to comprise one or more EI feature recognition models 216, such as those depicted in FIG. 2A as 216a, 216b, . . . 216n. In examples, EI feature determination manager 280 may communicate with image selection processing manager 212, EI feature relationship manager 220, EI status determination manager 222, image selection storage 290, EI feature database 230, public records information source 250 or relationship manager storage 292.

In some examples, EI feature recognition model 216 may communicate with EI feature recognition model training manager 214, image selection processing manager 212, joint classification processing manager 218, EI feature relationship manager 220, EI status determination manager 222, image selection storage 290, EI feature database 230, public records information source 250 or relationship manager storage 292. In embodiments, EI feature recognition model 216 may be configured to use artificial intelligence based on, for example, a neural network or other type of machine learning. In examples, EI feature determination manager 280 or EI feature recognition model 216 may be configured to combine artificial intelligence and image processing with information from one or more supplemental information sources 270, to identify for example i) the presence (or change thereof) of an EI feature, and its classification or type or ii) one or more status attributes (or change thereof) associated with an EI feature. Such identified information is termed hereon EI 'feature-level' information (for example, as shown as EI feature-level information 282 in FIG. 2B) and may be stored in EI feature database 230 or provided to online platform 180, for example, via network 104. EI feature-level information may include, for example, information about a presence, type, or status of an identified EI feature (e.g., an oilfield frac-water pit or drilling rig, see Table 2 for further examples). The supplemental information from the one or more supplemental information sources 270, and which be used to assist in the identification of the EI feature information, may include non-image based information about aspects of an EI site or EI feature.

One or more EI feature recognition models 216 may be configured to operate in training mode or working mode. In training mode, the EI feature recognition model 216 may be supplied with one or more training images 310 (for example, from image selection processing manager 212) and with supplemental information that may be known a-priori. Such supplemental information may be obtained from an EI feature database 230 or from public records information source 250. In working mode, the EI feature recognition mode 216 may be supplied with one or more working images 312 (for example, from image selection processing manager 212). EI feature recognition model 216 may also be configured to use supplemental information (such as from EI feature database 230 or from public records information source 250) during working mode to improve its accuracy and its ability to recognize EI features.

EI feature recognition model 216 may be an application, service, daemon, routine, or other executable logic for applying artificial intelligence and/or machine learning to analyze data inputs to provide EI feature-level information. In a training mode of operation, the EI feature recognition model 216 may be trained to associate image content within a training image with EI features and EI feature types known to be present within the training image. Training images include aerial images of global terrain that may contain identified EI features of identified EI feature types. In the training mode of operation, the EI feature recognition model 216 may establish associations between image content within the training image, EI features and EI feature types. The image content may comprise pixel values (e.g., color, hue, intensity, saturation, etc.) or other image-based informational content encoded or otherwise represented within the training image. In a working mode of operation, the EI feature recognition model 216 may then be configured for application to one or more working images to identify EI features and EI feature types within the working image. Working images include aerial images of global terrain that may contain unidentified EI features of EI feature types. The EI feature recognition model 216 is configured to apply, to the working images, its previously-learned associations between image content, EI features and EI feature types. Based on image content of the working images, the EI feature recognition model 216 identifies EI features and EI feature types. In some examples, EI feature recognition model 216 is configured to provide a confidence level associated with one or more components of the EI feature-level information obtained as a result of its operation. A confidence level may represent a surety or confidence of the model in the identification of the EI feature-level information. For example, a confidence level may indicate a percentage confidence that an identification is correct.

In some examples, system 200 may include EI feature recognition model training manager 214, for example comprised within EI feature determination manager 280. EI feature recognition model training manager 214 may communicate with image selection processing manager 212 and EI feature recognition model 216 and may have access to EI feature data records 240 which may be stored in EI feature database 230. EI feature recognition model training manager 214 may have access to one or more supplemental information sources 270. In embodiments, EI feature recognition model training manager 214 may have access to public records 260 which may be stored in public records information source 250, and/or access to EI feature data records 240 which may be stored in EI feature database 230. EI feature recognition model training manager 214 may communicate with EI status determination manager 222 and may share information with online platform 180 via network 104.

In embodiments, EI feature recognition model training manager 214 may be configured to train one or more EI feature recognition models 216a, 216b . . . 216n. Artificial intelligence models may be of a variety of types, for example linear regression models, logistic regression models, linear discriminant analysis models, decision tree models, naïve bayes models, K-nearest neighbors models, learning vector quantization models, support vector machines, bagging and random forest models, and deep neural networks. In general, all AI models aim to learn a function which provides the most precise correlation between input values (X) and output values (Y):

$$Y=f(X)$$

In general, EI feature recognition model training manager 214 trains one or more EI feature recognition models 216a, 216b . . . 216n using historic sets of inputs (X) and outputs (Y) that are known to be correlated. For example, in a linear regression AI model represented by the expression:

$$Y=B_0 \times B_1 X$$

A set of n historical data points $(X_i, Y_i)$ are used to estimate the values for $B_0$ and $B_1$, for example:

$$B_1 = \frac{\sum_{i=1}^{n} ((X_i - \bar{X}_i) \times (Y_i - \bar{Y}_i))}{\sum_{i=1}^{n} (X_i - \bar{X}_i)^2}$$

$$B_0 = \bar{Y}_i - B_1(\bar{X}_i)$$

Parameters $B_0$ and $B_1$ may be considered coefficients of the AI model. The model with these initial coefficients is then used to predict the output of the model $Y_{i,M}$ given the set of historic inputs $X_i$. Thus, $Y_{i,M}$ corresponds to a derived output of the model given $X_i$ and may differ to a known (or "correct") output for input $X_i$. The error of these predictions may be calculated using Root Mean Square Error (RMSE), for example:

$$RMSE = \sqrt{\sum_{i=1}^{n} \frac{(Y_{i,M} - Y_i)^2}{n}}$$

EI feature recognition model training manager 214 then adjusts the coefficients $B_0$ and $B_1$ to minimize the RMSE over multiple historical data sets $(X_i, Y_i)$. Different types of AI models use different techniques to adjust the weights (or values) of various coefficients, in general by using historical data sets that are correlated in the way that the model is trying to predict in new data sets by minimizing the predicted error of the model when applied to the historical data sets.

EI feature recognition model training manager 214 may be an application, service, daemon, routine, or other executable logic for creating, training, and/or updating EI feature recognition models.

In training mode, EI feature recognition model training manager 214 may be configured to use training images, for example from image selection processing manager 212 or image selection storage 290, and supplemental information from one or more supplemental information source(s) 270 to create, update or modify EI feature recognition model 216.

In some examples, training images are identified through finding a current EI feature of interest (e.g., one for which its presence is certain) in a portion of global terrain. Historical images of the same area of terrain are gathered from aerial image storage 105. These historical images are then used as training images. In some examples, EI feature recognition model training manager 214 may be configured to use historical images of a known EI feature to update a structure, weights, coefficients, parameters, variables, thresholds or probabilities associated with a neural network associated with EI feature recognition model 216. For example, when the presence of an EI feature is confirmed, for example by a site visit, a permit, or other method with a high degree of certainty, EI feature recognition model training manager 214 may obtain historical images of the same portion of global terrain in which the EI feature was confirmed in order to update the model. In some examples, EI feature recognition model training manager 214 may be configured to update a machine learning algorithm associated with EI feature recognition model 216. EI feature recognition model 216 obtained by use of EI feature recognition model training manager 214 may be configured to subsequently operate in working mode, for example to identify and classify EI features within one or more working images.

In some examples, system 200 may include joint classification processing manager 218, for example comprised within EI feature determination manager 280. Joint classification processing manager 218 may be configured to process information on both a first and a second EI feature together with information on a relationship between the first and second EI features, in order to identify or improve an identification of the first EI feature.

In some examples, joint classification processing manager 218 may be configured to communicate with one or more EI feature recognition models 216a, 216b, . . . 216n, with EI feature relationship manager 220, with relationship manager storage 292, and/or with EI feature database 230. In some examples, joint classification processing manager may be configured to communicate EI feature-level information obtained as a result of its operation to EI feature database 230 for subsequent storage.

Joint classification processing manager 218 may be an application, service, daemon, routine, or other executable logic for identifying EI features.

System 200 may be configured to comprise one or more supplemental information source 270 comprising supplemental information. In examples, supplemental information may comprise EI feature information, such as may, for example, be stored within EI feature database 230 in the form of one or more EI feature data records 240. In other examples, supplemental information may comprise one or more public records 260, such as may, for example, be stored within a public records information source 250. Whilst the term 'public' is used within system 200 description in relation to items 250 and 260, it shall be appreciated that this is an exemplar and does not limit the scope of the description to public availability of the information contained therein, and that other equivalent or similar information sources, whether private or public, freely available or available at a cost, may be equally suitable for use within system 200. More generally, examples of supplemental information types that may be obtained from one or more supplemental information sources 270 and which may be used by system 200 are given in Table 1.

TABLE 1

Examples of Supplemental Information

| | |
|---|---|
| Oilfield Permits | Drilling permits or permit filings, spud reports, and completion reports for oil and gas wells, water wells and disposal wells |
| Easements | Easement and permit records related to public and private land and road crossings |
| Building permits | Permits or consents for EI feature construction or for non-EI features |
| Energy Infrastructure development proposals, consents or reports | Development applications, plans, consents, consultation reports, environmental study reports and other documentation associated with Energy Infrastructure development |
| Maps | Pipeline maps, roadmaps, stormwater management maps |
| Deeds | Surface (land) ownership and lease records |
| Prospective land transactions | Announcements of the availability of public or private land for sale, or applications to acquire public or private land |
| Land use proposals or consents | Proposals or consents for change of land use |
| Mineral Rights | Mineral (subterranean) ownership and lease records |
| Contracts | Commercial contract announcements, bidding invitation announcements, information on energy supply agreements |
| News and Media | News feeds, recruitment announcements, marketplace listings |
| Seismology Information | Seismology records and well logs |
| Field Data | Data collected from the field (such as from phone calls, site visits and reports) |
| Weather Data | Current, historical or forecast weather conditions at a location |
| Legal information | Legal notices, court filings |
| GPS and Location Information | Truck or truck driver GPS coordinates from a tracking device or phone |
| Sensor Data | Data from sensors to monitor any component of energy infrastructure or to provide any other or potentially-related information such as seismic activity, weather data, or the location or movement of vehicles, equipment, resources or supplies |
| Hydrological Information | Hydrological studies and maps of surface water flows and groundwater aquifers |

System 200 may be configured such that supplemental information source(s) 270 may communicate with, connect to, or be accessed by other components of the system, for example, any of image selection processing manager 212, EI feature determination manager 280, EI feature recognition model training manager 214, joint classification processing manager 218, EI feature relationship manager 220, EI status determination manager 222, image selection storage 290 and relationship manager storage 292.

Figure 2B:
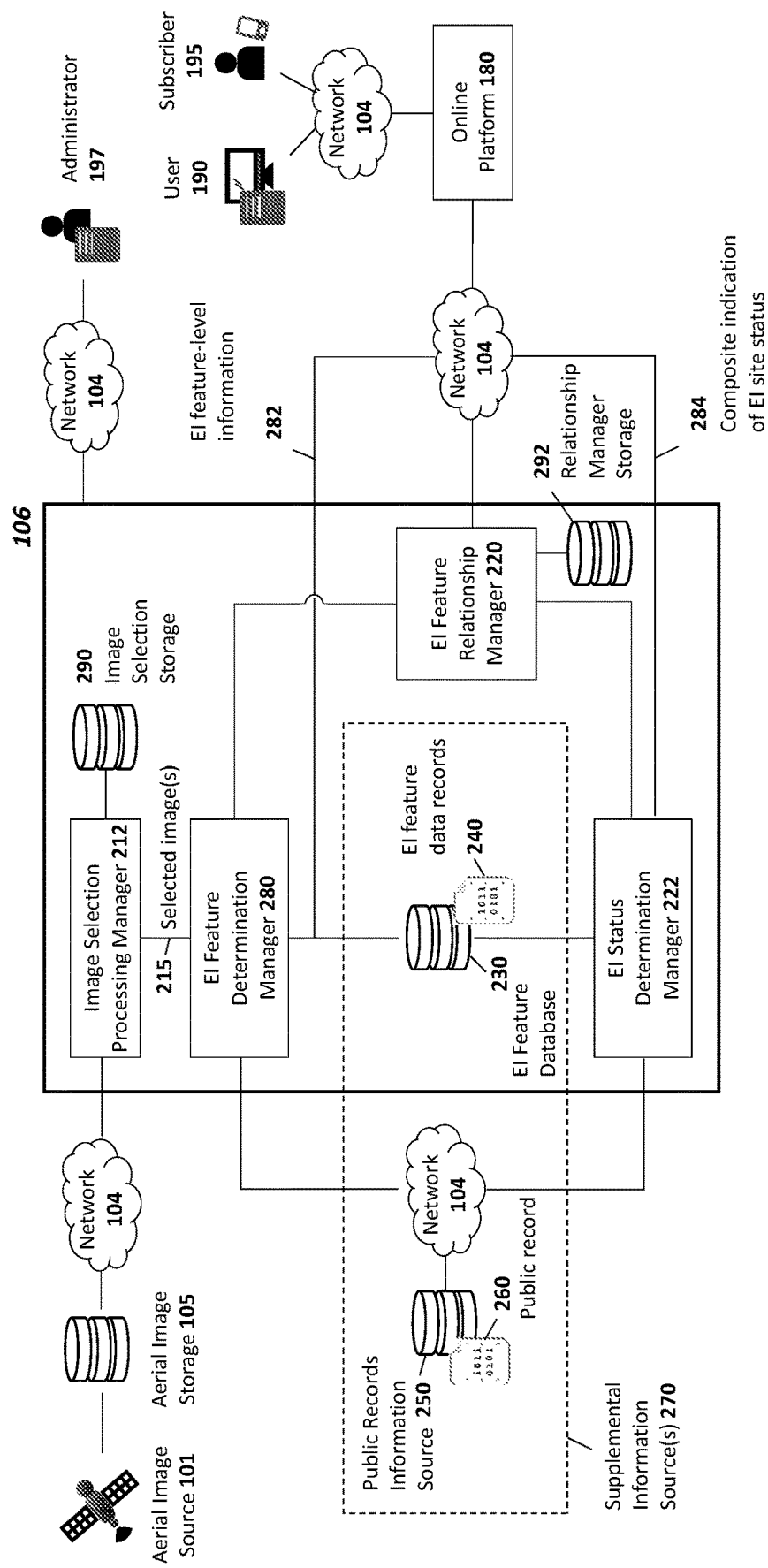
FIG. 2B shows an example configuration of a system for processing aerial images and for providing EI feature and EI site status information to an online platform, according to some embodiments.

In a further optional aspect, system 200 may comprise EI status determination manager 222, which may be configured to determine a composite indication of EI site status (for example, as shown as composite indication of EI site status 284 in FIG. 2B). EI status determination manager 222 may be configured to use, combine or aggregate one or more or a plurality of EI feature-level information 282 (in some examples stored in EI feature database 230 as EI feature data records 240) and supplemental information from supplemental information source(s) 270 (in some examples using either EI feature data records 240 or public records 260) in order to determine or predict activity related to energy infrastructure at a larger scale, for example activity at an EI site that encompasses multiple EI features. For example, EI status determination manager 222 may combine information, such as the determination of the presence of a clearing, a service road, and a frac-water pit all within a radius of 500 meters of a particular geographical location within an oilfield region, to generate a composite indication of EI site status 284 that an oilfield exploration site is under development at that location. In another example, a composite indication of EI site status 284 may be, for example, that an oilfield drilling site has developed to a stage at which all resources and components necessary to commence drilling are present, and hence drilling is likely to occur at the site within a specified timescale. The resources and components necessary to commence drilling may include for example, a frac-water pit, a drilling rig, pipeline infrastructure and tank batteries, and these may, in some examples, have been previously and individually identified at the EI feature level. In a further example, composite indication of EI site status 284 may be that construction of an electrical substation has been identified within 1000 m of a solar panel mounting frame arrangement spanning 5 hectares of land, thus indicating an increased level of site completion, and a need for solar panel installation services. Composite indication of EI site status 284 may be communicated to online platform 180 either directly, or via a network 104.

In some examples of system 200, EI status determination manager 222 may be configured to communicate with public records information source 250 (for example directly, or via a network 104), with EI feature database 230, with EI feature relationship manager 220, or with relationship manager storage 292.

EI status determination manager 222 may be an application, service, daemon, routine, or other executable logic for determining a composite indication of EI site status based on information related to a plurality of EI features.

In yet a further optional aspect, system 200 may comprise EI feature relationship manager 220, which may be configured to determine and store (for example in relationship manager storage 292) relationships between EI features, EI feature types, EI feature attributes, EI feature status, supplemental information, public records, and so on. In some examples, relationships between EI features may be known a priori, for example, in an oilfield context, sand mines, trucks, and proppant stores are related, as the sand that is extracted from a sand mine is trucked to a proppant store. In other examples, relationships between EI features are learned by EI feature relationship manager 220 over time, for example by determining that the appearance of two or more EI feature types are related. For example, EI feature relationship manager 220 may determine that within an oilfield region, clearings of a particular size and orientation are related to well pad development, for example as a leading indicator. In examples, EI feature relationship manager 220 may determine that the presence of oilfield pipeline infrastructure combined with a frac-water pit and a well pad are indicative of the imminent appearance of oilfield drilling rigs. In some examples, EI feature relationship manager 220 may comprise one or more neural network or other Artificial Intelligence and/or machine learning model configurable to learn inter-relationships between various EI features and aspects of EI site development. In other examples, EI feature relationship manager 220 may comprise pre-programmed or pre-configured inter-relationships between various EI features and aspects of EI site development. However-so-derived, the information on inter-relationships between various EI features and aspects of EI site development may be utilized in some examples by EI feature determination manager (for example, by joint classification processing manager 218) to improve the ability of the system to identify EI feature-level information 282, or by EI status determination manager 222 to improve the ability of the system to identify a composite indication of EI site status 284.

In some examples of system 200, EI feature relationship manager 220 may be configured to communicate with EI status determination manager 222, with relationship manager storage 292, with EI feature determination manager 280, or with joint classification processing manager 218.

EI feature relationship manager 222 may be an application, service, daemon, routine, or other executable logic for determining or providing information on inter-relationships between various EI features and aspects of EI site development.

In some examples, system 200 may include online platform 180. Online platform 180 may communicate with server 106, one or more users 190 or one or more subscribers 195 via one or more networks 104. In some embodiments, online platform 180 is arranged to receive EI feature-level information 282, composite indication of EI site status 284, or both from server 106. In examples, online platform may query server 106 to receive EI feature-level information 282 and/or composite indication of EI site status 284. In examples, server 106 may push EI feature-level information 282 and/or composite indication of EI site status 284 to online platform 180, for example when this information is updated or at predetermined times or intervals. In some embodiments, online platform 180 may be configured to access server 106 via an application programming interface (API). Access to server 106 by online platform 180 may be controlled, for example access may require a subscription, a username and password, or encryption keys. In some examples, information may be accessible on a free, paid or subscription basis, and may be presented in its raw form, a distilled form, or in a manner that is tailored to the specific requirements of—or format used by—the online platform, for example in an appropriately-formatted document or report. Server 106 may be part of a cluster of servers 106. In some embodiments, tasks performed by server 106 may be performed by a plurality of servers. These tasks may be allocated among the plurality of servers by an application, service, daemon, routine, or other executable logic for task allocation. Server 106 may include a processor and memory. Some or all of server 106 may be hosted on cloud 108, for example by Amazon Web Services (AWS, Amazon Inc., Seattle, WA) or by Oracle Cloud (Oracle, Redwood City, CA).

In some embodiments, online platform is configured to provide EI feature-level information 282, composite indication of EI site status 284, or both, to users 190 or subscribers 195 of online platform 180. Access to online platform 180 by users 190 and/or subscribers 195 may be controlled, for example access may require a subscription, a username and password, or encryption keys. In some examples, information may be accessible on a free, paid or subscription basis, and may be presented in its raw form, a distilled form, or in a manner that is tailored to the specific requirements of, or format used by the users 190 and/or subscribers 195, for example in an appropriately-formatted document or report.

Any of online platform 180, image selection processing manager 212, EI feature recognition model training manager 214, EI feature recognition model 216, joint classification processing manager 218, EI feature determination manager 280, EI feature relationship manager 220, and EI status determination manager 222 may, for example, be a desktop computer, a laptop computer, a mobile device, a server, or any other suitable computing device. Online platform 180, image selection processing manager 212, EI feature recognition model training manager 214, EI feature recognition model 216, joint classification processing manager 218, EI feature determination manager 280, EI feature relationship manager 220, and EI status determination manager 222 may comprise a program, service, task, script, library, application or any type and form of executable instructions or code executable on one or more processors. Any of online platform 180, image selection processing manager 212, EI feature recognition model training manager 214, EI feature recognition model 216, joint classification processing manager 218, EI feature determination manager 280, EI feature relationship manager 220, and EI status determination manager 222 may be combined into one or more modules, applications, programs, services, tasks, scripts, libraries, applications, or executable code.

In examples of system 200, the configuration and maintenance of server 106 may be controlled by administrator 197 who may access or control server 106 either directly or via a network 104. System 200 may be configured such that operations that may be performed by administrator 197 may include for example, the updating of software or firmware used by any component of the server, the configuring, receiving or processing of diagnostic reports or logs, the configuring of parameters, variables, or thresholds used by any component of the server, the reading or writing of data from any storage within server 106, or the performing of a direct communication or a communication via a network 104 with system components external to server 106.

Per the description of FIG. 2A, system 200 may be flexibly configured in a multitude of different ways. In order to illustrate such possibilities further, and by means of example only, FIG. 2B shows one potential configuration of system 200.

In FIG. 2B, aerial images are captured by aerial image source 101 and may be optionally stored in aerial image storage 105. Such aerial images may be provided to for example, image selection processing manager 212 of server 106, through either a direct connection or via a network 104. Server 106 may be controlled, configured or administered by administrator 197, who may be connected to server 106 directly or via a network 104. Image selection processing manager 212 may be configured to select particular aerial images from either aerial image source 101 or aerial image storage 105 for onward processing. Image selection processing manager 212 may optionally store selected images in, for example, image selection storage 290. Selected image(s) 215 comprising images selected by image selection processing manager 212, may be subdivided into aerial images for EI feature recognition model training purposes (hereon referred to as training images 310) and aerial images for EI feature identification purposes (hereon referred to as working images 312). Image selection processing manager 212 may provide selected aerial images 215 to EI feature determination manager 280, such images comprising for example, one or more training images 310 for EI feature recognition model training purposes and/or one or more working images 312 for EI feature identification purposes as shall further be described.

In the example system configuration of FIG. 2B, EI feature determination manager 280 may be configured to receive aerial images from image selection processing manager 212 or image selection storage 290, and optionally, may also be configured to receive supplemental information on EI features from one or more supplemental information sources 270. The information on EI features may comprise for example, one or more EI feature data records 240 from an EI feature database 230, or one or more public records 260 from a public records information source 250. EI feature determination manager 280 may be configured to operate on the received images and (if provided) on the supplemental information, in order to identify or classify EI features and to thereby determine EI feature-level information 282. EI feature determination manager 280 may apply one or more EI feature recognition models 216 to the received images to determine the EI feature-level information 282 by associating image content or other aspects of the received images with EI features or types. For example, EI feature determination manager 280 may apply an EI feature recognition model 216a to detect a clearing and an EI feature recognition model 216b to detect a road to the same set of received working images. In embodiments, EI feature determination manager 280 may receive supplemental information such as information that a permit to build a road within an oilfield region has been requested or granted, and based on the supplemental information, EI feature determination manager may apply an EI feature recognition model to a set of images to detect oilfield site activity that has a relationship with the presence of a road, for example the creation of a clearing. Optionally, to assist with this task, EI feature determination manager 280 may also comprise a joint classification processing manager 218 that may be configured to utilize information received from EI feature relationship manager 220. EI feature-level information 282 may be provided to EI feature database 230 where it may be stored for example in the form of one or more EI feature data records 240. Optionally, EI feature-level information 282 may also be provided to online platform 180, for example directly, or via a network 104, for potential onward use by users 190 or subscribers 195.

The example system configuration of FIG. 2B may further comprise an EI status determination manager 222 which may be configured to receive a plurality of EI feature-level information 282 such as may for example be stored in the form of EI feature data records 240 within EI feature database 230. In one particular example, each of the plurality of EI feature-level information 282 may relate to a different EI feature. EI status determination manager 222 may further be configured to receive information on an inter-relation between EI features from EI feature relationship manager 220 or relationship manager storage 292. EI status determination manager 222 may further be configured to receive supplemental information which may, for example, take the form of one or more public records from a public records information source 250.

In the example system configuration of FIG. 2B, EI status determination manager 222 may operate to process the information received from EI feature database 230, EI feature relationship manager 220 and optionally public records information source 250 to identify a composite indication of EI site status 284. Composite indication of EI site status 284 may be provided to online platform 180, for example directly, or via a network 104, for potential onward use by users 190 or subscribers 195. Further details, embodiments and methods shall become apparent from the following descriptions of additional figures.

EI Feature Classification

System 200 may be configured to recognize and classify EI features by processing aerial images of global terrain.

Figure 3A:
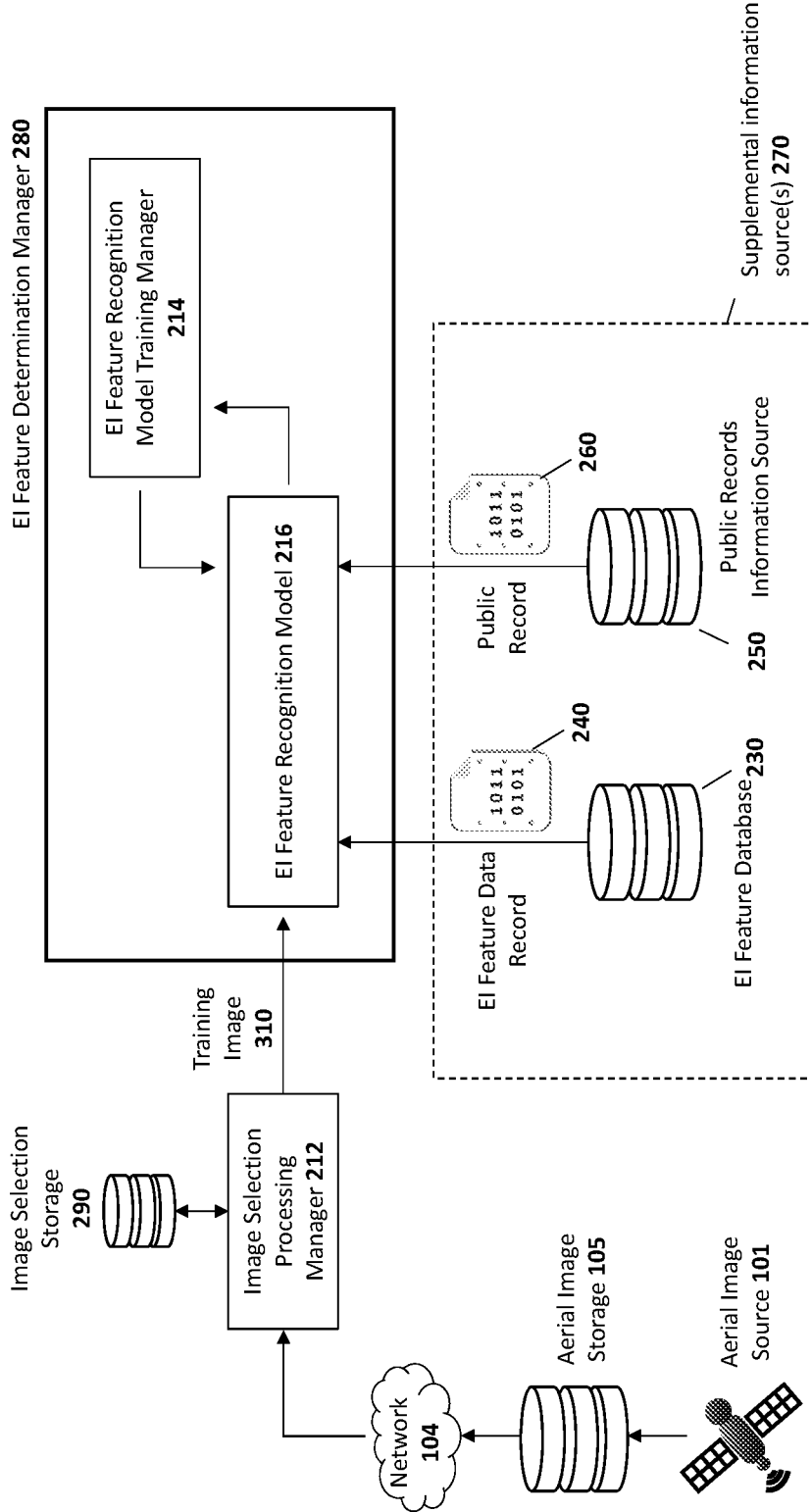
FIG. 3A shows a simplified block diagram of a system for training an EI feature recognition model in a training mode, according to some embodiments.

FIG. 3A illustrates an EI feature recognition model 216 in training mode of operation. One or more aerial image source(s) 101 may generate aerial images of global terrain. One or more of such images may optionally be stored in aerial image storage 105 and provided (via optional network 104) to image selection processing manager 212. Image selection processing manager may store aerial images in image selection storage 290. In some examples, a plurality of aerial images may be stored in image selection storage 290 and be classified as training images 310. Image selection processing manager 212 or image selection storage 290 may communicate with EI feature determination manager 280 or EI feature recognition model 216. EI feature recognition model 216 may receive or retrieve information from one or more supplemental information source(s) 270. EI feature recognition model 216 may access supplemental information sources 270 via a shared memory access, for example, or via a network. In some examples, training mode of operation is managed by EI feature recognition training manager 214. EI feature recognition training manager 214 may for example select training images, retrieve supplemental information, and change parameters of the model such as a structure, weights, coefficients, parameters, variables, thresholds or probabilities of EI feature recognition model.

In examples, applying the EI feature recognition model 216 includes recognizing from an image time-sequence, a stage of EI feature development across the image time-sequence. In embodiments, EI feature recognition model training manager 214 receives a training image comprising an image time-sequence, the image time-sequence including a plurality of aerial images of a portion of global terrain, each aerial image of the plurality taken at one of a respective plurality of image capture times. EI feature recognition model 216 or EI feature recognition model training manager 214 may receive, from a supplemental information source 270, information on EI features located within the portion of global terrain. In some examples, EI feature recognition model training manager 214 may generate an EI feature recognition model 216 according to the image time-sequence of the training image and the information on EI features located within the portion of global terrain, wherein the information on EI features located within the portion of global terrain identifies the appearance, presence-of or recording-of an EI feature at a historical time that is between the earliest and the latest of the plurality of image capture times. In some embodiments, EI feature recognition model training manager 214 may identify a pattern of stages of EI feature development across the time-sequence. Applying the trained EI feature recognition model may include recognizing a stage of EI feature development of the EI feature in the working image.

In some examples, EI feature recognition model 216 operating in a training mode of operation obtains one or more pieces of supplemental information from one or more supplemental information sources 270. Supplemental information source 270 may comprise EI feature data database 230 in which one or more EI data records 240 are stored. In embodiments, the supplemental information source 270 may comprise public records information source 250 in which one or more public records 260 are stored.

EI feature recognition model 216 may comprise artificial intelligence processing such as a neural network or other machine learning algorithm. During the training mode of operation, a structure, weights, coefficients, parameters, variables, thresholds or probabilities of the EI feature recognition model 216 are modified or updated by EI feature recognition model training manager 214 in order that over one or more iterations of such training, the ability of the EI feature recognition model 216 to identify or recognize EI features, to classify EI features as belonging to a given EI feature type, and/or to determine a status attribute of an EI feature, is improved. In this manner, and by using the information from supplemental information sources 270, system 200 is able to train one or more EI feature recognition models 216 without specific need for human supervision.

In some examples, EI feature recognition model 216 may be trained to recognize one or more of the following EI feature types (Table 2) and to classify these appropriately. The list is non-exhaustive.

TABLE 2

| Examples of EI feature Types | |
|---|---|
| Frac-water pits (also known as frac ponds or frac water impoundments) | These are typically man-made surface ponds or reservoirs used to store fresh or brackish water prior to its injection into an oilfield well, or flowback or produced water that may be returned from the oilfield well. |
| Well pads | Surface sites comprised of a leveled, usually-rectangular area used to seat machinery and equipment for oilfield drilling, completing, producing and maintaining oil and gas wells. |
| Drilling rigs | Machines and associated structures that perform the oilfield drilling. |
| Pipeline infrastructure | Fixed or temporary pipes to transport oil, gas or water. |
| Service roads | Roads, typically unpaved, that enable transport of equipment and resources to and from Energy Infrastructure sites or features, for example, in an oilfield context, to well pads or other oilfield facilities. |
| Clearings | Surface sites comprised of a leveled, often-rectangular area where the purpose of the site is not yet known. |
| Trucks | Vehicles used to transport resources, equipment and waste products to and from EI sites or service locations. These may be used, for example, for sand, chemical, cement, water or oil transport. |
| Tank batteries | A group of storage tanks connected to an oil or gas well or saltwater-disposal well to receive oil or water produced by an oilfield well. |
| Proppant stores | Proppant is a solid material, usually sand, that is injected into an oilfield well to help keep a newly-created fracture open. An example of a proppant store would be a sand pile amassed at an oilfield well pad prior to commencement of drilling. |
| Drilling reserve pits | Small reservoirs of water used for oilfield drilling muds and drill cuttings that are accumulated during oil and gas drilling operations. |
| Frac spreads | Large temporary gatherings of tanks, pressure pumps, trucks, pipes and other equipment and workers to fracture or "complete" a drilled |

TABLE 2-continued

Examples of EI feature Types

| | |
|---|---|
| | oilfield well and thereby commence oil and or gas production from the oilfield well. |
| Sand mines | An area where sand is extracted from the ground for use as proppant. |
| Producing wells | Drilled and completed oil and or gas wells that are now producing hydrocarbons. |
| Flare systems | Infrastructure to facilitate the burning of gas or oil at an oilfield site, for example during well production testing, for safety or emergency purposes or to manage waste production. Flare systems may comprise for example ground flares, elevated flares, flare stacks or associated pipes. |
| Solar panel mounts | Fixed or sun-tracking solar panel mounting frames, or associated foundations, piles, ballasts, earth screws or baseplates for the affixation of solar panels. |
| Solar panels | Power generation infrastructure comprising a panel surface, or array of panel surfaces for the collection of radiant light energy and its conversion to other forms, such as electricity. |
| Electrical substations | An installation or building comprising equipment for the conditioning or adaptation of electrical power signals, voltages or waveforms, for interconnection between power generation infrastructure and electrical power grids, or for power storage, metering, protection or isolation. |
| Security fences | A fence to protect and secure energy infrastructure sites or energy infrastructure features. |
| Buildings | Buildings or offices to house components of energy infrastructure, communications, monitoring or other equipment, resources, supplies, vehicles, workers or staff. |
| Cable systems | Cable, mounts, pylons, trenches and associated infrastructure for overhead, ground-level or subterranean transport of electrical energy. |
| Wind Energy Collectors | Power generation infrastructure associated with the collection of energy from wind and its conversion to other forms such as electricity, including tower structures, turbines, nacelles and rotors. |
| Meteorological Monitoring Equipment | Infrastructure and sensors to enabling the monitoring of meteorological conditions and processing of the associated data, comprising for example anemometers, thermometers, barometers, rain gauges, masts and data loggers. |
| Construction Equipment | Machinery or vehicles used to make clearings or to construct buildings or infrastructure, comprising for example, forestry equipment, cranes, earth movers, excavators, borers, forklifts and trucks. |
| Hydroelectric reservoirs or forebays | A body of water used to drive hydroelectric turbines and generators. |
| Hydroelectric intake structures | Structures to filter debris and direct water from a hydroelectric forebay towards the turbine via a hydroelectric water conduit, channel or pipe ("penstock"). |
| Penstocks | Pipes to carry water between reservoirs, forebays, or intake structures to a hydraulic turbine. |
| Surge Chambers | A tank used to control pressure in a penstock. |
| Hydroelectric Power Houses | Infrastructure to house hydroelectric (hydraulic) turbines or generators. |
| Hydroelectric Tailraces | Areas used for the outflow return of water following its use by a hydroelectric turbine. |

In some embodiments, EI feature recognition model 216 may be trained to recognize a developed or developing EI site, such as an oilfield drilling or hydraulic fracturing site, as a whole, which may itself comprise one or more constituent EI features. In some embodiments, such a developed or developing EI site may correspond to an additional EI feature type of 'an EI development site'.

EI Feature Status Attributes

Once an EI feature has been detected and classified as a given EI feature type, EI feature recognition model 216 or EI feature determination manager 280 may also determine and track a status of one or more attributes associated with that particular feature type. This provides additional information of use to users of the online platform, or which may serve as a valuable input to other functions of the system (for example, the determination of composite indication of EI site activity or status).

Each EI feature type or classification may be associated with a suitable set of attributes. For example, a frac-water pit may have an attribute set comprising:

Area

Water level or volume

Water color, type or quality (for example, fresh water may be clear or blue whereas brackish or 'used' water may be brown)

Connectivity (for example, whether pipelines to the frac-water pit are visible)

Some of these attributes (such as 'area') would also be appropriate for other feature types, such as a well pad, whereas others (such as 'water level or volume') would not. In general, feature types may each have different attribute sets though some attributes may be common amongst feature types.

The values of some of the attributes for a given feature may be derived through suitable image processing, whereas the values of other attributes may be derived using external data sources, such as government or corporate records, or any information from public records information sources. For example, an area or location of a feature may be derived from images, whilst the surface rights owner at that location may be derived using a land ownership database, this representing one example of a public records information source. For some attribute types, it may also be possible to utilize other means of determining status. For example, remote sensors may be deployed at sites to monitor water levels, quality, salinity, or pH. Such remote sensors may report values via a communication network to which the EI feature recognition system or the online platform is connected.

For illustrative purposes, Table 3 below provides a non-exhaustive list of EI feature types and their attributes and example sources of data. The term "g/c records" represents "government or corporate records" in shorthand throughout.

TABLE 3

Examples of EI feature status attributes

| Feature Classification (Type) | Attribute | Example source of data |
|---|---|---|
| Frac-water pit | Detection date/time | Image analysis |
| | Location | Image analysis, g/c records |
| | Area or size | Image analysis, g/c records |
| | Surface rights owner | Land ownership records |
| | Mineral rights owner | Land ownership records |
| | Fluid level or volume | Image analysis, sensor networks |
| | Fluid or material type | Image analysis, sensor networks |
| | Fluid or material color | Image analysis, sensor networks |
| | Fluid or material quality | Image analysis, sensor networks |
| | Material or fluid attribute | Image analysis, sensor networks |
| | Connectivity | Image analysis, g/c records |
| Well pad | Detection date/time | Image analysis |
| | Location | Image analysis, g/c records |
| | Area or size | Image analysis, g/c records |
| | Surface rights owner | Land ownership records |
| | Mineral rights owner | Land ownership records |
| Drilling Rig | Detection date/time | Image analysis |
| | Location | Image analysis, g/c records |
| | Size | Image analysis, g/c records |
| | Surface rights owner | Land ownership records |
| | Mineral rights owner | Land ownership records |
| | Level of activity, inactivity, operation, status (idle, active) | Image analysis, sensor networks, g/c records |
| Pipeline infrastructure | Detection date/time | Image analysis |
| | Location | Image analysis, g/c records |
| | Length, width or size | Image analysis, g/c records |
| | Fluid type | Image analysis, g/c records |
| | Surface rights owner | Land ownership records |
| | Mineral rights owner | Land ownership records |
| | Bore size | Image analysis, g/c records |
| | Flow rate | Sensor networks, g/c records |
| | Connectivity | Image analysis, g/c records |
| Service road | Detection date/time | Image analysis |
| | Location | Image analysis, g/c records |
| | Length, width or size | Image analysis, g/c records |
| | Surface type | Image analysis, g/c records |
| | Surface rights owner | Land ownership records |
| | Mineral rights owner | Land ownership records |
| Clearing | Detection date/time | Image analysis |
| | Location | Image analysis |
| | Length, width or area | Image analysis |
| | Surface rights owner | Land ownership records |
| | Mineral rights owner | Land ownership records |
| Trucks | Detection date/time | Image analysis |
| | Location | Image analysis, GPS tracking (sensors or smartphones), roadside video cameras |
| | Number | Image analysis |
| | Type | Image analysis |
| | Level of activity, inactivity, operation, status (idle, active) | Image analysis |
| | Surface rights owner | Land ownership records |
| | Mineral rights owner | Land ownership records |
| Tank Battery | Detection date/time | Image analysis |
| | Location | Image analysis, g/c records |
| | Number of tanks | Image analysis, g/c records |
| | Size of tanks | Image analysis, g/c records |
| | Fluid level or volume | Sensor networks |
| | Surface rights owner | Land ownership records |
| | Mineral rights owner | Land ownership records |

TABLE 3-continued

Examples of EI feature status attributes

| Feature Classification (Type) | Attribute | Example source of data |
|---|---|---|
| Proppant store | Detection date/time | Image analysis |
| | Location | Image analysis, g/c records |
| | Size, volume or weight | Image analysis, g/c records |
| | Proppant type | Image analysis, g/c records |
| | Surface rights owner | Land ownership records |
| | Mineral rights owner | Land ownership records |
| Drilling reserve pit | Detection date/time | Image analysis |
| | Location | Image analysis, g/c records |
| | Area or size | Image analysis, g/c records |
| | Number of sub-parts | Image analysis, g/c records |
| | Fluid level or volume | Image analysis, sensor networks |
| | Surface rights owner | Land ownership records |
| | Mineral rights owner | Land ownership records |
| Frac spread | Detection date/time | Image analysis |
| | Location | Image analysis, GPS tracking (sensors, smartphones), roadside video cameras |
| | Number of pressure pumps | Image analysis, g/c records |
| | Surface rights owner | Land ownership records |
| | Mineral rights owner | Land ownership records |
| Sand mines | Detection date/time | Image analysis |
| | Location | Image analysis, g/c records |
| | Surface rights owner | Land ownership records |
| | Mineral rights owner | Land ownership records |
| Producing wells | Detection date/time | Image analysis |
| | Location | Image analysis, g/c records |
| | Surface rights owner | Land ownership records |
| | Mineral rights owner | Land ownership records |
| Flare systems | Detection date/time | Image analysis |
| | Location | Image analysis, g/c records |
| | Size | Image analysis, g/c records |
| | Brightness, intensity or spectral content | Image analysis, sensor networks |
| | Surface rights owner | Land ownership records |
| | Mineral rights owner | Land ownership records |
| | Level of activity, inactivity, operation, status (idle, active) | Image analysis, sensor networks, g/c records |
| Solar panel mounts | Detection date/time | Image analysis |
| | Location | Image analysis, g/c records |
| | Area | Image analysis, g/c records |
| | Number | Image analysis, g/c records |
| | Type | Image analysis, g/c records |
| | Surface rights owner | Land ownership records |
| Solar panels | Detection date/time | Image analysis |
| | Location | Image analysis, g/c records |
| | Area | Image analysis, g/c records |
| | Number | Image analysis, g/c records |
| | Type | Image analysis, g/c records |
| | Level of activity, inactivity, operation, status (idle, active) | Image analysis, sensor networks, g/c records |
| | Power delivery or capability | Image analysis, sensor networks, g/c records |
| | Surface rights owner | Land ownership records |
| Electrical substation | Detection date/time | Image analysis |
| | Location | Image analysis, g/c records |
| | Size | Image analysis, g/c records |
| | Level of activity, inactivity, operation, status (idle, active) | Image analysis, sensor networks, g/c records |
| | Power delivery or capability | Image analysis, sensor networks, g/c records |
| | Connectivity | Image analysis, g/c records |
| | Surface rights owner | Land ownership records |
| Security fence | Detection date/time | Image analysis |
| | Location | Image analysis, g/c records |
| | Length | Image analysis, g/c records |
| | Enclosed area | Image analysis, g/c records |
| | Surface rights owner | Land ownership records |
| | Mineral rights owner | Land ownership records |
| Building | Detection date/time | Image analysis |
| | Location | Image analysis, g/c records |
| | Size or area | Image analysis, g/c records |

TABLE 3-continued

Examples of EI feature status attributes

| Feature Classification (Type) | Attribute | Example source of data |
|---|---|---|
| | Type | Image analysis, building permit records, g/c records |
| | Surface rights owner | Land ownership records |
| | Mineral rights owner | Land ownership records |
| Cable system | Detection date/time | Image analysis |
| | Location | Image analysis, g/c records |
| | Length | Image analysis, g/c records |
| | Type | Image analysis, g/c records |
| | Power delivery or capability | Image analysis, sensor networks, g/c records |
| | Connectivity | Image analysis, g/c records |
| | Surface rights owner | Land ownership records |
| Wind energy collector | Detection date/time | Image analysis |
| | Location | Image analysis, g/c records |
| | Height above ground | Image analysis, g/c records |
| | Type | Image analysis, g/c records |
| | Surface rights owner | Land ownership records |
| | Level of activity, inactivity, operation, status (idle, active) | Image analysis, sensor networks, g/c records |
| Meteorological monitoring system | Detection date/time | Image analysis |
| | Location | Image analysis, g/c records |
| | Height above ground | Image analysis, g/c records |
| | Surface rights owner | Land ownership records |
| | Level of activity, inactivity, operation, status (idle, active) | Image analysis, sensor networks, g/c records |
| Construction equipment | Detection date/time | Image analysis |
| | Location | Image analysis, g/c records |
| | Type | Image analysis, g/c records |
| | Number | Image analysis, g/c records |
| | Surface rights owner | Land ownership records |
| | Mineral rights owner | Land ownership records |
| | Level of activity, inactivity, operation, status (idle, active) | Image analysis, sensor networks, g/c records |
| Hydroelectric reservoir or forebay | Detection date/time | Image analysis |
| | Location | Image analysis, g/c records |
| | Area | Image analysis, g/c records |
| | Water level or volume | Image analysis, sensor networks |
| | Water quality | Image analysis, sensor networks |
| | Connectivity | Image analysis, g/c records |
| | Surface rights owner | Land ownership records |
| Hydroelectric intake structure | Detection date/time | Image analysis |
| | Location | Image analysis, g/c records |
| | Size | Image analysis, g/c records |
| | Surface rights owner | Land ownership records |
| Penstock | Detection date/time | Image analysis |
| | Location | Image analysis, g/c records |
| | Number | Image analysis, g/c records |
| | Length | Image analysis, g/c records |
| | Bore size | Image analysis, g/c records |
| | Flow rate | Sensor networks |
| | Connectivity | Image analysis, g/c records |
| | Surface rights owner | Land ownership records |
| Surge chamber | Detection date/time | Image analysis |
| | Location | Image analysis, g/c records |
| | Size or capacity | Image analysis, g/c records |
| | Connectivity | Image analysis, g/c records |
| | Surface rights owner | Land ownership records |
| Hydroelectric Power House | Detection date/time | Image analysis |
| | Location | Image analysis, g/c records |
| | Size or area | Image analysis, g/c records |
| | Connectivity | Image analysis, g/c records |
| | Surface rights owner | Land ownership records |
| | Level of activity, inactivity, operation, status (idle, active) | Image analysis, sensor networks, g/c records |
| Hydroelectric Tailrace | Detection date/time | Image analysis |
| | Location | Image analysis, g/c records |
| | Size | Image analysis, g/c records |
| | Surface rights owner | Land ownership records |

TABLE 3-continued

Examples of EI feature status attributes

| Feature Classification (Type) | Attribute | Example source of data |
|---|---|---|
| | Level of activity, inactivity, operation, status (idle, active) | Image analysis, sensor networks, g/c records |

In one example of the use of EI feature status attributes, the system may be configured to detect and measure flares and gas emissions as an indicator of oilfield activity and also as a measure and predictor of oilfield well productivity when correlated to trailing public and private reports of oilfield well productivity. For example, the system may employ processing of aerial images to identify flare systems and to detect status attributes of flares or flare systems such as a brightness, an intensity, a spectral content, or a size, shortly after a new well is completed. The EI feature-level information 282 thereby obtained may be provided to other components of server 106 or to users 190 or subscribers 195 of the online platform. In examples, the status attributes of flares or flare systems may exhibit a correlation to oil or gas productivity and decline curves of a well when compared to government filings of oilfield well productivity such as may be available in a supplemental information source 270 such as public records source 250. This correlation could then be used either by server 106 or by users 190 or subscribers 195 of the online platform 180 to infer the productivity and decline curve of new wells in the future where a flare or emissions are detected but no government filings are yet available to indicate productivity. Amounts of flaring might also indicate shortages of pipeline capacity or insufficient economic basis for transporting and selling oil and gas or might be used to estimate cost of operations for new wells in a particular area.

In addition to determining a current status of an EI feature attribute, EI feature determination manager 280 may be further configured to store and build a history of feature attribute status, which may be stored in EI feature database 130, and to perform analysis on such history in order to identify temporal changes or trends in EI feature status or to predict EI feature status. These may be subsequently reported to users of the online platform or used as input to other functions performed by the system.

Use of Supplemental Information

Different approaches may be used by the system to identify and classify EI features from the aerial imagery. A basic approach is to detect and classify each feature independently based purely on the image data (and prior training of an associated EI feature recognition model 216). In other approaches, the ability, speed or accuracy by which the system is able to classify a feature may be enhanced through the use of supplemental information sources 270. Additionally, or alternatively, such approaches may also offer a reduction in the complexity of implementation of the EI feature recognition model 216, as the supplemental information may allow the system to maintain a target accuracy of EI feature identification with less-complex or less-intensive image processing. Supplemental information sources 270 may comprise an EI feature database 230 containing previously-obtained information in the form of EI feature data records 240. Alternatively, or in conjunction, supplemental information sources 270 may comprise a public records information source 250 comprising one or more public records 260, for example as recorded by a government agency or other authoritative body.

By means of an illustrative example, the system may be arranged to consult drilling permit records or drilling completion reports when analyzing images of global terrain and use this information to train an EI feature recognition model 216, for example by adjusting a structure, weights, coefficients, parameters, variables, thresholds or probabilities used within the model, to increase the likelihood that an EI feature is correctly classified, or to reduce the time, computational complexity or processing power required to reach a determination. In some examples, as part of a training process, the system may consult a supplemental information source comprising oilfield drilling completion records and may use the information thereby obtained to determine that an oilfield exploration site (one example of an EI site) exists at a particular location, and that drilling commenced at the location at a past time D. The system may subsequently obtain and select as training images, historical images of the portion of global terrain in which the drilling operation is known to have been conducted. The images may have been captured at a range of times before or after time D. On the basis that the EI site is known to have been operational at some point after time D, in some examples, the system may select historical images with a capture time later than time D, as training images on which to apply an EI feature recognition model 216 when operating in a training mode. In doing so, the EI feature recognition model 216 may be updated to better-recognize EI features. In other examples, consultation of historical oilfield drilling permit records may illustrate that a request for a drilling permit for the same location was made at an earlier time $P=D-\Delta_P$. Further analysis of images of the same portion of global terrain, and captured at a time prior to time D, may illustrate that an oilfield well pad was initiated or completed at time $WP=P\pm\Delta_{WP}$ and that an oilfield frac-water pit was initiated or completed at time $FP=P\pm\Delta_{FP}$. The system may be configured to train one or more EI feature recognition model(s) 216 to recognize correlations of this information with evidential proof (for example as obtained using the supplemental information) that drilling occurs.

More generally, supplemental or external information types may be obtained from EI feature database 230 or from public records information source 250 and may be used by the system to classify EI features.

Figure 3B:
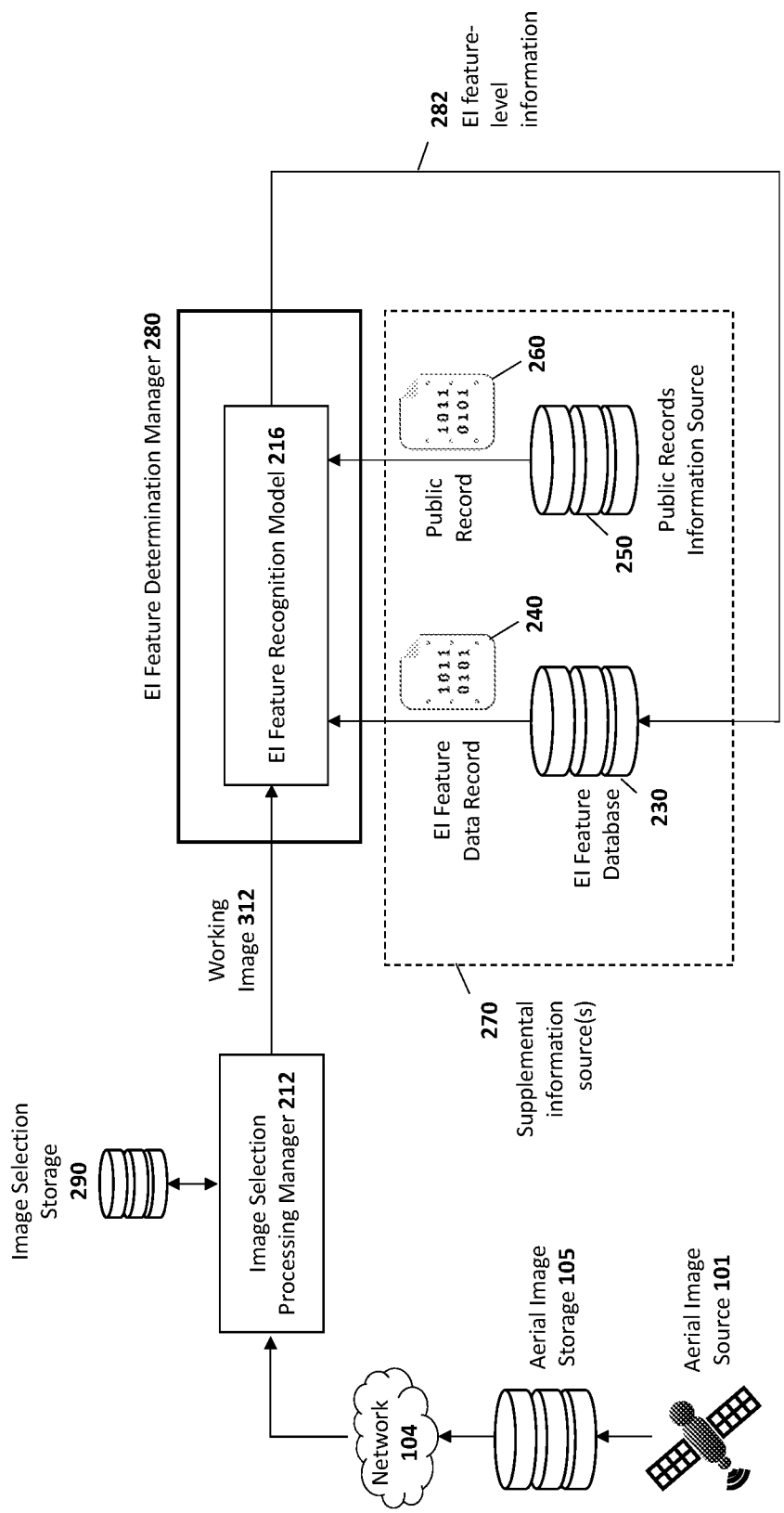
FIG. 3B shows a simplified block diagram of a system for identifying EI features using an EI feature recognition model in a working mode, according to some embodiments.

FIG. 3B shows EI feature recognition model 216 in a working mode of operation. EI feature determination manager 280 or EI feature recognition model 216 obtains one or more images from image selection processing manager 212 or image selection storage 290, the images spanning a portion of global terrain. In some examples, images are captured by one or more aerial image sources, such as aerial image source 101. Working images 312 may comprise a single image or a plurality of images that were captured at substantially the same time instance. Additionally, or alternatively, working images 312 may comprise an image time-sequence including a plurality of aerial images of the portion of global terrain, each aerial image of the plurality taken at one of a respective plurality of different image capture times. In some examples, EI feature recognition model 216 obtains one or more pieces of supplemental information from one or more supplemental information sources 270. Supplemental information sources 270 may comprise EI feature database 230 in which one or more EI data records 240 are stored. Additionally, or alternatively, supplemental information source 270 may comprise public records information source 250 in which one or more public records 260 are stored. Examples of supplemental information sources and information are given in Table 1.

EI feature recognition model 216 may comprise artificial intelligence processing such as a neural network or other machine learning algorithm. During working mode of operation, a structure, weights, coefficients, parameters, variables, thresholds or probabilities of EI feature recognition model 216 (for example, as were generated, updated or modified as a result of operation of EI feature recognition model training manager 214 in training mode) are applied during processing of working images 312 in order, for example, to identify or recognize EI features, to classify EI features as belonging to a given EI feature type, or to determine a status attribute of an EI feature.

In some embodiments, EI feature recognition model 216 may include a convolutional neural network (CNN). The CNN may include a plurality of neurons, each of which may operate on a set of inputs x (for example from other neurons) to produce an output y. In one example, the output y may include the calculation by the neuron of a weighted sum of inputs x plus a bias variable b, such that y is a function of $z=w \cdot x+b$. Here, x and w are multi-element vectors representing the inputs and weights respectively, whilst z, y and b may, in some examples, be single-element real or complex values. Calculation of y may further include an activation function, such as for example a Sigmoid function, and which may be operable on z such that $y=1/(1+e^{-z})$. Numerous other known activation functions and basic calculations may be employed by neurons within a CNN-based image recognition model. EI feature recognition model 216 may further include multiple layers, each layer comprising a group of neurons that may be connected to a group of neurons in a previous and/or subsequent layer. Such layers may comprise an input layer, one or more hidden layers, and an output layer. In examples, image data is passed to the input layer, where it is processed by the group of neurons associated with the input layer, and the outputs thereby generated are passed to the first of the hidden layers. Each successive hidden layer may process the set of inputs received from the previous layer in order to calculate a set of outputs to pass to the next layer. The last hidden layer may calculate a set of outputs to pass to the output layer. The output layer may calculate an output using the received set of inputs from the last hidden layer. In examples, the neurons in each layer may each perform a similar type of mathematical operation, for example, to perform a convolution function within a convolutional layer, or a pooling (down-sampling) function within a pooling layer. Numerous other layer types are known in which different mathematical functions related to image-processing may be used. A neuron in a layer may be connected to one or more neurons of the previous layer and to one or more neurons of a subsequent layer. At each neuron, each input connection may be associated with a weight, for example an element of a weight vector w. In examples, during the training mode of operation, these weights, and other parameters, such as the neuron bias variables b, are recursively updated within the EI feature recognition model 216, in order to reduce an error at the model output and to thereby improve its recognition performance. The updated EI feature recognition model 216 may then be applied to one or more working images to identify EI features.

In embodiments, application of EI feature recognition model 216 to working images 312 results in an output from EI feature recognition model 216 in the form of EI feature-level information 282. For example, EI feature-level information 282 may include information on:

A presence (or change thereof) of an EI feature;
A classification or type of an EI feature; or
One or more status attributes (or change thereof) associated with an EI feature, such as its location or size.

In some examples, EI feature-level information 282 may also include one or more confidence levels associated with the information or with a component of the information.

EI feature-level information 282 may be written to EI feature database 230, for example in the form of EI feature data record 240, in order that it may be later used by the system or be provided to users 190 or subscribers 195 of online platform 180. Optionally, EI feature-level information 282 may only be written to EI feature database 230 if one or more of the confidence levels associated with said information 282 meets or exceeds a confidence threshold. In this manner, a reliability or accuracy of EI feature-level information 282 held and stored within EI feature database 230 may be maintained above a predetermined level.

EI feature recognition model 216 may be trained or otherwise optimized for a particular EI feature type or may be capable of recognizing multiple EI feature types. In the event that the model is trained towards a specific EI feature type, a plurality of EI feature recognition models 216a, 216b, . . . 216n may be employed by the system, with each optimized for one of said feature types. In this case, a corresponding plurality of EI feature-level information 282 may be returned, each of the plurality associated with a particular model and EI feature type.

In determining EI feature-level information 282, EI feature recognition model 216 associated with a first EI feature type may utilize information from one or more supplemental information sources 270. Such information may relate to EI features at the same or a different location to the identified EI feature of the first type and may relate to EI features of the same or a different type to that of first EI feature type. In any of these cases however, EI feature recognition model 216 may operate to combine visual information relating to a potential EI feature of the first type in the working image with the supplemental information, which may be non-visual information, in order to derive content within the EI feature-level information 282 that was not possible to derive using the visual information alone (that is, if the supplemental information was not provided to EI feature recognition model 216). Thus, the combination of the supplemental information with the visual information may improve the overall performance, accuracy or ability of the system to identify EI features.

In the case that the information from the supplemental information source 191 relates to an EI feature type that is the same as the first type, this may be used to guide EI feature recognition model 216 and improve its accuracy or false-alarm detection rate. For example, a working image 312 may comprise a feature that closely resembles the shape and form of an oilfield frac-water pit. EI feature recognition model 216 may identify the feature and a determine a size attribute. However, supplemental information may provide EI feature recognition model 216 with knowledge of the size of other frac-water pits that indicates to EI feature recognition model 216 that the determined size attribute of the identified feature is not in alignment with expected values. As a result, EI feature recognition model 216 may either discard its identification of the feature or downgrade its confidence level that the feature is a frac-water pit.

By means of further oilfield-related example, and for the case in which information from the supplemental information source 270 relates to an EI feature type that is different to the first type, EI feature recognition model 216 may be trained to identify frac-water pits such that when applied to working image 312, EI feature recognition model 216 determines with a first confidence level of e.g., 20% that a frac-water pit exists at a first geographical location. The first confidence level may be relatively low due to a quality of the working image. However, EI feature database 230 may comprise EI feature data record 240 that indicates the presence of a previously-detected well pad within 200 meters of the first geographical location at a confidence level of e.g., 75%. In light of the fact that frac-water pits and well pads tend to be collocated within a certain radius of one another, EI feature recognition model 216 is able to significantly upgrade its confidence in the presence of the frac-water pit at the first location to a second confidence level of e.g., 65%, and to subsequently write the EI feature-level information 282 thereby obtained to EI feature database 230. Descriptions of further related embodiments may be found with reference to, for example, FIG. 5A.

Figure 3C:
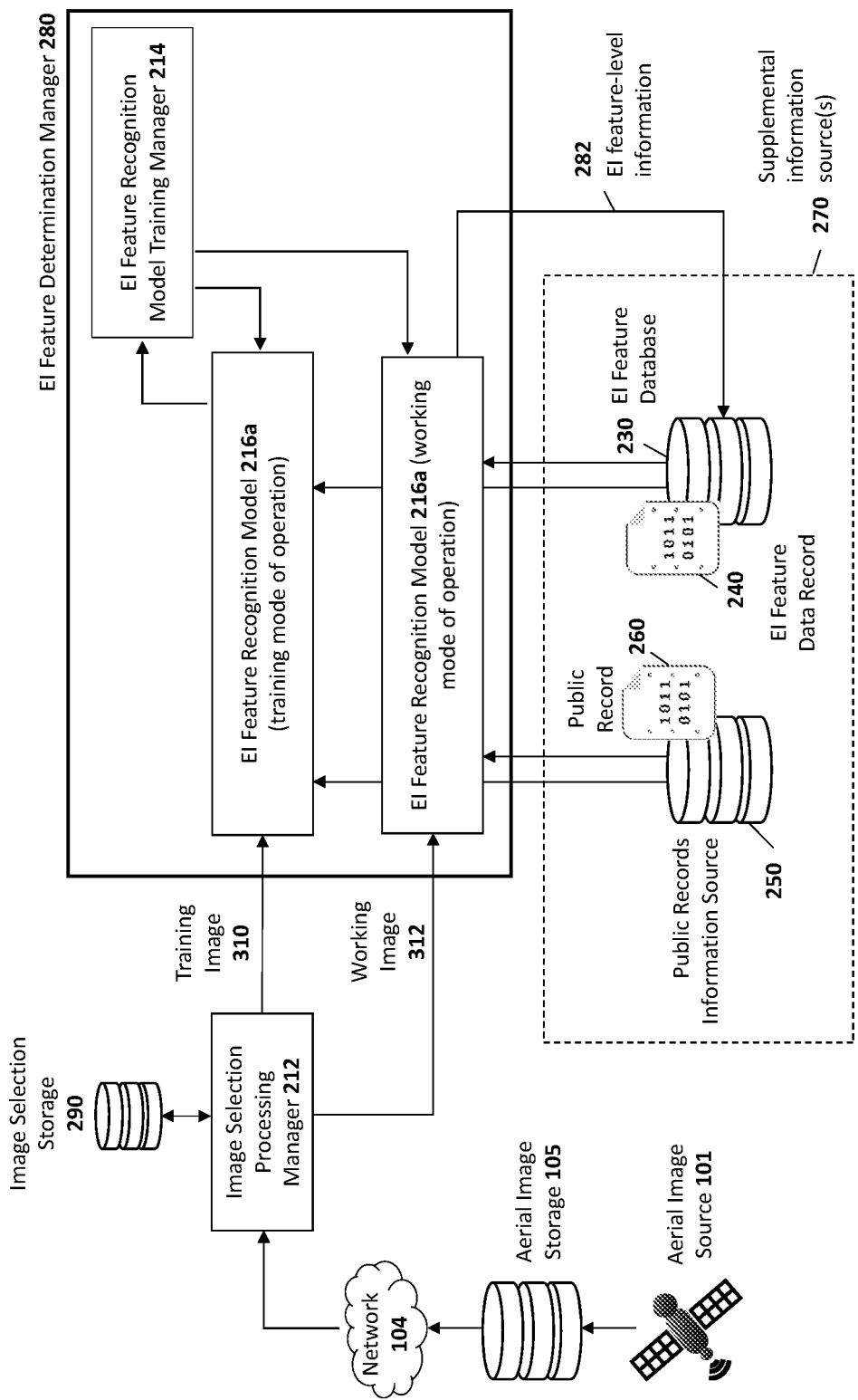
FIG. 3C shows a simplified block diagram of a system showing an EI feature recognition model in a training mode and a working mode, according to some embodiments.

FIG. 3C depicts EI feature recognition model 216a in both a working mode of operation and in a training mode of operation. In both modes, EI feature recognition model 216a may be coupled to one or more supplemental information sources 270, such as public records information source 250 (comprising one or more public records 260) or EI feature database 230 (comprising one or more EI feature data records 240).

In the same way as previously described for FIG. 3B, in a working mode of operation, EI feature recognition model 216 of FIG. 3C is applied to working image 312 and to information from one or more supplemental information sources 270 in order to generate EI feature-level information 282. In doing so, new information (contained within EI feature-level information 282) is generated which may be written back into EI feature database 230 in the form of one or more EI feature data records 240.

As further illustrated by FIG. 3C, the new information thereby obtained may then be used by the system to train EI feature recognition model 216a in a training mode of operation. Thus, EI feature-level information 282 (containing the new information) as generated by EI feature recognition model 216a in its working mode of operation may be written to EI feature database 230 and subsequently used by EI feature recognition model 216a in its training mode of operation. Optionally, the new information may be used by EI feature recognition model 216a in its training mode of operation only if the new information is deemed to be sufficiently reliable (for example associated with a confidence level above a predetermined threshold). When in the training mode of operation, EI feature recognition model 216a receives both a training image 310 and the new information and EI feature recognition model 216a is modified or updated by EI feature recognition model training manager 214 accordingly as has been previously described.

Figure 4:
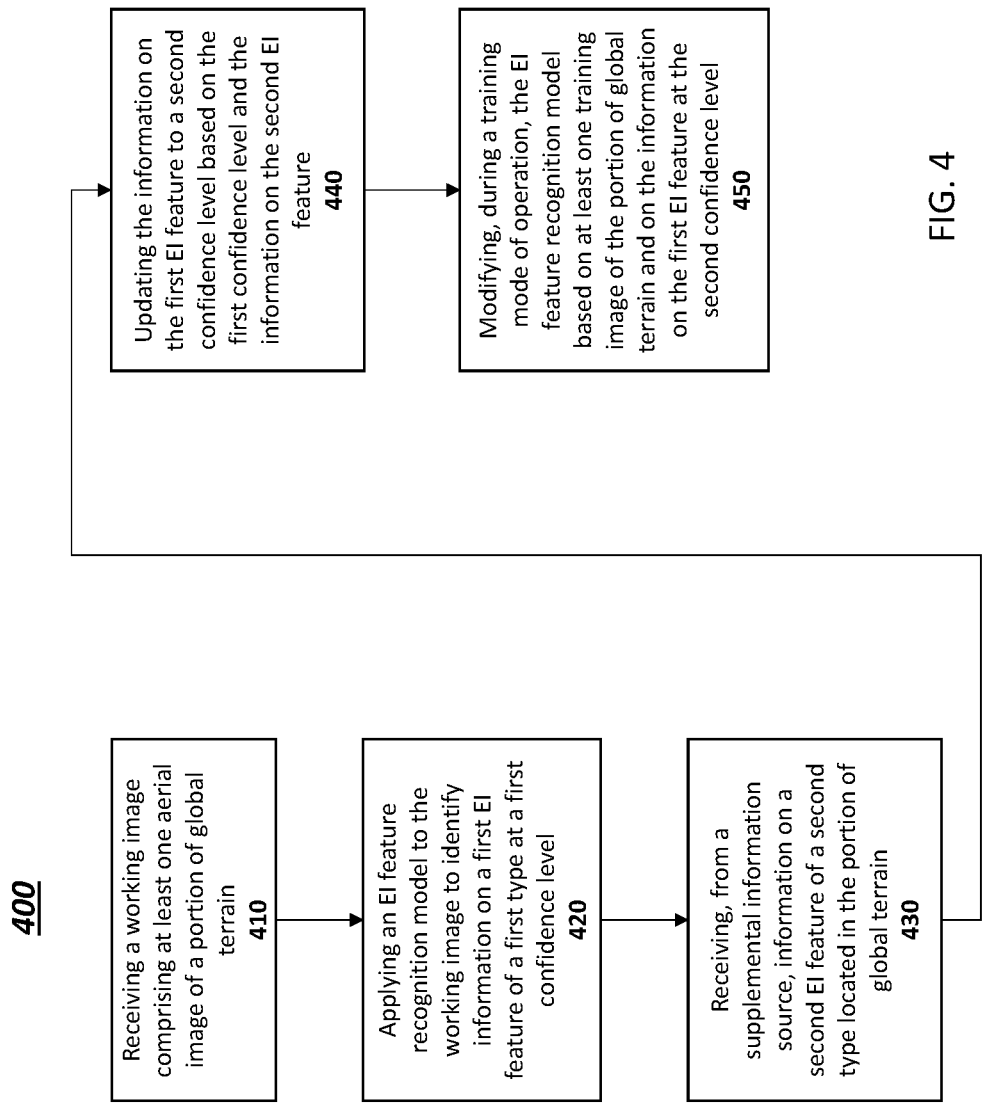
FIG. 4 illustrates an example of a method for processing images to identify EI features within aerial images of global terrain, according to some embodiments.

Updated EI feature recognition model 216a may subsequently be used in the working mode of operation, FIG. 4 depicts one example of a method 400 for processing images to identify EI features within aerial images of global terrain. In a general overview, method 400 may include receiving a working image 312 comprising at least one aerial image of a portion of global terrain (step 410). Method 400 may include applying an EI feature recognition model 216 to the working image 312 to identify information on a first EI feature of a first type at a first confidence level (step 420). Method 400 may include receiving information from a supplemental information source 270 on a second EI feature of a second type located in the portion of terrain (step 430). Method 400 may include updating the information on the first EI feature to a second confidence level based on the first confidence level and the information on the second EI feature (step 440). Method 400 may also include modifying, during a training mode of operation, the EI feature recognition model 216 based on at least one training image 310 of the portion of global terrain and on information on the first EI feature at the second confidence level (step 450).

Referring to FIG. 4 in more detail, method 400 may include receiving a working image comprising at least one aerial image of a portion of terrain (step 410). EI feature recognition model 216 is configured to obtain one or more training images 310, for example from image selection processing manager 212 or image selection storage 290. In examples, an API is used to interface between EI feature recognition model training manager 214 and image selection processing manager 212 or image selection storage 290. In some embodiments, one or more training images 310 are pulled from image selection processing manager 212 or image selection storage 290. In some examples, one or more training images 310 are pushed, for example at regular intervals, from image selection processing manager 212 or image selection storage 290. In some examples, EI feature recognition model training manager 214 receives one or more training images 310 which span a portion of global terrain and which were captured by one or more aerial image sources, such as aerial image source 101. Training image 310 may comprise a single image or a plurality of images that were captured at substantially the same time instance. In examples, training image 310 may comprise an image time-sequence comprising a plurality of aerial images of a portion of global terrain, each aerial image of the plurality taken at one of a respective plurality of measurably-different image capture times.

Method 400 may include applying EI feature recognition model 216 to the working image to identify information on a first EI feature of a first type at a first confidence level (step 420). Examples of EI feature types are given in Table 2. In some embodiments, and in the case in which the EI feature recognition model 216 comprises a convolutional neural network (CNN), the EI feature recognition model 216 may calculate a confidence level directly, for example based on the values of one or more neuron layers within the CNN. Numerous different algorithms are possible for such direct computation of a confidence level or confidence score during image recognition and classification tasks in a CNN. In general, however, the confidence level may be based on a plurality of neuron values (or a comparison, ratio or 'distance' therebetween) obtained within the EI feature recognition mode 216, for example within the last hidden layer, or an output layer of the CNN. In other embodiments, confidence levels for identifying information on a first EI feature from a working image may be derived by considering success rates of previous determinations. For example, an EI feature recognition model 216 determines that an EI feature of a given type exists based on analysis of a working image. The working image captures aspects of terrain that may be indicative of the development of the EI feature, even though the entire EI feature cannot be clearly seen in the working image. For example, EI feature recognition model 216 may determine that an oilfield well pad exists in a portion of terrain based on image content of a working image. An oilfield well pad is a surface site that is comprised of a leveled, usually-rectangular area used to seat machinery and equipment for drilling, completing, producing and maintaining oil and gas wells. EI feature recognition model 216 may determine that what is captured in the working image represents a well pad based on various attributes of well pads that can be detected in an image, such as the location and/or the area and size.

After the determination of the presence of this EI feature is made by EI feature recognition model 216, other EI features may be subsequently detected by one or more additional EI feature detection model(s) 216 through the examination of additional images captured at a later point in time with respect to the determination of the oilfield well pad. For example, EI feature recognition model 216 may determine that an oilfield drilling rig exists. If the drilling rig is determined to be present on the well pad that was previously determined, then this subsequent determination of the oil rig validates the previous determination of the well pad. This validation may be stored as a "success" of the first EI feature recognition model 216 in determining the well pad feature at the stage of development that it did. In another example, one or more additional EI feature detection model(s) 216 may determine that an oilfield drilling rig does not appear on what was previously determined to be an oilfield well pad. For example, a commercial building may appear on that particular portion of terrain. This would indicate that the prior determination of the well pad feature was incorrect. This validation may be stored as a "failure" of the first EI feature recognition model 216 in determining the well pad feature at the stage of development. Over time, the stored "success" and "failure" indications of the capability of the first EI feature recognition model 216 to be able to accurate determine an EI feature at a given stage of development of the terrain may be used to output a confidence level with the determination of the feature. In this example, the confidence level of the determination of the EI feature by EI feature determination model 216 is based on a history of success and failure in determining such a feature at that stage of development.

Method 400 may include receiving information from a supplemental information source 270 on a second EI feature of a second type located in the portion of terrain (step 430). In some examples, supplemental information source 270 is an EI feature database 230 and the information on the second EI feature is comprised within at least one EI feature data record 240 stored within EI feature database 230. In some examples, the first EI feature type is the same as the second EI feature type. In other examples, the first EI feature type is the different than the second EI feature type. In embodiments, the supplemental information source 270 is a public records information source 250 and the information on the second EI feature is comprised within at least one public record 260 stored within public records information source 250. Examples of supplemental information are given in Table 1.

In some embodiments, the information on the first EI feature or the information on the second EI feature comprises one or more of a presence or a suspected-presence of an EI feature, a type of a known or suspected EI feature, and/or a status attribute of a known or suspected EI feature. Examples of status attributes are given in Table 3.

Method 400 may include updating the information on the first EI feature to a second confidence level based on the first confidence level and the information on the second EI feature (step 440). In some examples, the information on the second EI feature is associated with a third confidence level, the method further comprising identifying the information on the first EI feature at the second confidence level based on the first confidence level, the information on the second EI feature and the third confidence level.

Method 400 may also include modifying, during a training mode of operation, EI feature recognition model 216 based on at least one training image of the portion of global terrain and on information on the first EI feature at the second confidence level (step 450). In some examples, the training image is the same as the working image. In other examples, the training image is different than the working image. In embodiments, an image resolution of the training image is higher than an image resolution of the working image. In examples, the use of higher-resolution images for training purposes may result in an EI feature recognition model that is better-able to identify EI features from working images at lower resolutions. For example, a higher resolution training image may be used to train EI feature recognition model 216 to recognize one or more key pixels in the lower resolution working images, or relationships between key pixels in the lower resolution working images, that are indicative of the presence of an EI feature. Thus, the EI feature recognition model 216 may be trained with out-of-date higher resolution images, which are less expensive to obtain than current high resolution images. The trained EI feature recognition model 216 may then be applied to current lower resolution images, which are also less expensive and/or easier to obtain than current high resolution images. This dual resolution approach provides a cost savings. In some embodiments, modifying the EI feature recognition model 216 includes training a neural network to establish neural network weights.

In some examples, the method further comprises applying modified EI feature recognition model 216 to a further working image to identify a further EI feature of the first EI feature type. In examples, modifying EI feature recognition model 216 includes determining a pattern of stages of EI feature development across an image time-sequence.

Joint Classification

Certain EI feature types may have a high correlation to other EI feature types, and a confidence level in the presence of one may spark a step-change in the confidence level of the other. The confidence level upgrade may be sufficiently large that it exceeds a predetermined confidence threshold, thereby warranting inclusion of the EI feature by the system in EI feature database 230 used by online platform 180.

Therefore, in a complementary or alternative enhancement, the identification or classification of a particular first EI feature may be determined through consideration not only of the area of the image (or group of image pixels) in which the first EI feature itself is represented, but also by analyzing the image and/or otherwise obtaining information on one or more additional EI features that may be proximal to, interconnected-to, or otherwise related to the first feature. When taken collectively, the information on the one or more additional EI features may help to confirm the detection or classification of the first EI feature. By means of example, a first EI feature in an oilfield region may be tentatively classified as a clearing with low probability or certainty.

However, the system may also identify the presence of a new road connected to the clearing, and the appearance of a stockpile of sand (proppant). As a result, and with knowledge that the presence of the clearing and the stockpile of sand are dependent upon a service road (in examples, EI feature relationship manager 220 maintains this kind of knowledge and information), the system may determine with increased certainty that the feature of interest is indeed a clearing destined to become an oilfield well pad. Such a 'joint classification' technique may offer an improvement in detection and classification performance versus a model in which EI features are detected independently of each other, and wherein this collective relationship information (amongst related EI features) is not exploited.

Figure 5A:
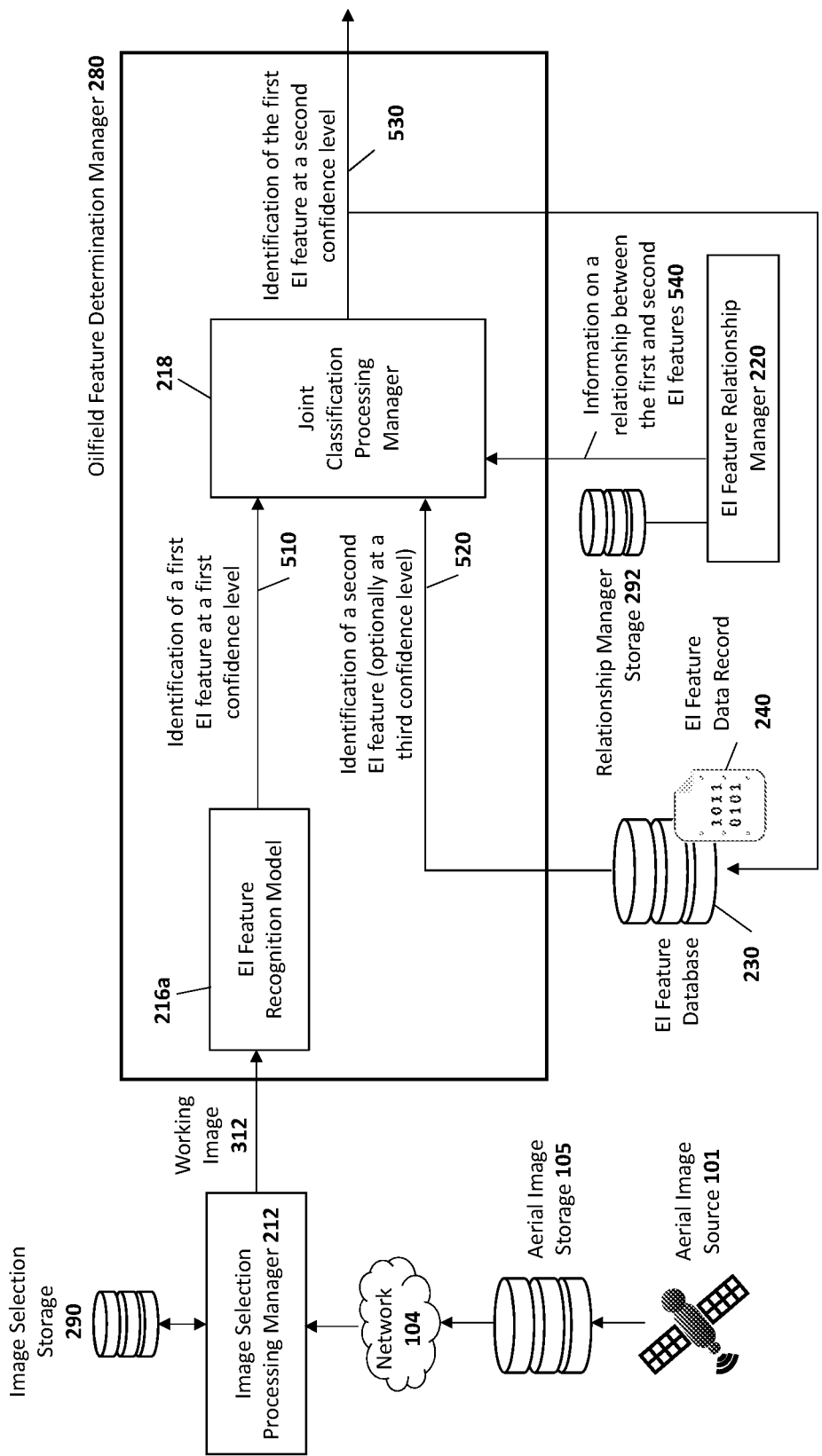
FIG. 5A shows a simplified block diagram of a system for identifying a first EI feature using an EI feature recognition model and information on a second EI feature, according to some embodiments.

FIG. 5A shows a first embodiment of a system for identifying a first EI feature using information on a second EI feature. EI feature recognition model 216a obtains one or more working images 312 from image selection processing manager 212 or image selection storage 290 spanning a portion of global terrain and which were captured by one or more aerial image sources, such as aerial image source 101. Working image 312 may comprise a single image or a plurality of images that were captured at substantially the same time instance. Additionally, or alternatively, working image 312 may comprise an image time-sequence including a plurality of aerial images of the portion of global terrain, each aerial image of the plurality taken at one of a respective plurality of substantially-different image capture times.

EI feature recognition model 216a is applied to working image or images 312 in order to generate an identification 510 of a first EI feature of a first EI feature type at a first location within the portion of global terrain and at a first confidence level. Identification 510 and the associated first confidence level are provided as a first input to joint classification processing manager 218.

As a second input, joint classification processing manager 218 is provided with an identification 520 of a second EI feature of a second EI feature type at a second location. The second EI feature type may be either the same or different to the first EI feature type. Identification 520 is obtained from a supplemental or external information source, such as an EI feature database 230 containing one or more EI data records 240. In an alternative embodiment, the supplemental or external information source may comprise a public records information source. Optionally, identification 520 may comprise a third confidence level that is associated with the identification.

As a third input, joint classification processing manager 218 is provided with relationship information 540 on a relationship between the first and second EI features from EI feature relationship manager 220. Such information may comprise any information indicative of a correlation or relationship between the first and second EI features of the first and second EI feature types at the respective first and second locations. More generally, a relationship is defined as a correlation between two or more EI features of different EI feature types. By means of example, relationship information 540 may comprise one or more of the examples of information indicative of a relationship between EI features, as given in Table 4.

TABLE 4

Examples of Relationships

A functional or operational dependence between the first EI feature and the second EI feature.

TABLE 4-continued

Examples of Relationships

A functional or operational dependence between the first EI feature type and the second EI feature type.
A surface-rights land ownership of the first and second geographic locations.
A mineral rights land ownership of the first and second geographic locations.
A statistical distribution of the distance between EI features of the first and second types.
A conditional probability associated with the first EI feature and the second EI feature.
A conditional probability associated with the first EI feature, the second EI feature, and a distance therebetween.
An association of the first or second locations to an identifier or location of an existing or potential EI site.
An association of the first or second EI features to an identifier or location of an existing or potential EI site.

Joint classification processing manager 218 operates on the identification 510 of the first EI feature at the first confidence level, the identification 520 of the second EI feature (optionally at the third confidence level) and on the relationship information 540 on a relationship (such as the examples of Table 4) between the first and second EI features in order to generate an updated (second) confidence level associated with the first EI feature. In FIG. 5A this is comprised within identification 530 of the first EI feature at a second confidence level, which may in turn be written to and stored within EI feature database 230 as an EI feature data record 240 for future use. Identification 530 may be one example of EI feature-level information 282.

In an oilfield-related example, EI feature determination manager 280 may determine, using one or more EI feature recognition model(s) 216, that a frac-water pit is present in a portion of global terrain and that a well pad is present in a portion of global terrain, and may determine a distance between the frac-water pit and the well pad ($D_{FWP-WP}$). Joint classification processing manager 218 may also receive from EI feature relationship manager, relationship information 540 comprising a statistical distribution of the distance between pairs of frac-water pits and well pads that are known to be present at existing oilfield sites. By using both the determined distance $D_{FWP-WP}$ and the received relationship information 540, joint classification processing manager 218 may determine that the distance between the frac-water pit and the well pad lies within a commonly-occurring range of the statistical distribution, and hence the two EI features are likely to be related to the same oilfield site. In some embodiments, such a relationship of EI features to the same EI site (in this example, an oilfield site) may be determined with some confidence level, for example based on a calculation using the supplied statistical distance information, or on the past success and/or failure of such determinations. This determination may be used to update the confidence of the recognition of one or both of the EI features (i.e. the frac-water pit and pit and the well pad).

Figure 5B:
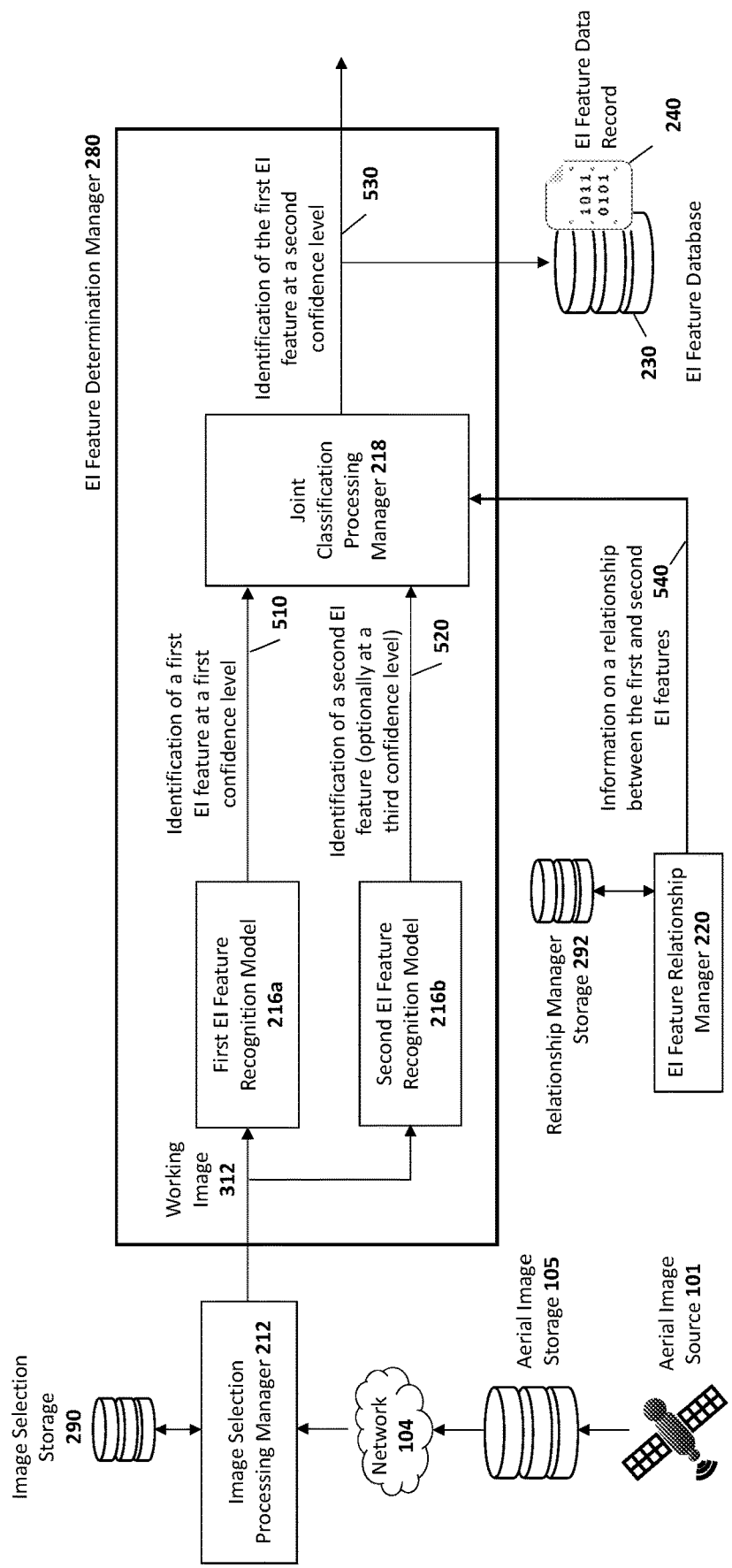
FIG. 5B shows a simplified block diagram of a system for identifying an EI feature using two EI feature recognition models, according to some embodiments.

FIG. 5B shows a second embodiment of a system for identifying a first EI feature using information on a second EI feature. The second embodiment is similar to the first embodiment of FIG. 5A though differs in that the identification 520 of the second EI feature (along with its optional associated third confidence level) is provided to joint classification processing manager 218 by a second EI feature recognition model 216b, rather than by EI feature database 230. The second EI feature recognition model 216b may operate in a similar way to EI feature recognition model 216a in that it processes input images to identify EI features or their status, for example using artificial-intelligence-based image processing to do so. In one aspect, first (216a) and second (216b) EI feature recognition models may be trained or otherwise optimized to identify EI features of respective first and second types, wherein the first and second types are different. In another aspect, first (216a) and second (216b) EI feature recognition models may be trained or otherwise optimized to identify EI features of the same type.

In operation, one or more working images 312 from image selection processing manager 212 or image selection storage 290 spanning a portion of global terrain are provided to both a first (216a) and a second (216b) EI feature recognition model. In general, working image 312 may comprise a single image or a plurality of images that were captured at substantially the same time instance. Additionally, or alternatively, working image 310 may comprise an image time-sequence including a plurality of aerial images of the portion of global terrain, each aerial image of the plurality taken at one of a respective plurality of substantially-different image capture times.

Whilst FIG. 5B depicts the same working image or images 312 being provided to both the first (216a) and second (216b) EI feature recognition models, it shall be appreciated that in embodiments, a working image or set of working images may be provided to the second EI feature recognition model 216b that is different to the working image or set of working images that is provided to the first EI feature recognition model 216a.

In FIG. 5B, the first EI feature recognition model 216a is applied to the working image or images 312 in order to generate an identification 510 of a first EI feature of a first EI feature type at a first location within the portion of global terrain and at first confidence level. Identification 510 and the associated first confidence level are provided as a first input to joint classification processing manager 218.

The second EI feature recognition model 216b is also applied to the working image or images 312 in order to generate an identification 520 of a second EI feature of a second EI feature type at a second location within the portion of global terrain. Optionally, identification 520 may comprise a third confidence level that is associated with the identification. Identification 520 (and optionally the associated third confidence level) are provided as a second input to joint classification processing manager 218.

As a third input, joint classification processing manager 218 is provided with relationship information 540 on a relationship between the first and second EI features from EI feature relationship manager 220, the nature of which has been previously described in relation to FIG. 5A, and examples of which are given in Table 4.

Joint classification processing manager 218 operates on the identification 510 of the first EI feature at the first confidence level, the identification 520 of the second EI feature (optionally at the third confidence level) and on the relationship information 540 on a relationship between the first and second EI features in order to generate an updated (second) confidence level associated with the first EI feature. In FIG. 5B this is comprised within indication 530 of the first EI feature at a second confidence level, which may in turn be written to and stored within EI feature database 230 as an EI feature data record 240 for future use. Identification 530 may be one example of EI feature-level information 282. By means of example, EI feature recognition model 216a may be trained to identify proppant stores such that when applied to working image 312, EI feature recognition model 216a determines with a first confidence level of e.g., 35% that a proppant store exists at a first geographical location. However, a second EI feature recognition model 216b may be trained to identify trucks, and may determine the presence of a group of five trucks within 50 meters of the first geographical location at a confidence level of 40%. In light of relationship information 540 from EI feature relationship manager 220, that the transport of large quantities of proppant to oilfield sites is often (for example, 70% of the time) performed by groups of three or more trucks operating in convoy, joint classification processing model 218 may be able to significantly upgrade its confidence in the presence of the proppant store at the first location to a second confidence level of e.g. 80%, and to subsequently write this identification 530 thereby obtained (as one example of EI feature-level information 282) to EI feature database 230.

Figure 6:
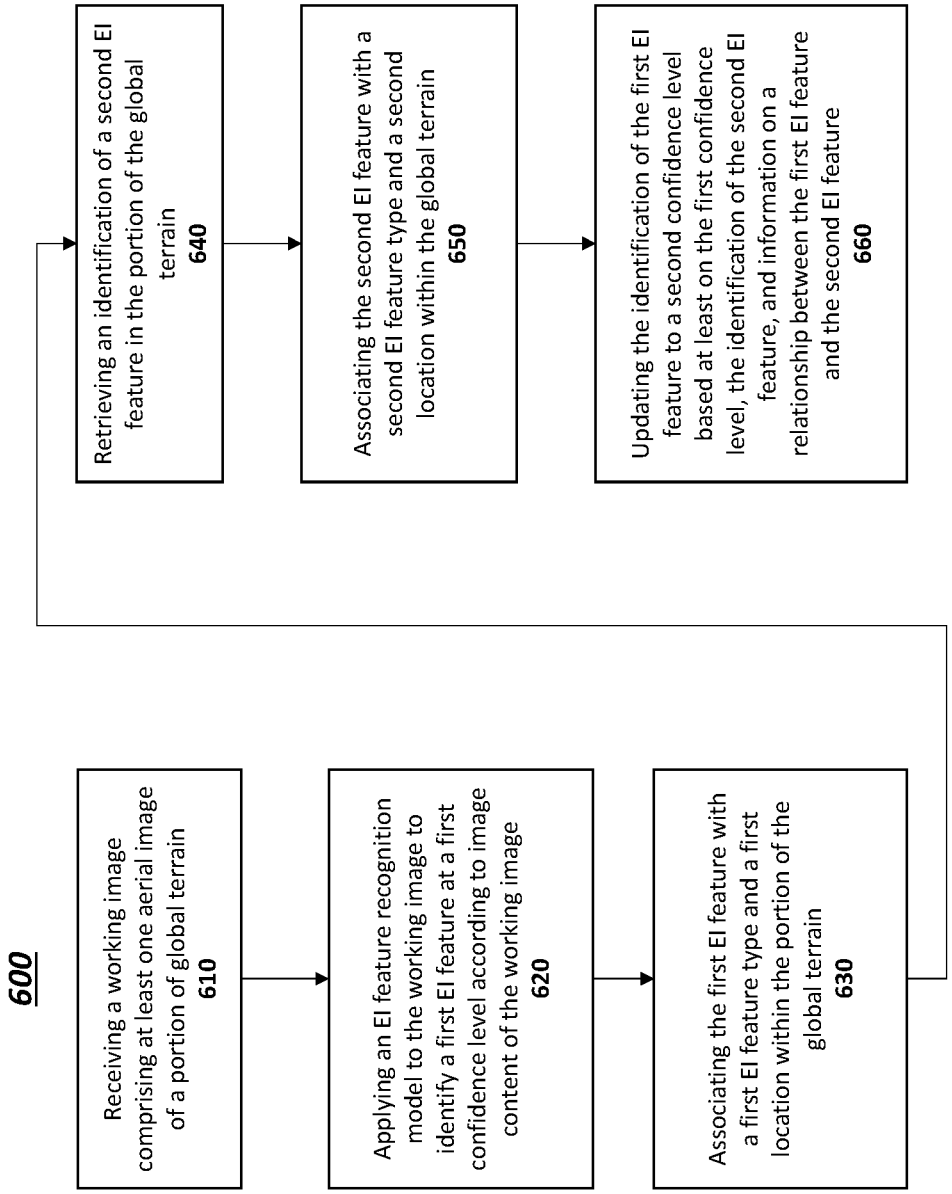
FIG. 6 illustrates an example of a method for processing images to identify EI features, according to some embodiments.

In a general overview, FIG. 6 describes a method 600 for updating the identification of an EI feature to a new confidence level based on a previous confidence level, the identification of a second EI feature, and information on a relationship between the first EI feature and the second EI feature. Method 600 may include receiving a working image comprising at least one aerial image of a portion of terrain (step 610). Method 600 may include applying an EI feature recognition model to the working image to identify a first EI feature at a first confidence level according to image content of the working image (step 620). Method 600 may include associating the first EI feature with a first EI feature type and a first location within the portion of the global terrain (step 630). Method 600 may include retrieving an identification of a second EI feature in the portion of the global terrain (step 640). Method 600 may include associating the second EI feature associated with a second EI feature type and a second location within the global terrain (step 650). Method 600 may also include updating the identification of the first EI feature to a second confidence level based at least on the first confidence level, the identification of the second EI feature, and information on a relationship between the first EI feature and the second EI feature (step 660).

Referring to FIG. 6 in more detail, in some examples, method 600 may include receiving a working image comprising at least one aerial image of a portion of terrain (step 610). In examples, the working image is a low-resolution aerial image or a portion of terrain. In some examples, the aerial image is accessible free of charge. In embodiments, the aerial image of the portion of terrain is updated periodically. In embodiments, the aerial image is a satellite image. The satellite image may be updated periodically, for example each time the satellite passes over the portion of terrain. In some embodiments, the working image is received by image selection processing manager 212. Working image may be retrieved by image selection processing manager 212 from aerial image storage 105. Images received or retrieved by image selection processing manager 212 may be stored in image selection storage 290, which may comprise working images and training images. In examples, the working image includes an image time-sequence, the image time-sequence including a plurality of aerial images of the portion of global terrain, each aerial image of the plurality taken at one of a respective plurality of image capture times, and wherein applying the EI feature recognition model includes recognizing a stage of EI feature development based on the first EI feature in the working image.

In some examples, method 600 may include applying an EI feature recognition model 216a to the working image to identify a first EI feature at a first confidence level according to image content of the working image (step 620). In examples, EI feature recognition model 216a may be an AI model that has been trained to identify a specific EI feature type. The method may include applying a plurality of EI feature recognition models to the working image to identify the first EI feature, each of the plurality of EI feature recognition models trained to identify different EI feature types. In some embodiments, EI feature recognition model 216a may be applied to the working image in addition to one or more additional images from image selection processing manager 212 or from image selection storage 290 to identify the first EI feature. The one or more additional images that EI feature recognition model 216a is applied to may be selected by image selection processing manager 212 to be images from the portion of terrain, from a portion of terrain adjacent to the portion of terrain, or from the portion of terrain at different times. In embodiments, the choice of the EI feature recognition model may be made according to image content of the working image. In examples, the confidence level of the identification of the first EI feature may be chosen from a set of values. The set of values may be a binary choice, wherein one value represents no confidence and a second value represents full confidence (for example, the values 0 and 1 respectively). The set of values may include a plurality of discrete values, representing a scale of confidence between no confidence and full confidence (for example the set of values may be [0, 1, 2, 3, 4, 5], or [0, 0.2, 0.4, 0.6, 0.8, 1]) wherein a higher value represents higher confidence and the highest value represents full confidence. The set of values may be represented by a continuum of values between two endpoints, for example: confidence=[0, 1], x∈R.

In some examples, method 600 may include associating the first EI feature with a first EI feature type and a first location within the portion of the global terrain (step 630). Examples of EI feature types are given in Table 2. In embodiments, EI feature recognition model 216a may be generated by training a neural network to recognize EI features of a specific EI feature type. In some examples, a different EI feature recognition model 216a, 216b, . . . 2116n may be generated for one or more specific EI feature types.

In some examples, method 600 may include retrieving an identification of a second EI feature in the portion of the global terrain (step 640). In some embodiments, identification of a second EI feature is retrieved by applying a second EI feature recognition model 216b to a working image. In examples, the identification of the second EI feature is retrieved from a supplemental information source 270. Examples of supplemental information sources are given in Table 1. In embodiments, the supplemental information source is a public records information source 250, and the supplemental information is a public record 260.

In some examples, method 600 may include associating the second EI feature associated with a second EI feature type and a second location within the global terrain (step 650). In some embodiments, different EI feature recognition models 216 may be applied to the same image or set of images to determine EI features of different EI feature types from the same image or set of images. In some embodiments, the second EI feature is a different EI feature type than the first EI feature.

In some examples, method 600 may also include updating the identification of the first EI feature to a second confidence level based at least on the first confidence level, the identification of the second EI feature, and information on a relationship between the first EI feature and the second EI feature (step 640). In embodiments, the identification of the second EI feature includes its own confidence level, distinct from the confidence levels associated with the first EI feature. The method may include updating the identification of the first EI feature based on the identification of the second EI feature and its confidence level. In some examples, the confidence level of the first EI feature may be updated to a new confidence level based on the confidence level of the identification of the second EI feature. In embodiments, updating the confidence level of the identification of the first EI feature may be based, in part or in whole, on the first EI feature type and the second EI feature type. In examples, updating the confidence level of the identification of the first EI feature may be based, in part or in whole, on the location of the first EI feature and the location of the second EI feature, or in some embodiments on the distance between the first EI feature and the second EI feature. EI feature recognition model 216 may be modified in a training mode of operation, where the modification of the model is based on at least one aerial image of the portion of terrain and on the updated identification of the first EI features at the second confidence level.

In embodiments, the method may include updating EI feature database 230, for example either creating or modifying an EI feature data record 240. In some examples, the method may create, modify, or update an EI feature data record 240 with a location of an EI feature and/or a type of any EI feature. In examples, updating EI feature database 230 is contingent upon the confidence level of the identification of the first EI feature meeting or exceeding a predetermined confidence threshold. The EI feature data record 240 may include the confidence level of the EI feature identification. The identification of the second EI feature may be retrieved from EI feature database 230, which may be organized in EI feature data records 240 comprising one or more pieces of information, for example presence, type, or status attribute.

In embodiments, the method may include identifying a status attribute of the first EI feature. Examples of EI feature status attributes are given in Table 3. In examples, the status attribute of the first EI feature may be stored in an EI feature data record 240 in EI feature database 230. In embodiments, EI feature recognition model 216 identifies the status attributes of EI features.

The method may include providing EI feature-level information 282 relating to the first EI feature to online platform 180, to be in turn provided to user 190 and/or subscriber 195 of online platform 180, for example over network 104.

Image Selection Processing

A primary task of the system is to detect and classify EI features using image processing within EI feature determination manager 280 or EI feature recognition model 216. An appropriate set of images must therefore be supplied to EI feature determination manager 280 or EI feature recognition model 216.

A wide variety of considerations may play a role in selecting a particular set of images on which EI feature determination manager 280 or EI feature recognition model 216 is to be applied. However, as has been previously described, EI feature recognition model 216 may generally be operated in training mode (operating on training images 310) or in working mode (operating on working images). Hence, in some examples of system 200, image selection processing manager 212 operates to supply one or more training image 310, and/or one or more working image 312 to EI feature determination manager 280 or EI feature recognition model 216.

Figure 7A:
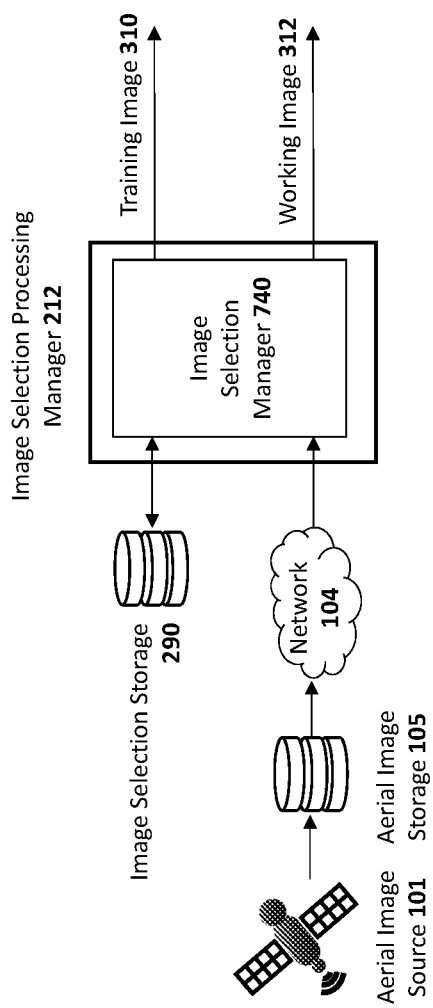
FIG. 7A shows an example of a system for selecting and storing working and training aerial images to apply to an EI feature recognition model, according to some embodiments.

FIG. 7A depicts a basic block diagram of image selection processing manager 212, comprising in this basic example, image selection manager 740. In this example, image selection manager 740 may select aerial images from any available source to which it may be connected (either directly or via a network 104). Such available sources may include aerial image source 101, aerial image storage 105, or image selection storage 290. In general, image selection manager 740 may group or categorize aerial images according to certain criteria or according to their suitability for a particular purpose. In one example, such as the example shown in FIG. 7A, image selection manager 740 may categorize images as training images 310 or working images 312 and may provide these images to other components of system 200, such as for example, to EI feature determination manager 280 or EI feature recognition model 216. In other examples, image selection manager 740 may categorize (and provide to components of system 200) images according to a location, an image resolution, an image format, an image capture device and so forth.

As part of image selection processing manager 212, image selection manager 740 may also store selected images (optionally along with any categorization thereof), for example in image selection storage 290 for later retrieval or use. By means of example, image selection manager 740 may receive via network 104, a first aerial image from aerial image storage 105, the first aerial image previously captured by aerial image source 101. Image selection manager 740 may categorize the first aerial image as suitable for training mode purposes, and may store the image, for example in image selection storage 290 along with its categorization as a "training image". Such a categorization may be achieved by any suitable means, for example, image selection manager 740 may store metadata along with the image, the metadata comprising a suitable label for the determined category. Image selection manager 740 may further receive via network 104, a second aerial image from aerial image storage 105, the second aerial image also previously captured by aerial image source 101. Image selection manager 740 may categorize the second aerial image as suitable for working mode purposes, and may store the image, for example in image selection storage 290 along with its categorization as a "working image". In general, image selection manager may assign one or more than one categorization to an image. For example, an aerial image may be categorized as suitable for both training mode and working mode purposes and hence may be tagged with metadata including both a "training image" label and a "working image" label.

FIG. 7A shows a basic example of image selection processing manager 212. Other embodiments and methods are also possible in which additional associated processing may be advantageously employed. The area of terrain to be analyzed by the EI feature recognition model(s) may be very large, and the image recognition task may be computationally-intensive, especially at higher image resolutions. The provision of sufficient computing resource to perform the task may be associated with high operational or capital expenditures, thus from a practical standpoint, available processing power may be necessarily constrained and there is then a need to determine on which areas of global terrain to focus the finite processing power that is available.

A further issue is that imagery suppliers may link the cost of aerial images to the resolution of the image, the age of the image, or both. Thus, whilst the use of recent higher-resolution imagery is always preferred in order to improve the timeliness and accuracy of the EI feature recognition, the acquisition of such aerial imagery may carry high cost. Therefore, it may be beneficial to sparingly and selectively obtain high resolution aerial imagery only for those areas of terrain that have a high probability of yielding new and useful EI feature-level information from the application of detailed image processing. Such new information may comprise for example, the appearance or disappearance of an EI feature, or a change in its status, such as a drop in a water level of an oilfield frac-pit.

To address the aforementioned concerns, in an alternative embodiment and complementary method, additional auxiliary processing of the underlying aerial image data may be used to assist with, steer or direct the primary EI feature recognition task, for example to selectively focus available image processing power only on areas of terrain of particular interest. Such auxiliary processing may be performed by image selection processing manager 111 and may be run prior-to, or in-parallel-with the primary EI feature detection and recognition task. In either case, the outcomes of the auxiliary processing are used to control or obtain the set of images on which the EI feature recognition model(s) 216 operate. An example of such an embodiment is shown in FIG. 7B.

Figure 7B:
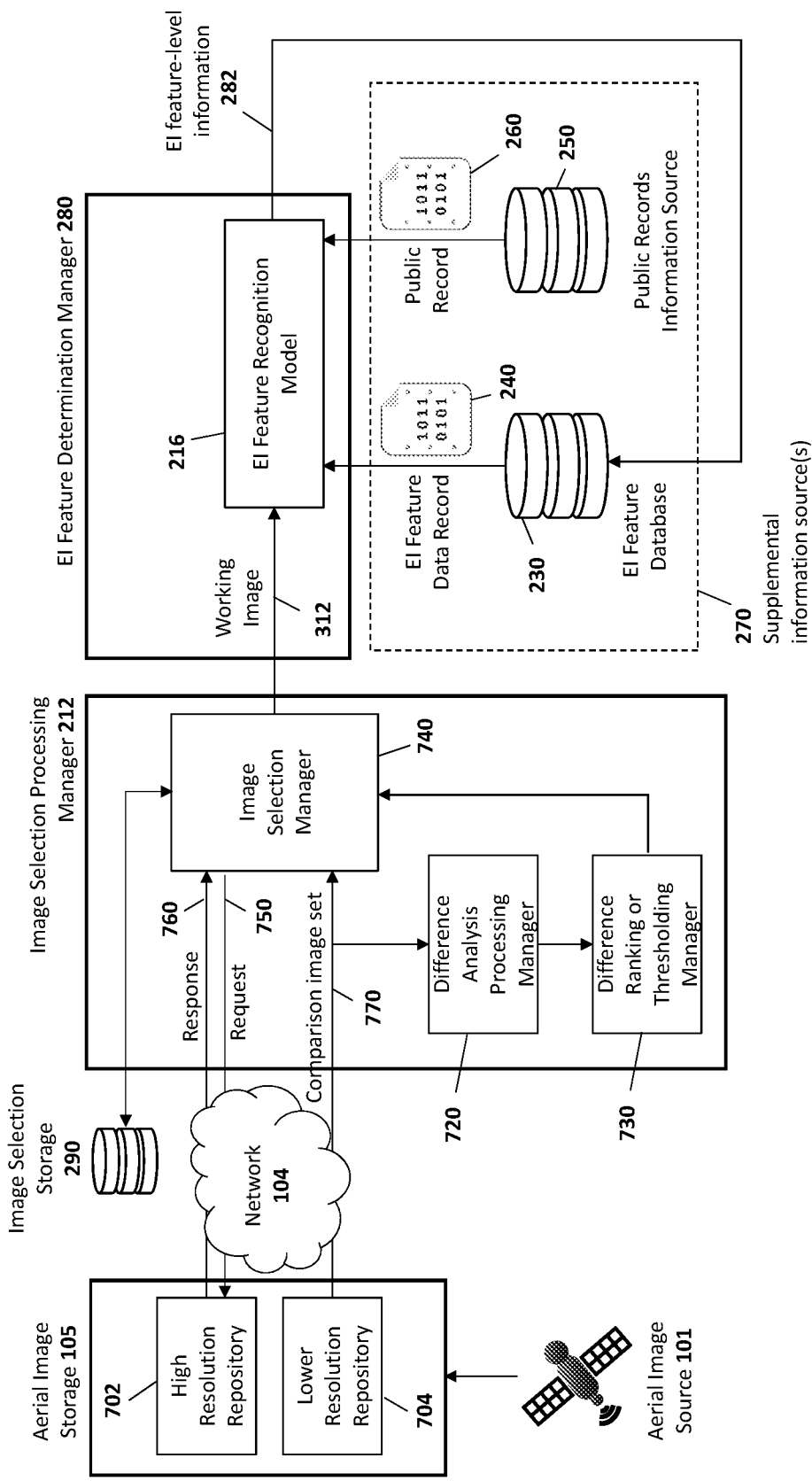
FIG. 7B shows an example of a system for selecting aerial images to apply to an EI feature recognition model, according to some embodiments.

FIG. 7B depicts EI feature recognition model 216 operating on a working image or images 312, wherein the working image 312 is selected by image selection processing manager 212. Image selection processing manager 212 may operate by selecting images of portions of global terrain that demonstrate differences over time. By comparing images taken of portions of global terrain taken at different times, the image selection processing manager 212 can pre-select images that are more likely to contain new features, such as new EI features. The image selection processing manager 212 may detect differences that are indicative of EI site development or construction.

Aerial image source 101 may be capable of providing images at different resolutions. For example, high resolution images may be available and stored within a high-resolution repository 702, whilst lower-resolution images may be available and stored within a lower-resolution repository 704, within one or more aerial image storage 105. Image selection processing 212 may comprise a difference analysis processing manager 720 that operates on a 'comparison image set' 770. In the example of FIG. 7B, comparison image set 770 is shown comprising a plurality of aerial images taken from lower resolution repository 704, though in general it may comprise any set of aerial images (at any resolution) available, for example from aerial image source 101, aerial image storage 105, an intermediate image repository such as high-resolution repository 702 or lower resolution repository 704, or from image selection storage 290.

Preferably, comparison image set 770 comprises at least a first image of a portion of global terrain associated with a first time of image capture $T_1$, and a second image also spanning the first portion of global terrain but associated with a second (later) time of image capture $T_2=T_1+\Delta$. The difference analysis processing manager 420 operates to compare the first image with the second image in order to determine one or more geographical locations at which a difference in terrain content appears to exist. Such difference analysis may be based on pixel values or any other image content data of the first and second images. A number of image differencing techniques are known, and any of such techniques may be suitable for use by difference analysis processing manager 720. In a basic example, the first and second images may first be suitably scaled and aligned in terms of position, resolution or both, such that a first set of pixels in the first image and a second set of pixels in the second image correspond to the same geographical area of terrain. In a further step, photometric or spectral analysis of the first and second images may be performed, and linear or non-linear adjustments made to one or both of the images to align or calibrate their brightness or color content. Once the images have been aligned in terms of scale, position, brightness or color, difference analysis processing manager 720 may compute an image difference comparison (for example using a subtraction operation, or an XOR operation) between image content for a set of pixels in the first image and image content for a corresponding set of pixels in the second image.

The output of the comparison operation performed by difference analysis processing manager 720 may initially identify a large number of differences or 'hits', hence it may be useful to reduce this set to a smaller number of focus locations (those of the most interest, or most-likely to contain new information on EI features). To facilitate this, the output from difference analysis processing manager 720 may optionally be passed (as is shown for the embodiment of FIG. 7B) to difference ranking or thresholding manager 730 for further processing in order to determine a metric "$M_i$," representative of the importance or level-of-relevance of a particular difference having index "i". In one example, $M_i$ may be related to a magnitude or a scale of the difference in terrain content. In another example, $M_i$ may be related to a determined likelihood that the difference in terrain content is related to EI feature development. If such further processing is however not required, the output from difference analysis processing manager 720 may be passed directly to image selection manager 740.

In deriving $M_i$, attributes of the difference may be assessed by difference ranking or thresholding manager 730, In some examples, said attribute may be a size, a scale, a location, a color, a brightness, a luminosity, a shape, a proximity or relation to other image content within the image difference comparison, or a geographical proximity to other known features within the portion of global terrain.

Whilst not shown explicitly in FIG. 7B, supplementary or external data sources, such as EI feature database 230 or public records information source 250 may also be used when determining $M_i$. This allows information such as previously-detected EI features and their locations, or drilling permit records, to also be factored-in as part of the $M_i$ assessment.

By means of a general description, when deriving $M_i$, a parameter or value $v_{k,i}$ may be measured, calculated or otherwise assigned to the $k^{th}$ attribute of difference "i". For example, difference ranking or thresholding manager 730 may receive an image difference comparison image from difference analysis processing manager 720 in which a first (i.e. i=1) difference is identified comprising a contiguous region of pixels that have values lying within a predefined color range. Such an identified difference may be associated with a first (i.e. k=1) size attribute, for which a value $v_{k,i}$ is measured as 134 pixels wide. Recognizing that some attribute types may have a stronger influence on the importance or relevance level $M_i$ than others, each may be associated with a particular weighting factor $w_k$. The overall importance or relevance level $M_i$ may then be calculated via a weighted sum as shown in the equation below:

$$M_i = \sum_k w_k \cdot v_{i,k}$$

The set of $M_i$ for all detected differences may then be compared or ranked by difference ranking or thresholding manager 730 in order to determine those detected differences on which to focus. For example, the highest-ranked "N" of these may be selected. In embodiments, the $M_i$ values may be compared against a predetermined threshold, and those exceeding the threshold are selected. It shall be appreciated that numerous other methods of determining a subset of detected differences on which to focus are also possible.

Image selection manager 740 may receive an output from either the difference analysis processing manager 720 or (when employed) the difference ranking or thresholding manager 730. Such output may comprise a subset of image differences (and/or their geographical locations) that have been identified and selected. Image selection manager 740 operates on this output in order to select or obtain an appropriate working image or images 312 that span one or more of the identified geographical locations (where terrain differences have been identified) and on which EI feature recognition model 216 is to be applied. The selected working image or images 312 represent one example of the selected image(s) 215 shown in FIG. 2B. In a first example, image selection manager 740 may select working images 312 from comparison image set 770 or directly from lower resolution repository 704. In a second example, image selection manager 740 may determine to select working images 312 from high resolution repository 702. If such high-resolution images are not yet readily available to image selection processing manager 212 (for example, fees to acquire them from an aerial image supplier have not yet been paid), image selection manager 740 may initiate a request 750 to obtain, via response 760, high resolution aerial images from high resolution repository 702, the high resolution images spanning one or more of the identified geographical locations at which an image difference has been detected, and on which the EI feature recognition model 216 is to be applied.

The output from difference analysis processing manager 720 or difference ranking or thresholding manager 730, although not shown explicitly in FIG. 7B, may also be used by the system for purposes other than image selection. For example, the system may utilize the information on geographical locations at which an image difference has been detected to initiate the capture of additional aerial images spanning said locations. Additionally, or alternatively, the system may supply a notification that further follow-up inspection or a manual site visit at said locations is warranted. Such visits are costly in terms of time and manpower, hence the aforementioned difference analysis processing may help to minimize unnecessary site visits and expenditure.

Working image or images 312 are then supplied to EI feature recognition model 216, which analyzes the image in order to generate EI feature-level information 282, optionally based also on supplementary information obtained from EI feature database 230 (in the form of one or more EI data records 240) or from public records information source 250 (in the form of one or more public records 260). The EI feature-level information 282 thereby derived may be written to EI feature database 230 for storage and future use.

The description of FIG. 7B outlines processing that may be used by image selection processing manager 212 to select one or more working image 312. It should be appreciated that this is for illustrative purposes only and that similar or related systems and methods may be employed within image selection processing manager 212 in order to select training images 310, working images 312, or any other categorization of image. Image selection processing manager 212 may be further configured to supply such selected images to other components of the system, such as to EI feature determination manager 280, to categorize such selected images (for example as training images or working images) or to store such selected images, for example in image selection storage 290.

Figure 8:
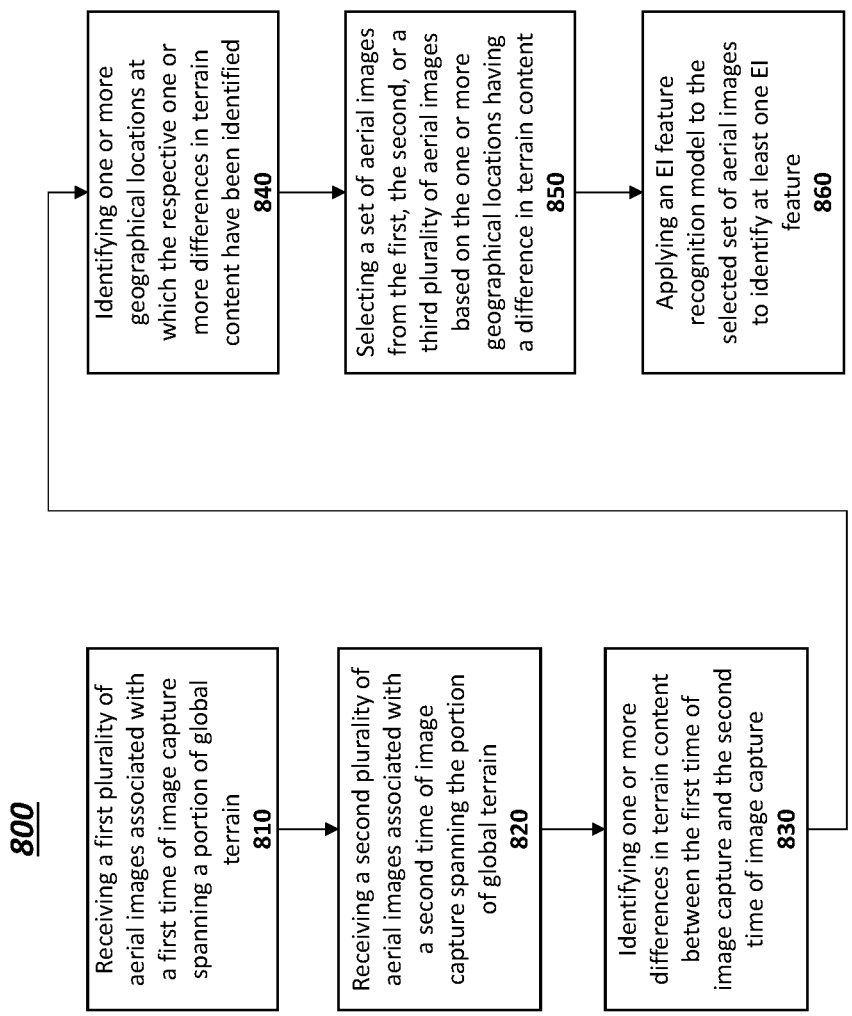
FIG. 8 illustrates an example of a method for selecting aerial images for image processing to identify EI features, according to some embodiments.

FIG. 8 represents a method 800 of selecting aerial images for image processing to identify EI features. In a general overview, method 800 may include retrieving a first plurality of aerial images associated with a first time of image capture, spanning a portion of global terrain (step 810). Method 800 may include retrieving a second plurality of aerial images associated with a second time of image capture spanning the portion of global terrain (step 820). Method 800 may include identifying one or more differences in terrain content between the first time of image capture and the second time of image capture (step 830). Method 800 may include identifying one or more geographical locations at which the respective one or more differences in terrain content have been identified (step 840). Method 800 may include selecting a set of aerial images from the first, the second, or a third plurality of aerial images based on the one or more geographical locations having a difference in terrain content (step 850). Method 800 may also include applying an EI feature recognition model 216 to the set of aerial images to identify at least one EI feature (step 860).

Referring to FIG. 8 in more detail, method 800 may include receiving a first plurality of aerial images associated with a first time of image capture, spanning a portion of global terrain (step 810). The first plurality of aerial images may be received as a group of images and/or may be received individually and sequentially for further analysis by the image selection manager 740. In one example, the first plurality of aerial images may comprise at least a first image of a first geographical area within the portion of global terrain and a second image of a second geographical area within the portion of global terrain. Both the first image and the second image may be associated with a first time of image capture $T_1$. The first time of image capture $T_1$ may be represented at different granularities or resolutions. For example, $T_1$ may be a time of capture that is accurate to one second, one minute, one hour, one day, one week, one month or one year.

Method 800 may include receiving a second plurality of aerial images associated with a second time of image capture spanning the portion of global terrain (step 820). The second plurality of aerial images may be received as a group of images and/or may be received individually and sequentially for further analysis by the image selection manager 740. In one example, the second plurality of aerial images may comprise at least a third image of a third geographical area within the portion of global terrain and a fourth image of a fourth geographical area within the portion of global terrain. Both the third image and the fourth image may be associated with a second time of image capture $T_2$. The second time of image capture $T_2$ may be represented at different granularities or resolutions. For example, $T_2$ may be a time of capture that is accurate to one second, one minute, one hour, one day, one week, one month or one year.

In examples, a geographical location within the portion of global terrain and spanned by the first or second images may also be spanned by the third or fourth images, such that the geographical coverage of the first plurality of images overlaps with the geographical coverage of the second plurality of images.

Method 800 may include identifying one or more differences in terrain content between the first time of image capture and the second time of image capture (step 830). In embodiments, image selection processing manager 212 may compare a first comparison image from the first plurality of images with a second comparison image from the second plurality of images, wherein a particular geographical location is spanned by both of the first and second comparison images. Such an image difference comparison may be based on pixel values or any other image content data of the comparison images. Various image differencing techniques may be employed. For example, identifying differences in terrain content may include adjusting a scale or a resolution of a first comparison image from the first plurality of aerial images to align with a scale or resolution of a second comparison image from the second plurality of aerial images. In embodiments, image selection processing manager 212 may align a first set of pixel positions in the first comparison image with a second set of pixel positions in the second comparison image such that the first and second sets of pixel positions correspond to the same geographical area. In some examples, image selection processing manager 212 may compute an image difference comparison between image content of the first comparison image associated with the first set of pixel positions and image content of the second comparison image associated with the second set of pixel positions. In performing the comparison, image selection processing manager 212 may perform photometric or spectral analysis of the first and second comparison images, and linear or non-linear adjustments may be made to one or both of the comparison images to align or calibrate, for example, their brightness or color content. Computation of the image difference comparison (for example, by a difference analysis processing manager 720 within image selection processing manager 212) may be based on, for example, a subtraction operation, or an XOR operation between image content in the first and second comparison images. In embodiments, the difference in pixel values between at least one aerial image from the first plurality of aerial images and at least one aerial image from the second plurality of aerial images is representative of the development of an EI feature or EI site.

Step 830 may further include post-processing an image difference comparison to identify differences. In embodiments, image selection processing manager 212 may identify differences based on, for example, a magnitude, size or scale of image content within a previously-computed image difference comparison, and optionally based on an assessment of said image content against one or more thresholds. More generally, image selection processing manager 212 may post-process an image difference comparison to identify differences based on measuring or calculating a value associated with an attribute of a candidate difference present within the image difference comparison. In some examples, said attribute may be a size, a scale, a location, a color, a brightness, a luminosity, a shape, a proximity or relation to other image content within the image difference comparison, or a geographical proximity to other known features within the portion of global terrain.

In some examples, image selection processing manager 212 may determine a level of relevance associated with an identified difference in terrain content at at-least one of the one or more geographic locations. In embodiments, the level of relevance is representative of one of a magnitude or scale in the difference in terrain content between the first time of image capture and the second time of image capture. In embodiments, the level of relevance may be representative of a determined likelihood that the difference in terrain content between the first time of image capture and the second time of image capture is related to EI feature development.

In embodiments, determining the level of relevance of the differences observed comprises determining a value for each of one or more difference attributes associated with an identified difference in terrain content and determining one or more weighting factors associated with each of the representative one or more difference attributes. In examples, the level of relevance of the identified difference in terrain content is based on a sum over the one or more difference attributes, of the product of the value of each difference attribute and an associated weighting factor. Processing to determine an importance or level of relevance of a candidate difference within a result of an image comparison, may further comprise communicating with an EI feature database 230 or a public records information source 250 to retrieve information on previously-detected EI features and their locations.

In embodiments of method 800, image selection processing manager 212 may select images to store (for example in image selection storage 290), or to provide to other components of the system (such as EI feature determination manager 280 or EI feature recognition model 216) based on the identified differences. In some examples, image selection processing manager 212 may select a subset of the detected differences and base a selection of images thereupon. In general, image selection processing manager may select images based on the determined level of relevance, a ranking of a plurality of determined levels of relevance, and/or a comparison of one or more levels of relevance with a predetermined threshold.

Method 800 may include identifying one or more geographical locations at which the respective one or more differences in terrain content have been identified (step 840). In embodiments, image selection processing manager 212 may determine a geographical location corresponding to a portion of image content within an image difference comparison, the portion of image content comprising an identified difference. In examples, the geographical location may be based on a known geographical coverage of the aerial images used to form the image difference comparison, optionally in conjunction with projections or mappings of pixel locations within the aerial images or within the image difference comparison to geographical coordinates.

Method 800 may include selecting a set of aerial images from the first, the second, or a third plurality of aerial images based on the one or more geographical locations having a difference in terrain content (step 850). In some examples, image selection processing manager 212 selects the set of aerial images from the first plurality of aerial images, the second plurality of aerial images, or a third plurality of aerial images based on a determined level of relevance, a ranking of a plurality of determined levels of relevance, and/or a comparison of one or more levels of relevance with a predetermined threshold. In some examples, the third plurality of aerial images has an image resolution that is different from the image resolution of either the first or second plurality of aerial images. The third plurality of aerial images may have an image resolution that is higher than the image resolution of either the first plurality of aerial images and the second plurality of aerial images or both. The third plurality of aerial images may be obtained by the image selection processing manager 212 from any suitable source, such as aerial image storage 105, aerial image source 101, or image selection storage 290.

Method 800 may also include applying an EI feature recognition model 216 to the selected set of aerial images to identify at least one EI feature (step 860). In examples, an image selection processing manager 212 may provide one or more selected aerial images 215 to an EI feature determination manager 280 or to an EI feature recognition model 216. The selected aerial images 215 may comprise one or more training image 310, and/or one or more working image 312. In examples, EI feature determination manager 280 or EI feature recognition mode 216 may process the selected aerial images 215 in order to determine EI feature-level information 282. In embodiments, a server 106 comprising EI feature determination manager 280 or EI feature recognition model 216 may provide the determined EI feature-level information 282 to a user 190 or a subscriber 195 of online platform 180.

EI Site Status Based on Multiple EI Features

The foregoing has described the processing performed within the system for identifying and classifying EI features using one or more EI feature recognition models and for determining the status of associated EI feature attributes. Methods to improve or optimize the associated processing have also been described.

In its raw or 'stand-alone' form, such EI feature-level information 282 (as for example may be stored within the EI feature database 230 of FIG. 2A) has significant value to users of online platform 180, who may subsequently use and further process the information in a manner specific to their own needs.

In continued reference to FIG. 2A, the utility and value of the EI feature-level information 282 may be further enhanced through additional processing, for example by EI status determination manager 222 to form a composite indication of EI site status 284. Such a composite indication may represent the activity or status at an EI 'site'-level, the site encompassing multiple individual EI features. In an oilfield-related example, the EI site may be an oilfield drilling or fracturing site and the multiple EI features may comprise a well pad, a frac-water pit, tank batteries, and so forth.

Figure 9A:
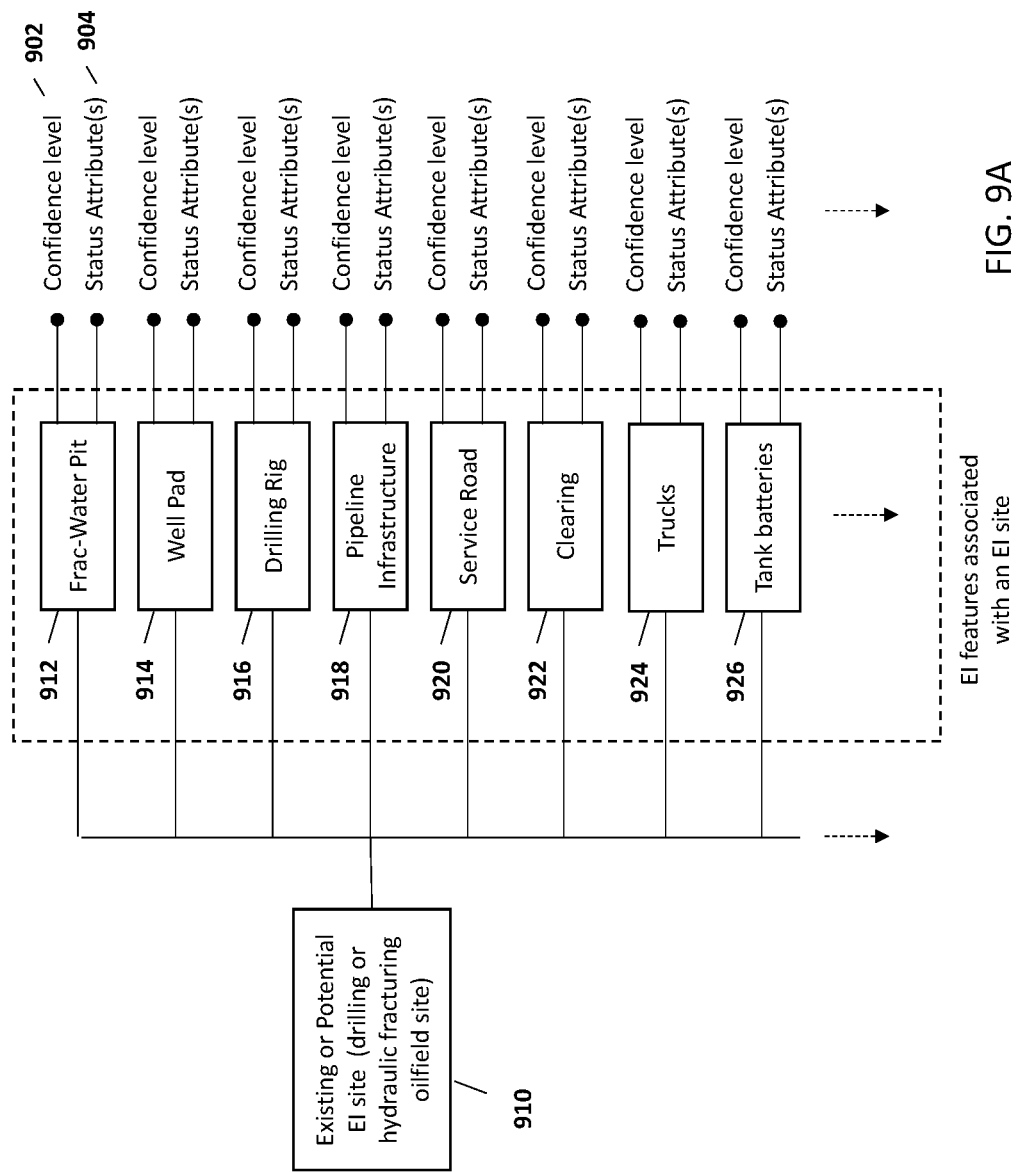
FIG. 9A illustrates oilfield-related EI features associated with an EI site, according to some embodiments.

FIG. 9A illustrates an oilfield-related example of such a set of individual EI features (912, 914, 916, 918, 920, 922, 924, 926) that may be associated with an existing or potential EI site, such as an oilfield drilling or hydraulic fracturing site 910. The system identifies, and stores information associated with EI features across the terrain and forms a determination as to which existing or potential EI site they may be related to. This determination may be performed for example based on one or more of a geographical proximity or grouping of EI features, a common surface-rights ownership, and a common mineral-right lease land ownership. The information stored by the system relating to each EI feature may further be associated with additional information such as a confidence level 902 (for example, a level of certainty as to whether the identification of the EI feature at that location is accurate), or with a status attribute 904 of the EI feature.

Figure 9B:
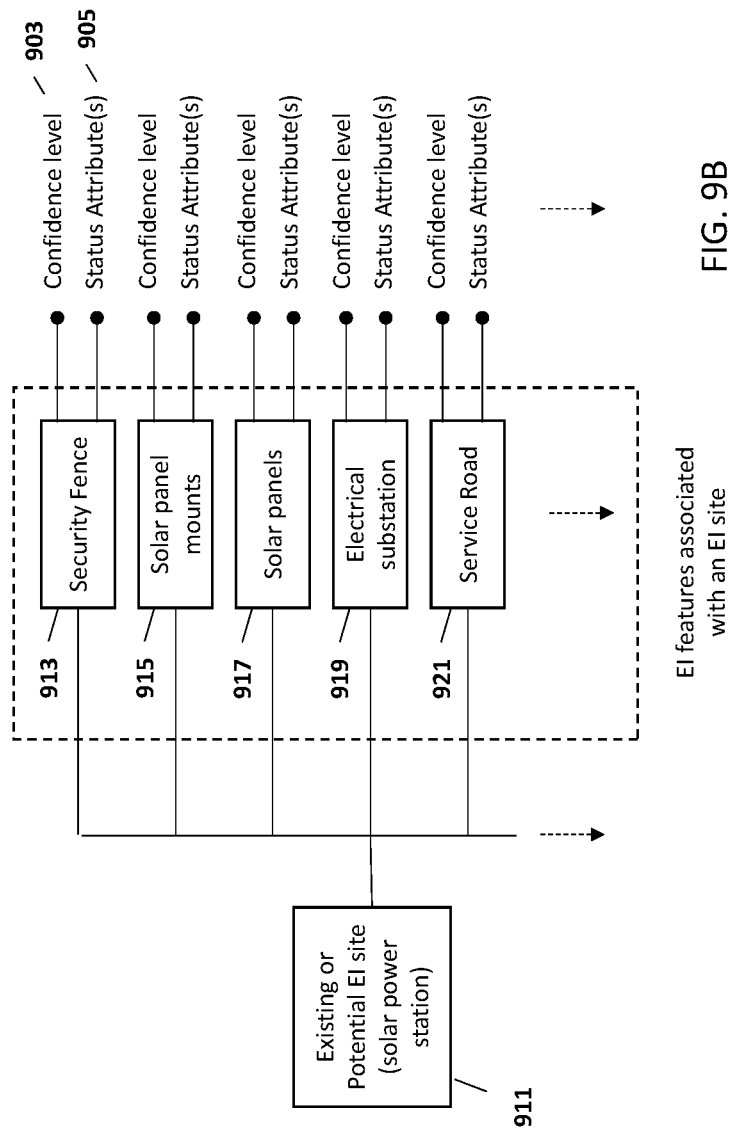
FIG. 9B illustrates solar-related EI features associated with an EI site, according to some embodiments.

FIG. 9B illustrates a similar but solar-related example of a set of individual EI features (913, 915, 917, 919, 921) that may be associated with an existing or potential EI site, in this case, a solar power station 911. As was described for FIG. 9A, the information stored by the system relating to each EI feature may further be associated with additional information such as a confidence level 903 or with a status attribute 905 of the EI feature.

Early availability of a composite indication of EI site activity or status is of great interest to many different participants of the energy industries, including operators, equipment suppliers, service providers and financial bodies. However, current methods of determining EI site activity are heavily reliant on word-of-mouth and formal public record keeping. These are often incomplete, unreliable or outdated and hence their usefulness is impaired. In an oilfield-related example, drilling permits may often not be filed significantly in-advance of when drilling starts, and some may even be filed after commencement of drilling. As a result, methods currently in use provide information on EI site status that in fact lags actual status by several months.

In comparison, because the development of an EI site (such as an oilfield drilling site) takes some appreciable time, its early stages are often visible significantly in advance of an associated permit filing. Thus, by using and processing the collected feature-level information (optionally in conjunction with other external data sources), the system of the present invention is able to substantially reduce the time taken to provide a composite indication of EI site activity or status at a given confidence level, for example, a 90% probability that oilfield drilling activity will commence within the next 7 days.

Such an indication that oilfield drilling is likely to be imminent is just one example of a composite indication of EI site activity or status that may be determined by the proposed system. Other examples of composite indications of EI site activity or status are given in Table 5.

TABLE 5

Examples of Composite Indications of EI Site Activity or Status

An EI site has reached a particular stage of development.
An oilfield EI site has all necessary facilities to commence drilling.
Drilling has commenced on an oilfield EI site.
Drilling has ceased on an oilfield EI site.
Hydraulic fracturing has commenced on an oilfield EI site.
Hydraulic fracturing has ceased on an oilfield EI site.
An EI site exhibits an absence of activity.
An EI site exhibits a commencement or recommencement activity.
A need for transport or infrastructure associated with a resource at an EI site has been identified.
A shortage or abundance of supplies, resource or equipment has been detected at an EI site.
An EI site is non-operational and is not supplying energy to an electrical power grid.
An EI site is operational and is supplying energy to an electrical power grid.

By means of an oilfield-related example, the presence of a relatively large number of inactive rigs stacked in a storage yard may be indicative of 'slack' or excess capacity for drilling rigs, and hence reduced drilling costs may be forecast. Conversely, if all rigs are active and the storage yards are empty, there may be a shortage of rigs and costs may rise. Similar logic may be applied to stores of resources such as water or proppant.

Also, the relationship between features and company or well performance may be used for competitive intelligence and process optimization. For example, the amount of time an oilfield rig or frac-spread is present on a site combined with lease operator identity might indicate the efficiency of an operator's business and return on capital. Or the number of pressure pumps in a frac-spread and size of a proppant store and apparent water utilization when related to later-reported oil well production figures for that location might indicate a more optimal drilling and completion process that could be copied for better results. Examples of relationships are given in Table 4.

In the proposed system, each candidate composite indication of EI site activity or status is associated with a corresponding set of characteristics or inputs (such as those of FIG. 9A or FIG. 9B). The system has knowledge regarding each of these inputs and may associate a confidence level 902 (FIG. 9A) or 903 (FIG. 9B) with each. For example, the system may associate the appearance of a new service road in an oilfield region with a pre-defined composite indication of EI site activity or status that the early stages of a developing oilfield drilling site are present. The system may initially have only a 15% confidence level that the feature observed is indeed a road. However, other inputs or characteristics are also associated with the same composite indication, such as the appearance of a clearing, the absence of any non-oilfield construction permits (such as for a home or industrial building), the presence of a mineral lease, and a stockpile of sand. These characteristics are not independent, hence whilst the system may initially have only a low confidence level in each, it may deduce that the likelihood of these features appearing within a given radius or proximity of one another and within a given time span in an uncoordinated fashion is low, and hence may deduce a composite indication, with high certainty, that the area is indeed a developing oilfield drilling site.

Figure 9C:
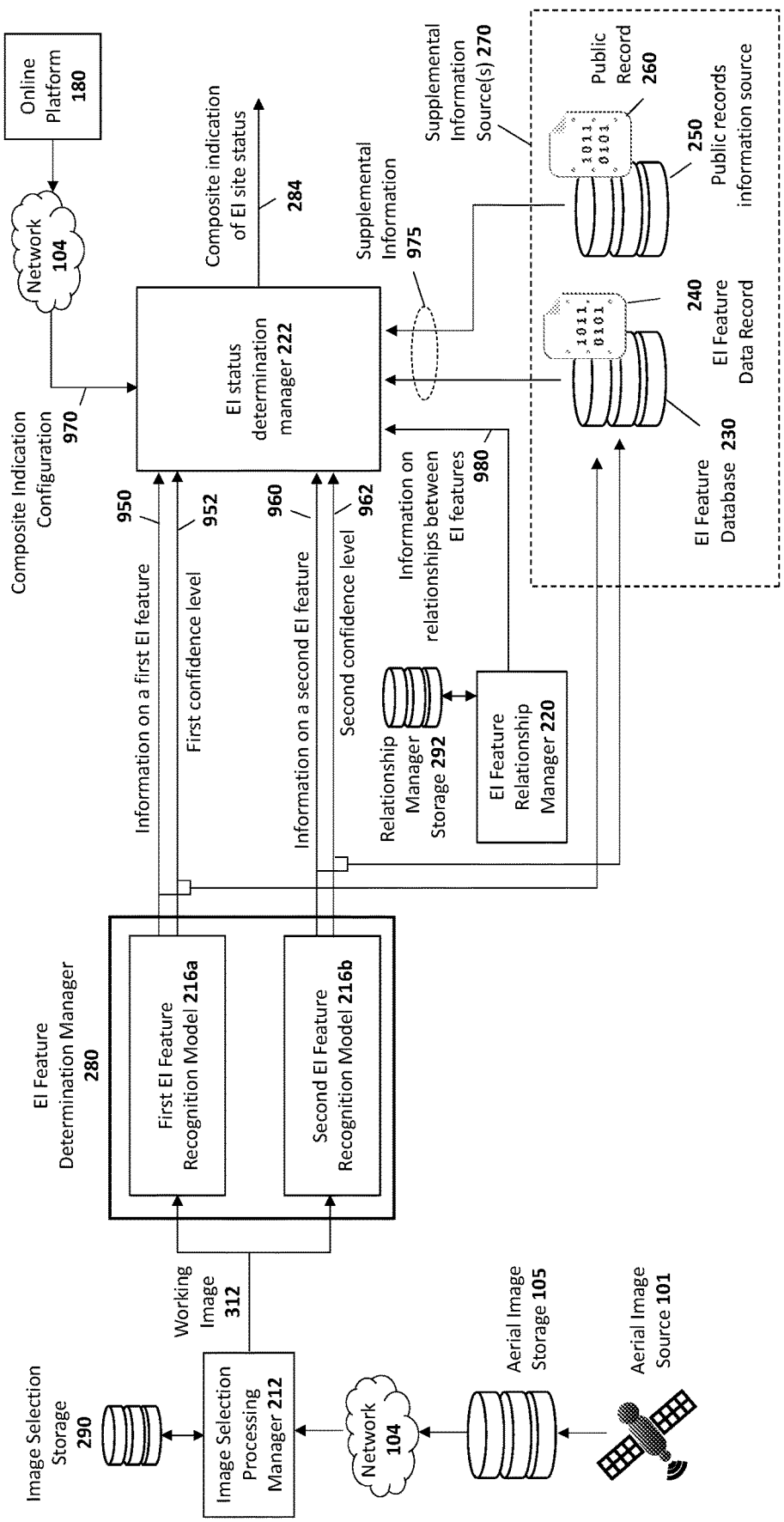
FIG. 9C shows a simplified block diagram of a system for determining a composite indication of EI site status, according to some embodiments.

FIG. 9C depicts an embodiment of the system in which a composite indication of EI site status 284 is determined by EI status determination manager 222. A working image or images 312 is provided to both a first (216a) and a second (216b) EI feature recognition model. The first EI feature recognition model may be trained or otherwise optimized to recognize EI features of a first type, and the second EI feature recognition model may be trained or otherwise optimized to recognize EI features of a second type. EI feature recognition model 216a may output information 950 on the first EI feature at first location and an optional first confidence level 952, whilst EI feature recognition model 216b may output information 960 on the second EI feature at second location at an optional second confidence level 962. The information 950 on the first EI feature and information 960 on the second EI feature may optionally also comprise a status attribute of the respective first or second EI feature, such as the example represented by status attribute 904 of FIG. 9A or 905 of FIG. 9B. The information 950 on the first EI feature, the information 960 on the second EI feature, the first confidence level 952 and the second confidence level 962 are examples of EI feature-level information 282 as shown in FIG. 2B.

Optionally, EI status determination manager 222 may also receive relationship information 980 on a relationship between the first and second EI features from EI feature relationship manager 220. Such a relationship may comprise any information indicative of a correlation or inter-relation between the first and second EI features of the first and second EI feature types at the respective first and second locations. A non-exhaustive list of examples of relationship information 980 on a relationship between the two or more EI features is given in Table 4.

As a further option, EI status determination manager 222 may also receive supplemental information 975 from a public records information source 250 (comprising one or more public records 260 relating to the first or second EI features or their locations) or from an EI feature database 230 (comprising one or more EI data records 240 relating to the first or second EI features or their locations). Supplemental information 975 may comprise any of the supplemental or external information types that have been previously described.

Various alternative approaches are possible for the way by which EI status determination manager 222 determines a composite indication of EI site status using the available inputs 950, 952, 960, 962, 980 and 975.

In a first alternative, EI status determination manager 222 of FIG. 9C utilizes a predetermined formula, algorithm, calculation or set of rules or conditions that are associated with a candidate composite indication. These may be derived based on a composite indication configuration input 970 comprising requirements that define what the candidate composite indication is. For example, and in an oilfield-related context, one candidate composite indication may be indicative of a developing EI site (in this case, an oilfield drilling or fracturing site) where a rig has not been installed. In this case, the requirements for the candidate composite indication may be that a number of EI features have been identified as present within a radius of 300 m of one another (such as a well pad, a service road and a frac-water pit), but that a rig has not been identified at the location of the well pad. In examples, composite indication configuration 970 may be received from online platform 180, optionally via a network 104, or from an administrator 197, again optionally via a network 104.

The inputs required by EI status determination manager 222 to execute the formula, algorithm, calculation, rules or conditions may be known beforehand and their values derived at least in part based on one or more of the inputs 950, 952, 960 and 962. EI status determination manager 222 processes the feature-level inputs 950, 952, 960, and 962 according to the composite indication configuration input 970 in order to determine (for the candidate composite indication), an actual composite indication of EI site status in output 284. In one example, the composite indication 284 may be binary (for example true or false) and indicative of whether the conditions associated with the candidate composite indication (as defined by configuration input 970) have been met. In another example, the composite indication 284 may be associated with a confidence level, or with a value indicative of the degree to which conditions associated with the composite indication have been met.

In a second alternative, EI status determination manager 222 of FIG. 9C may comprise Artificial-Intelligence-based (AI-based) processing, for example, a neural network or other type of machine learning. The AI-based processing may be suitably trained, for example, including methods and techniques as discussed above, to recognize and identify a correspondence between the set of informational inputs (such as inputs 950, 952, 960, 962, 980 and 975) and one or more candidate composite indications of EI site activity or status (examples of which are given in Table 5). Thus, an Artificial Intelligence model (which may be separate to the first 216a and second 216b EI feature recognition models used for feature-level detection from aerial images) is used within EI status determination manager 222 and may be trained to recognize events or outcomes from a set of feature-level inputs that comprise feature-level information, feature-level status attributes, and potentially external or supplemental information. Once the initial training is complete, the AI-based processing within EI status determination manager 222 is then able to determine composite indications of EI site activity or status in an automated manner. The model may be further trained and refined using further human supervision or feedback from external, public, or other reliable information sources. Similar to the first alternative, EI status determination manager 222 may receive requirements that define the composite indication in composite indication configuration input 970. In one example, composite indication configuration 970 may be received from online platform 180, optionally via a network 104.

Figure 9D:
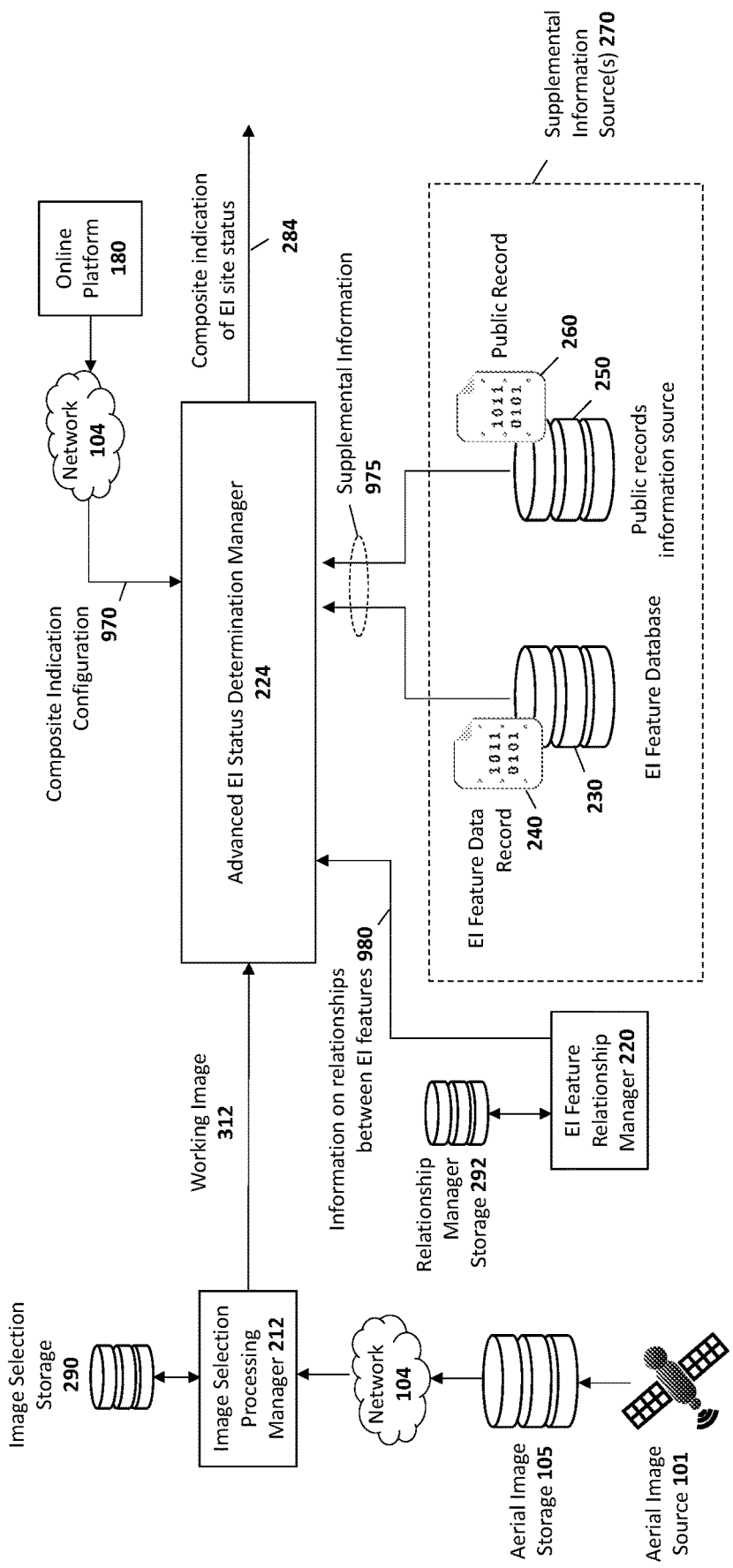
FIG. 9D shows a simplified block diagram of an alternative system for determining a composite indication of EI site status, according to some embodiments.

In a third alternative, as depicted in FIG. 9D, an advanced EI status determination manager 224 may be employed which replaces the need for the separate image-based processing (of EI feature recognition model 216) and the EI status determination processing manager 222 of FIG. 9C. By means of further illustration, and with reference to FIG. 2A and FIG. 2B, in some examples, advanced EI status determination manager 224 may be used in lieu of separate EI feature determination manager 280 and EI status determination manager 222. Advanced EI status determination manager 224 is capable of generating a composite indication of EI site status 284 directly from working image input 312 in conjunction with other optional inputs that may be available, such as supplemental information 975 and information on one or more relationships between EI features 980.

In order to do so, advanced EI status determination processing block 224 may employ artificial-intelligence based processing (such as a neural network or other machine learning algorithm) that is capable of operating on both image-based and non-imaged based informational inputs in order to generate the composite indication of EI site status 284. This differs from the system of FIG. 9C in that an intermediate determination of individual or constituent EI features (all relating in some way to the composite indication of EI site status) may not be required. Thus, the advanced EI status determination processing 224 may be trained to recognize the presence or status of an EI site as a whole (whatever its constituent parts or their development status) rather than to recognize individual EI features.

In a similar manner to that employed for the first and second alternatives of FIG. 9C, advanced EI status determination block 224 may receive requirements that define the composite indication in composite indication configuration input 970. In one example, composite indication configuration 970 may be received from online platform 180, optionally via a network 104.

Figure 10:
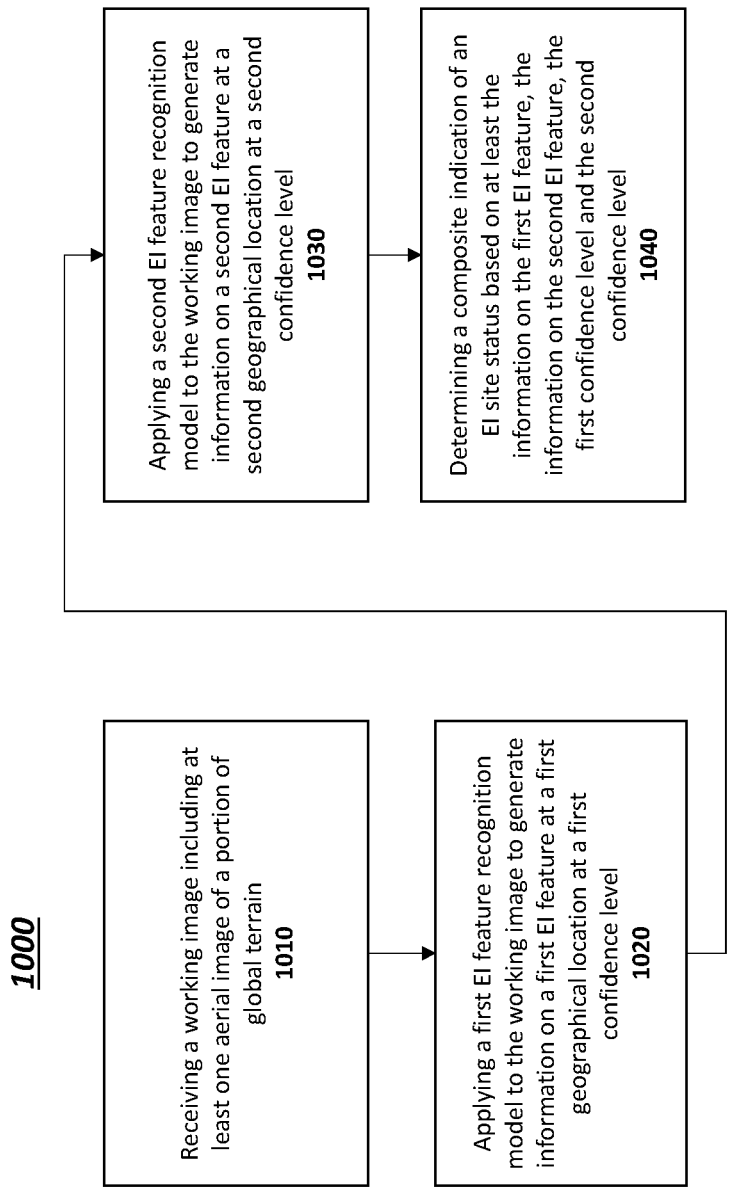
FIG. 10 illustrates an example of a method for processing images to determine EI site status, according to some embodiments.

FIG. 10 illustrates a method 1000 for processing images to determine EI site status. In a general overview, method 1000 includes receiving a working image including at least one aerial image of a portion of global terrain (step 1010). Method 1000 may include applying a first EI feature recognition model 216a to the working image to generate information on a first EI feature at a first geographical location in the portion of global terrain at a first confidence level according to image content of the working image (step 1020). Method 1000 may include applying a second EI feature recognition model 216b to the working image to generate information on a second EI feature at a second geographical location in the portion of global terrain at a second confidence level according to image content of the working image (step 1030). Method 1000 may also include determining a composite indication of an EI site status based on at least the information on the first EI feature, the information on the second EI feature, the first confidence level and the second confidence level (step 1040).

Describing FIG. 10 in more detail, method 1000 includes receiving a working image including at least one aerial image of a portion of global terrain (step 1010). In embodiments, an EI feature determination manager 280 comprising a first EI feature recognition model 216a and a second EI feature recognition model 216b may receive working image 312 from an image selection processing manager 212. Working image 312 may have been selected by image selection processing manager 212 from amongst a plurality of available aerial images, for example aerial images from an aerial image source 101, an aerial image storage 105, or an image selection storage 290, any of which may be accessed by image selection processing manager 212.

Method 1000 may include applying a first EI feature recognition model 216a to the working image to generate information on a first EI feature at a first geographical location in the portion of global terrain at a first confidence level according to image content of the working image (step 1020). In some examples, the first EI feature may be associated with a first EI feature type, some examples of which have been previously described in this disclosure, for example in Table 2.

Method 1000 may include applying a second EI feature recognition model 216b to the working image to generate information on a second EI feature at a second geographical location in the portion of global terrain at a second confidence level according to image content of the working image (step 1030). In some examples, the second EI feature may be associated with a second EI feature type, some examples of which have been previously described in this disclosure. The first EI feature type and the second EI feature type may be different in some examples. In some examples, the second EI feature recognition model 216b and the first EI feature recognition model 216a may be the same EI feature recognition model.

In embodiments, the information on the first EI feature 950 and the information on the second EI feature 960 further comprise a status attribute that is representative of a status of the respective first EI feature or second EI feature. Examples of status attributes that may be associated with different EI feature types have been described previously described in this disclosure, for example in Table 3. Some non-exhaustive examples of such status attributes may include: a detection date or time; a location; an area or size; a length, a fluid level or volume; a number of sub-parts; a surface rights owner; a mineral rights owner; a fluid or material type; a fluid or material quality; a fluid or material color, a fluid or material attribute; a connectivity, a brightness, intensity or spectral content, a power delivery or capability, a height above ground, a bore size, a flow rate and a level of activity, inactivity or operation.

Method 1000 may also include determining a composite indication of an EI site status based on at least the information on the first EI feature, the information on the second EI feature, the first confidence level and the second confidence level (step 1040). In embodiments, method 1000 may include obtaining, based on the first geographical location or the second geographical location, supplemental information 975 from a supplemental information source 270 and determining the composite indication of an EI site status 284 based further on the supplemental information 975. In examples, the supplemental information source 270 is a public records information source 250 or an EI feature database 230. Examples of composite indications of EI site status 284 related to an EI site, such as an existing or potential hydraulic fracturing or oilfield drilling site 910, are given in Table 5.

In embodiments, method 1000 may include obtaining, for example from an EI feature relationship manager 220 or a relationship manager storage 292, information on relationships between EI features 980. The information on relationships between EI features 980 may comprise information on a relationship between the first EI feature and the second EI feature. Some examples of relationships between EI features are given in Table 4. In embodiments, method 100 may include determining the composite indication of an EI site status 284 based further on the information on relationships between EI features 980.

In examples, determining the composite indication of an EI site status 284 may be performed by an EI status determination manager 222 which may comprise a processing function executing a pre-defined mathematical function, for example operating on a set of inputs comprising one or more of the information on the first EI feature 950, the first confidence level 952, the information on the second EI feature 960, the second confidence level 962. In examples, the determination of the composite indication of an EI site status 284 is performed by a processing function utilizing a neural network.

In examples, the composite indication of EI site status is associated with a binary value indicative of whether conditions associated with the composite indication have been met. The composite indication may be associated with a confidence level or with a value indicative of the degree to which conditions associated with the composite indication have been met.

In embodiments, a server 106 comprising EI status determination manager 222 may provide the determined composite indication of EI site status 284 to a user 190 or a subscriber 195 of online platform 180.

Retroactive Training

System 200 may further be configured to improve the accuracy or timeliness by which it is able to identify EI feature-level status or EI site status by utilizing the fact that EI site development occurs in stages. In an oilfield-related example, at a developing oilfield drilling or fracturing site, a road is first needed to bring trucks and manpower into the area. A clearing may then be made, and a well pad developed. In parallel, a water pit may be constructed and filled, tank batteries may be installed, and proppant stockpiled. In a wind-power-related example, earth-moving and pile boring machinery may first be used at a windfarm site in order to create tower foundations and anchors. This may be followed by the arrival of specialized long trucks to deliver segments of the towers, and large cranes to install them. Once complete, work may commence on an electrical substation building and overhead, ground level or subterranean cable systems may be built. Whilst the stages of the above examples may not always be sequenced in the same order, there is a manageable number of characteristic patterns that can be identified and used to facilitate an earlier detection of the development of an EI site.

To exploit such sequencing, the system may be arranged to first determine, at an eventual time "$T_x$" and with a high degree of certainty, that an EI site has been developed. This may for example be based on identification of a number of associated EI features (for example and in an oilfield-related context, a well pad, a water pit, a rig or a service road) or may potentially be confirmed through an examination of supplemental or external information (such as oilfield drilling permit records or completion reports from a public information source).

The system may be further arranged to store a sequence of previous historical aerial images (over a period P) at the same location, for example, from time $T_x$–P to time $T_x$. The system may analyze the historical image sequence in order to determine a pattern of development, including the sequence by which each of a plurality of EI features appeared (or were first identified) and the associated times or time spacings between these events. By associating a variety of such patterns known to correspond to the same EI site or the same eventual outcome (e.g., commencement of drilling at an oilfield site), the system may be able to identify the development of future EI sites at a much earlier stage.

To achieve this, system 200 may be configured such that an EI feature recognition model 216 operates on a sequence of images (for example, comprised within selected images 215), rather than independently on an image-by-image basis. In this case, the historical image set known to correspond to a given outcome may be identified and selected for EI feature recognition model training, in order that the model may improve its ability to recognize that outcome automatically in the future. Additionally, or alternatively, one or more EI feature recognition models (for example, each trained to recognize a particular EI feature type) may continue to operate on an image-by-image basis, and suitable post processing is instead used to analyze the sequence by which features have appeared, and to correlate these against sequences known to be associated with particular outcomes.

Training Using Multiple Image Resolutions

As previously described, obtaining aerial or satellite imagery may have a cost that is a function of both its age and its resolution. The most expensive imagery is often that which is both recent and high resolution (e.g., a resolution of 3 meters or less). Conversely, images that are either old, or medium/low resolution (e.g. 10 meters or more), are likely to be less costly or free.

System 200 may be configured to optimize its use of lower-cost imagery. In one approach, an artificial-intelligence-based model used for EI feature detection and classification (such as EI feature recognition model 216) may be trained using groups of two or more images that relate to the same area of terrain at the same time. At least one image of the group is at a high resolution, whilst another image of the group is at a lower resolution. As the image data used for such training is historical, it may be obtained at a relatively low (or at no) cost.

Such training of EI feature recognition model 216 using both high- and low-resolution image copies may allow it to improve its ability to detect and classify EI features using current (yet still inexpensive) lower resolution imagery without resorting to current (and expensive) high-resolution imagery.

For example, whilst learning or during training, EI feature recognition model 216 may detect as a potential EI feature, image content related to a set of pixels on a low-resolution image, with a certain spatial relationship to other EI features (e.g., as may be known via external, supplemental or previously-stored information). By supplying EI feature recognition model 216 with a corresponding and contemporaneous high-resolution image of the same EI feature, the presence and type of EI feature may be validated (or known with higher certainty), and this validation may be used to improve the future ability of EI feature recognition model 216 to recognize the feature using only low-resolution images. Thus, EI feature recognition model 216 is effectively trained to recognize EI features using low-resolution imagery with little or no human supervision.

Online Platform

As illustrated in FIG. 2A and FIG. 2B, the information obtained and generated by the system may be made available for users and subscribers (190, 195) of online platform 180 to access. Such information may include EI feature-level information 282 which may be obtained from EI feature database 230, or information 284 relating to a composite indication of EI site activity or status. Whilst not explicitly shown in FIG. 2A or FIG. 2B for reasons of diagrammatical simplification, information from other sources, such as from public records information source 250 may also be provided to online platform 180 for users 190 and/or subscribers 195 to access.

Users and subscribers (190, 195) of online platform 180 may comprise a variety of individuals, organizations or commercial entities. Each may be interested in specific components of the information that has been collected by the system as previously described. Users and subscribers (190, 195) may also have individual requirements regarding the accuracy or confidence level of the information that is reported to them. By means of an oilfield-related example, a supplier of drilling equipment and services may need to wait until there is sufficient information about the well pads associated with a particular oilfield operator (for example their number, size, type, stage of development) to determine the scope and scale of the operation and hence whether the opportunity is one on which the supplier may wish to bid.

The proposed system is therefore capable of accepting and storing, for each user and subscriber (190, 195) (or each individual, organization or commercial entity) of online platform 180, a set of preferences or filters that collectively allow the system to tailor the information feeds, reports or alerts provided to users and subscribers (190, 195). As an alternative or in addition to the information-feed approach, users and subscribers (190, 195) of the system may log-in to online platform 180 via network 104 to perform a targeted search for the information they require. The user preferences or search filters may include for example:

EI feature types (or classifications) of interest (examples given in Table 2);

EI feature status attributes of interest (examples given in Table 3);

Composite indications of EI site activity or status of interest (examples given in Table 5);

A confidence level that must be met before a piece of information is reported; and An age range that must be met before a piece of information is reported.

Such options, preference or choices may be either selected from a generalized preconfigured set of available options that are offered by online platform 180 or may be bespoke-to (and potentially specified-by) users and subscribers (190, 195).

Figure 11:
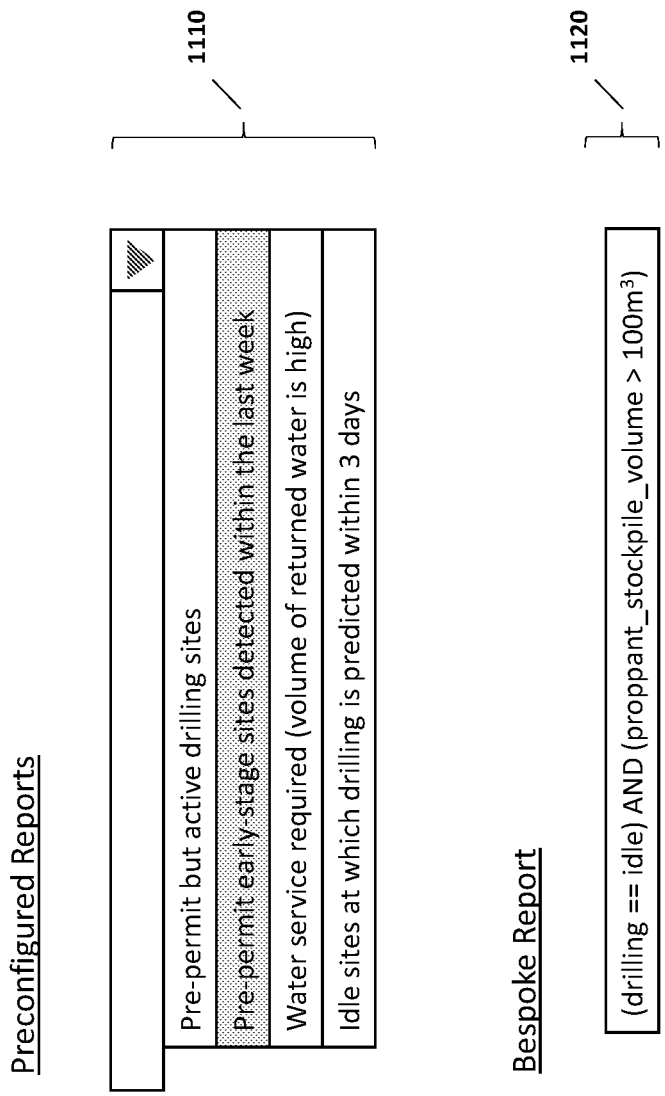
FIG. 11 shows examples of preconfigured and bespoke report types provided by an online platform, according to some embodiments.

By means of example, FIG. 11 depicts a list of preconfigured reports 1110 and a bespoke report 1120, both relating to composite indications of EI site activity or status in an oilfield context that may be of interest to users and subscribers (190, 195) of online platform 180. In the preconfigured case, a set of four available composite indication report types is shown from which users and subscribers (190, 195) may select. In the bespoke report case, users and subscribers (190, 195) may specify one or requirements related to a composite indication of particular interest to the users or subscribers (190, 195). Such requirements may be configured by users and subscribers (190, 195) by means of entering a logical expression (as shown), or by any other suitable means such as via a graphical user interface of online platform 180.

Once a preconfigured or bespoke composite indication report has been selected or configured by the user or subscriber (190, 195), the associated requirements are derived and used to retrieve the requested information. This may comprise providing the requirements to other functions within the system, for example, providing the requirements (or a parsed version of the requirements) to EI status determination manager 222 and/or advanced EI status determination manager 224 as part of a composite indication configuration 970. Whilst the above description of the configuration and selection of composite indication reports includes oilfield-related examples, the same approaches are equally applicable to other energy industries, such as solar, wind or hydroelectric power, with reports tailored instead to those specific types of EI sites and EI features.

Display-of, or access-to the information provided by online platform 180 may be performed via any suitable means such as an internet website, a smartphone application, an email application or a voice message notification service. The locations of EI features or situations of interest may be displayed on a map of the area together with any associated metadata or further details.

The reported information may be graphically or textually represented and may further comprise interactive links allowing users 190 or subscribers 195 to:

Obtain contact details or initiate communications with a related party (e.g., a supplier, a potential customer or a rights-owner)

Flag an interest-in or 'follow' the identified EI activity, join a group, receive further targeted updates, subscribe to a related news feed Obtain an expanded set of information available on the platform at the selected location Post an offer of products, services or equipment at the selected site Retrieve a list of posted offers for products, services or equipment Access permit, consent, or report data associated with the location Obtain an estimated relative surplus or shortage of supply versus demand for a resource or service weighted by geospatial proximity to the area of interest.

While the foregoing describes a particular set of techniques for processing aerial images to identify EI features, it will be understood that the information thereby obtained may be usefully employed by a variety of interested parties including energy infrastructure operators, suppliers of related resources, equipment or services, and financial analysts or financial institutions.

The above systems, devices, methods, processes, and the like may be realized in hardware, software, or any suitable combination of these. The hardware may include a general-purpose computer and/or dedicated computing device. This includes realization in one or more microprocessors, micro-controllers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof and may be distributed across devices in several ways. At the same time, processing may be distributed across devices such as the various systems described above, or all the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the disclosure as defined by the following claims, which are to be interpreted in the broadest sense allowable by law.

What is claimed is:

1. A computer-implemented method for processing images to determine Energy Infrastructure (EI) site status, the method to be carried out by at least one processor executing computer instructions, the method comprising:

receiving an image including at least one captured image of a portion of terrain;

applying an EI feature recognition model to the image to generate information on an EI feature at a location in the portion of terrain;

obtaining, based on the location, supplemental information from a supplemental information source, the supplemental information source including at least one of a public records information source, an EI feature database, and location information of vehicles or vehicle drivers associated with the EI feature; and determining the EI site status based on the information on the EI feature and the supplemental information.

2. The computer-implemented method of claim 1, further comprising predicting future EI site activity based on the EI site status.

3. The computer-implemented method of claim 2, wherein the supplemental information source includes the EI feature database,
the method further comprising:
identifying at least one status attribute of the EI feature; and
storing a history of the at least one status attribute in the EI feature database,
wherein predicting the future EI site activity is based further on the history of the at least one status attribute.

4. The computer-implemented method of claim 2, wherein predicting the future EI site activity includes predicting commencement of drilling or well completion on a specified timescale.

5. The computer-implemented method of claim 2, wherein predicting the future EI site activity includes predicting a future service need.

6. The computer-implemented method of claim 1, wherein the EI feature is a flare system associated with an oilfield well, and wherein determining the EI site status is further based on detecting flares or gas emissions from the flare system.

7. The computer-implemented method of claim 6, wherein the supplemental information source is the public records information source including reports of oilfield well productivity and wherein determining the EI site status further includes predicting productivity of the oilfield well or a decline curve of the oilfield well based on a correlation between the reports of oilfield well productivity and the flares or gas emissions.

8. The computer-implemented method of claim 1, wherein the EI feature is a flare system associated with an oilfield well and wherein determining the EI site status includes one or more of predicting pipeline capacity shortages, economic bases for transporting and selling oil and gas, and cost of well operations.

9. The computer-implemented method of claim 1, wherein the supplemental information source is the EI feature database, and the supplemental information includes information about at least one additional EI feature selected from:
an EI development site,
a frac-water pit, frac pond or frac water impoundment,
a well pad,
a drilling rig,
pipeline infrastructure,
a service road,
a clearing,
a vehicle or truck,
a tank battery,
a proppant store,
a drilling reserve pit,
a frac spread,
a sand mine,
a producing well,
a flare system,
solar panel mounts,
solar panels,
an electrical substation,
a security fence,
a building,
a cable system,
a wind energy collector,
meteorological monitoring equipment,
construction equipment,
hydroelectric reservoirs or forebays,
hydroelectric intake structures,
penstocks,
surge chambers,
a hydroelectric power house,
a hydroelectric tailrace.

10. A system for processing images to determine Energy Infrastructure (EI) site status, the system comprising:
a non-transitory computer readable memory unit; and
at least one processor configured to execute computer instructions to:
receive an image including at least one captured image of a portion of terrain,
apply an EI feature recognition model to the image to generate information on an EI feature at a location in the portion of terrain,
obtain, based on the location, supplemental information from a supplemental information source, the supplemental information source including at least one of a public records information source, an EI feature database, and location information of vehicles or vehicle drivers associated with the EI feature, and
determine the EI site status based on the information on the EI feature and the supplemental information.

11. The system of claim 10, wherein the at least one processor is further configured to execute the computer instructions to predict future EI site activity based on the EI site status.

12. The system of claim 11, wherein the at least one processor is further configured to:
identify at least one status attribute of the EI feature;
store a history of the at least one status attribute in an EI feature database; and
predict the future EI site activity based further on the history of the at least one status attribute.

13. The system of claim 11, wherein the at least one processor is further configured to predict the future EI site activity by predicting at least one of commencement of drilling or well completion on a specified timescale and predicting a future service need.

14. The system of claim 10, wherein the EI feature is a flare system associated with an oilfield well and wherein the at least one processor is further configured to determine the EI site status based on detecting flares or gas emissions from the flare system.

15. The system of claim 14, wherein the supplemental information source is the public records information source including reports of oilfield well productivity and wherein the at least one processor is further configured to determine at least one of productivity of the oilfield well, a decline curve of the oilfield well, a pipeline capacity shortages, economic bases for transporting and selling oil and gas, and cost of well operations based on the flares or gas emissions.

16. The system of claim 10, wherein the supplemental information source is the EI feature database, and the supplemental information includes information about at least one additional EI feature selected from:
an EI development site,
a frac-water pit, frac pond or frac water impoundment,
a well pad,
a drilling rig,
pipeline infrastructure,
a service road,
a clearing,
a vehicle or truck,
a tank battery,
a proppant store,
a drilling reserve pit,
a frac spread,
a sand mine,
a producing well,
a flare system,
solar panel mounts,
solar panels,
an electrical substation,
a security fence,
a building,
a cable system,
a wind energy collector,
meteorological monitoring equipment,
construction equipment,
hydroelectric reservoirs or forebays,
hydroelectric intake structures,
penstocks,
surge chambers,
a hydroelectric power house,
a hydroelectric tailrace.

17. A non-transitory computer readable medium storing computer instructions that, when executed by a processor, cause the processor to carry out a method for processing images to determine Energy Infrastructure (EI) site status, the method comprising:

receiving an image including at least one captured image of a portion of terrain;
applying an EI feature recognition model to the image to generate information on an EI feature at a location in the portion of terrain;
obtaining, based on the location, supplemental information from a supplemental information source, the supplemental information including at least one of a public records information source, an EI feature database, and location information of vehicles or vehicle drivers associated with the EI feature; and
determining the EI site status based on the information on the EI feature and the supplemental information.

18. The non-transitory computer readable medium of claim 17, wherein determining EI site activity includes predicting future EI site activity.

19. The non-transitory computer readable medium of claim 18, the method further comprising:
identifying at least one status attribute of the EI feature;
storing a history of the at least one status attribute in an EI feature database; and
predicting the future EI site activity based further on the history of the at least one status attribute.

20. The non-transitory computer readable medium of claim 17, wherein the supplemental information source is the public records information source including reports of oilfield well productivity, wherein the EI feature is a flare system associated with an oilfield well, and wherein determining the EI site status is further based on detecting flares or gas emissions from the flare system and includes predicting one or more of productivity of the oilfield well, a decline curve of the oilfield well, pipeline capacity shortages, economic bases for transporting and selling oil and gas, and cost of well operations.

* * * * *